United States Patent
Teranishi et al.

(10) Patent No.: US 10,275,107 B2
(45) Date of Patent: *Apr. 30, 2019

(54) DISPLAY AND TOUCH DETECTION METHOD

(71) Applicant: Japan Display Inc., Tokyo (JP)

(72) Inventors: Yasuyuki Teranishi, Tokyo (JP); Daisuke Ito, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,777

(22) Filed: Apr. 2, 2018

(65) Prior Publication Data

US 2018/0224973 A1    Aug. 9, 2018

Related U.S. Application Data

(63) Continuation of application No. 14/944,929, filed on Nov. 18, 2015, now Pat. No. 9,965,121.

(30) Foreign Application Priority Data

Nov. 25, 2014  (JP) ................. 2014-238176

(51) Int. Cl.
*G06F 3/044*   (2006.01)
*G09G 3/36*    (2006.01)
*G06F 3/041*   (2006.01)

(52) U.S. Cl.
CPC ............ *G06F 3/044* (2013.01); *G06F 3/0412* (2013.01); *G09G 3/3607* (2013.01);
(Continued)

(58) Field of Classification Search
None
See application file for complete search history.

(56) References Cited

U.S. PATENT DOCUMENTS 8,786,557 B2    7/2014  Noguchi et al.
9,092,099 B2    7/2015  Okazaki et al.
(Continued)

FOREIGN PATENT DOCUMENTS

JP    2009244958    10/2009
JP    2009-258903   11/2009
(Continued)

OTHER PUBLICATIONS

Korean Office Action dated Sep. 4, 2017 in corresponding Korean Application No. 10-2015-0160398.
Japanese Office Action dated Mar. 13, 2018 in corresponding Japanese Application No. 2014-238176.

*Primary Examiner* — Joseph R Haley
*Assistant Examiner* — Emily J Frank
(74) *Attorney, Agent, or Firm* — K&L Gates LLP

(57) ABSTRACT

To provide a display capable of achieving downsizing and a touch detection method. The display includes a pixel array including a plurality of pixels disposed in a matrix form, a plurality of scanning lines disposed in each row of the pixel array and supplying scanning signals to the plurality of pixels disposed in corresponding rows, a plurality of signal lines disposed in each column of the pixel array and supplying image signals to the plurality of pixels disposed in corresponding columns, a plurality of common electrodes disposed in each of the columns of the pixel array and supplied with driving signals for detecting touch, and a semiconductor device for touch including a plurality of driving terminals for supplying the driving signals. Here, the plurality of driving terminals of the semiconductor device for touch are smaller in number than the plurality of common electrodes disposed in the pixel array.

7 Claims, 21 Drawing Sheets

(52) U.S. Cl.
CPC . *G09G 3/3648* (2013.01); *G06F 2203/04103* (2013.01); *G06F 2203/04111* (2013.01); *G09G 2354/00* (2013.01)

(56) References Cited

U.S. PATENT DOCUMENTS

| | | | |
|---|---|---|---|
| 9,256,320 | B2 | 2/2016 | Katsuta |
| 9,377,906 | B2 | 6/2016 | Lee et al. |
| 9,619,097 | B2 | 4/2017 | Okazaki et al. |
| 2012/0044202 | A1* | 2/2012 | Ishizaki .............. G02F 1/13338 345/174 |
| 2013/0215075 | A1* | 8/2013 | Lee ........................ G06F 3/044 345/174 |
| 2016/0098126 | A1 | 4/2016 | Lee et al. |
| 2016/0118008 | A1 | 4/2016 | Katsuta |
| 2016/0195972 | A1* | 7/2016 | Chen ................... G02F 1/13338 345/173 |

FOREIGN PATENT DOCUMENTS

| | | |
|---|---|---|
| JP | 2010039515 | 2/2010 |
| JP | 2011-197942 | 10/2011 |
| JP | 2012-212335 | 11/2012 |
| JP | 2013172548 | 9/2013 |
| JP | 2014-035671 | 2/2014 |
| KR | 20130095461 | 8/2013 |
| KR | 20140098022 | 8/2014 |
| WO | 2013/069290 | 5/2013 |

* cited by examiner

FIG. 8

| Status | | | | TSW1 | TSW2 | TSW3 | TSW4 | Driving Status |
|---|---|---|---|---|---|---|---|---|
| 1 | 1 | 1 | | L | L | L | H | 2mm Partial R |
| 1 | 1 | 0 | | L | L | H | L | 2mm Partial C |
| 0 | 0 | 1 | | L | H | L | L | 2mm Partial L |
| 0 | 0 | 0 | | H | L | L | L | 4mm Pitch |

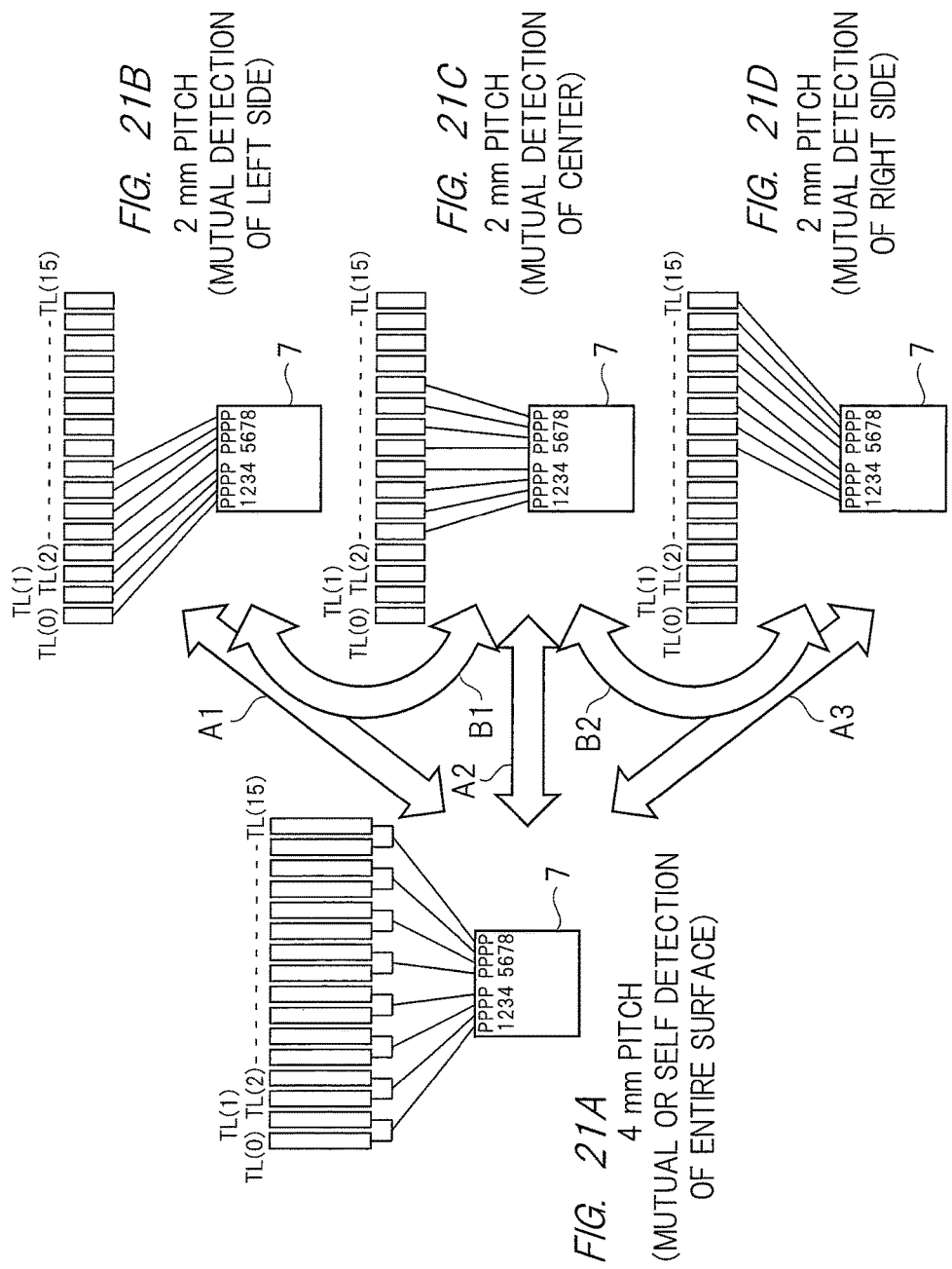

DISPLAY AND TOUCH DETECTION METHOD

CROSS-REFERENCE TO RELATED APPLICATION

The present application is a continuation of U.S. patent application Ser. No. 14/944,929, filed on Nov. 18, 2015, which application claims priority from Japanese Patent Application No. 2014-238176 filed on Nov. 25, 2014, the content of which is hereby incorporated by reference into this application.

FIELD OF THE INVENTION

The present invention relates to a display and a touch detection method, and particularly to a liquid crystal display with touch detection functions and a touch detection method capable of detecting an externally approaching object, in particular, based on changes in electrostatic capacities.

BACKGROUND

These days, touch detection devices capable of detecting externally approaching objects referred to as so-called touch panels are gathering attention. A touch panel is attached or integrated onto a display such as a liquid crystal display. A liquid crystal display with a touch panel being attached or integrated onto the display in this manner, namely a liquid crystal display with touch detection functions, displays images of various buttons or the like on the display, and detects with a touch panel that an external object has approached the button images. This makes it possible to use the touch panel as means for inputting information instead of normal mechanical buttons. Since such liquid crystal displays with touch detection functions do not necessary require means for inputting information such as keyboards or mice, their use is spreading not only for computers but also for portable information terminals such as portable phones. As for detection methods for touch detection devices, there are various methods such as those of optical type, resistance type and electrostatic capacity type. Among these, touch detection devices of electrostatic capacity type have relatively simple structure and low power consumption, so that they are used in portable information terminals. Patent Document 1 (Japanese Patent Application Publication Laid-Open No. 2009-244958) and Patent Document 2 (Japanese Patent Application Publication Laid-Open No. 2013-182548) describe touch detection devices of electrostatic capacity type.

SUMMARY

A touch detection device of electrostatic capacity type detects approaching of an external object by utilizing, for example, the fact that values of capacities of intersection portions at which driving electrodes and detection electrodes intersect are changed when an external object such as a finger approaches (also including contacts). Namely, approaching of an external object is detected based on detection signals generated at the detection electrodes when driving signals are supplied to driving electrodes. In a touch detection device, such driving electrodes and detection electrodes are provided by a plurality of numbers and are sequentially disposed to form respective capacities.

One example of such a touch panel is the in-cell touch panel described in Patent Document 1. It is described that since common electrodes are also used as touch driving electrodes in such a touch panel, the touch driving electrodes are sequentially driven by means of a driving driver provided on a pixel substrate.

On the other hand, in touch panels of on-cell or out-cell type, there are known methods of driving touch driving electrodes from touch ICs (semiconductor integrated circuit devices).

In a touch detection device, driving signals supplied to driving electrodes are formed by a semiconductor integrated circuit device (hereinafter referred to as "semiconductor device"). When considering direct supply of driving signals formed by the semiconductor device to the driving electrodes, it is necessary to provide many external terminals for outputting the driving signals on the semiconductor device. Particularly, in accordance with increases in size of the liquid crystal display screen, the number of driving electrodes to be provided on the touch detection device increases, and to cope with this, the number of external terminals required on the semiconductor device will increase.

When the number of external terminals of the semiconductor device increases, the semiconductor device increases in size. As a result, a problem is caused in that the liquid crystal display with touch detection functions increases in size since an area for mounting the semiconductor device increases. Further, due to increases in external terminals for outputting driving signals, the number of wirings for electrically connecting the external terminals with the driving electrodes increases, thereby causing an increase in a region for forming the wirings. Moreover, due to increases in the number of wirings, it is possible that the degree of freedom of wiring layouts when disposing the wirings in the region is decreased.

Patent Document 2 discloses, for example in FIG. 2, a touch panel of so-called self-capacity type. In a self-capacity type touch panel, presence/absence of touch is detected using a capacity between one electrode and ground voltage. Namely, driving signals are supplied to the electrode, and presence/absence of touch is detected by detecting changes in signals generated at the electrode. Also in the self-capacity type touch panel disclosed in Patent Document 2, driving signals are sequentially supplied to the electrodes of the touch panel.

In Patent Document 2, it is not recognized that the semiconductor device forming the driving signals increases in size due to increases in the number of driving electrodes.

It is an object of the present invention to provide a liquid crystal display with touch detection functions capable of achieving downsizing and a touch detection method.

A display according to an aspect of the present invention includes a pixel array including a plurality of pixels disposed in a matrix form; a plurality of scanning lines disposed in each row of the pixel array, and supplying scanning signals to the plurality of pixels disposed in corresponding rows; a plurality of signal lines disposed in each column of the pixel array, and supplying image signals to the plurality of pixels disposed in corresponding columns; a plurality of touch detection driving electrodes disposed in each of the columns of the pixel array, and supplied with driving signals for detecting touch; and a semiconductor device including a plurality of driving terminals for supplying the driving signals to the touch detection driving electrodes, and the plurality of driving terminals of the semiconductor device are smaller in number than the plurality of touch detection driving electrodes disposed in the pixel array.

Further, as another aspect, the display includes a first selection circuit coupled to the plurality of driving terminals and the plurality of touch detection driving electrodes disposed in the pixel array, and the semiconductor device supplies driving signals to the touch detection driving electrodes via the first selection circuit.

Further, as another aspect, the first selection circuit supplies the driving signals to the touch detection driving electrodes larger in number than the plurality of driving terminals, and supplies the driving signals to the number of the touch detection driving electrodes corresponding to the number of the driving terminals in accordance with detection of touch based on a supply of the driving signals.

Further, as another aspect, the semiconductor device controls the first selection circuit such that the driving signals are supplied to the number of the touch detection driving electrodes which correspond to the number of the driving terminals and which are disposed in a region including a touched position by detection of touch based on a supply of the driving signals.

Further, as another aspect, the display includes a plurality of signal wirings connected to the plurality of driving terminals, and the first selection circuit includes a plurality of unit selection circuits connected between each of the plurality of signal wirings and one touch detection driving electrode, and controlled by the semiconductor device.

Further, as another aspect, detection signals in accordance with presence/absence of touch are generated by supplying the driving signals to each of the plurality of touch detection driving electrodes, the semiconductor device includes a plurality of detection terminals receiving the detection signals, and the plurality of detection terminals are smaller in number than the plurality of touch detection driving electrodes disposed in the pixel array.

Further, as another aspect, the display includes a second selection circuit coupled to the plurality of detection terminals and the plurality of touch detection driving electrodes disposed in the pixel array, and the second selection circuit supplies the detection signals generated at the plurality of touch detection driving electrodes to one of the plurality of detection terminals.

Further, as another aspect, each of the plurality of driving terminals has the same common terminals as those of each of the plurality of detection terminals, and the common terminals function as the driving terminals and the detection terminals in a time-sharing manner.

Further, as another aspect, the touch detection driving electrodes are formed on the same substrate as a substrate formed with pixel electrodes, the first selection circuit is formed in a frame region along a short side of the substrate, and the touch detection driving electrodes are also used as common electrodes for a video display.

Further, as another aspect, a touch detection method provided with a plurality of touch detection driving electrodes each extending in a column direction and disposed in a row direction, and detecting a touched region based on detection signals indicating whether a vicinity region of the touch detection driving electrodes supplied with driving signals is touched or not by supplying the driving signals to the touch detection driving electrodes, and the method includes: a first detection step of detecting a first region including the touched region and larger than the touched region, based on the detection signals generated by supplying the driving signals to the plurality of touch detection driving electrodes; and a second detection step of detecting the touched region, based on the detection signals generated by supplying the driving signals to a plurality of touch detection driving electrodes disposed in the first region detected in the first detection step from among the plurality of touch detection driving electrodes.

Further, as another aspect, in the first detection step, common driving signals are supplied to a plurality of mutually adjoining touch detection driving electrodes, and in the second detection step, different driving signals are supplied to each of the plurality of mutually adjoining touch detection driving electrodes.

Further, as another aspect, the touch detection method includes a semiconductor device including a plurality of driving terminals outputting the driving signals, and in the first detection step, the driving signals from one driving terminal of the plurality of driving terminals are supplied to the plurality of mutually adjoining touch detection driving electrodes as common driving signals, and in the second detection step, the driving signals from the one driving terminal are supplied to one touch detection driving electrode of the plurality of mutually adjoining touch detection driving electrodes, and the driving signals from the other driving terminal of the plurality of driving terminals are supplied to the other touch detection driving electrode of the plurality of mutually adjoining touch detection driving electrodes.

Further, as another aspect, the touch detection method includes a plurality of detection electrodes respectively extending in a row direction and disposed in a column direction so as to intersect each of the plurality of touch detection driving electrodes, and each of the first detection step and the second detection step includes a step of detecting changes in signals of the plurality of detection electrodes and forming the detection signals.

Further, as another aspect, the first detection step includes a step of detecting changes in signals of the plurality of touch detection driving electrodes after supplying the driving signals to the plurality of touch detection driving electrodes, and generating the detection signals, and the second detection step includes a step of detecting changes in signals of the plurality of touch detection driving electrodes disposed in the first region after supplying the driving signals to the plurality of touch detection driving electrodes disposed in the first region, and generating the detection signals.

Further, as another aspect, the touch detection method includes a plurality of detection electrodes respectively extending in a row direction and disposed in a column direction so as to intersect each of the plurality of touch detection driving electrodes, and the first detection step includes a step of detecting changes in signals of the plurality of touch detection driving electrodes after supplying the driving signals to the plurality of touch detection driving electrodes, and generating the detection signals, and the second detection step includes a step of detecting changes in signals of the plurality of detection electrodes, and generating the detection signals.

Further, as another aspect, the plurality of touch detection driving electrodes are separated into a plurality of regions each including a plurality of touch detection driving electrodes respectively extending in a column direction and adjoining each other in a row direction, the plurality of regions include overlapping regions which mutually overlap between mutually adjoining regions, the overlapping regions including at least one touch detection driving electrode, and in the first detection step, one region of the plurality of regions is detected as the first region.

Additional features and advantages are described herein, and will be apparent from the following Detailed Description and the figures.

BRIEF DESCRIPTION OF THE FIGURES

FIG. 8 is a diagram for explaining decoding of a decoder circuit;

FIG. 21A to FIG. 21D are schematic views showing a configuration of a liquid crystal display according to a fourth embodiment.

DETAILED DESCRIPTION

Figure 1:
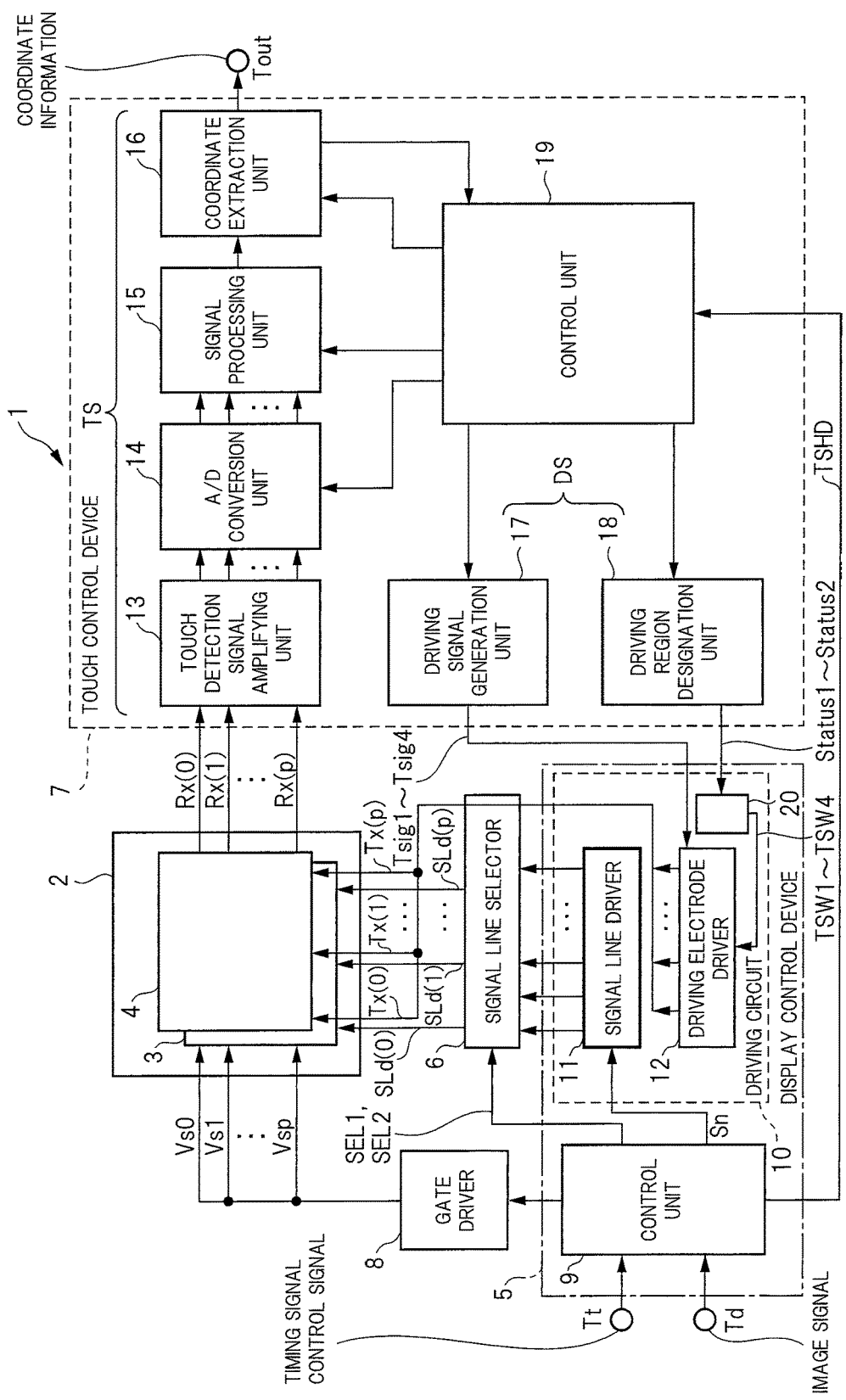
FIG. 1 is a block diagram showing a configuration of a liquid crystal display with touch detection functions according to a first embodiment.

Embodiments of the present application will be described below in detail with reference to the drawings.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

First Embodiment

An example in which the touch detection device is applied to a liquid crystal display with touch detection functions of in-cell type which is integrated with a display will be explained as the first embodiment. Here, a liquid crystal display with touch detection functions of in-cell type indicates a liquid crystal display with touch detection functions in which at least either the driving electrodes or the detection electrodes included in the touch detection device are provided between a pair of substrates opposing each other with the liquid crystal of the display being interposed between. In the first embodiment, a case in which the driving electrodes included in the touch detection device are also used as driving electrodes for driving the liquid crystal will be explained.

Overall Configuration

First, an outline of the overall configuration of the liquid crystal display 1 with touch detection functions will be explained using FIG. 1. FIG. 1 is a block diagram showing a configuration of the liquid crystal display 1 with touch detection functions. The liquid crystal display 1 with touch detection functions includes a liquid crystal panel (display panel) 2, a display control device 5, a signal line selector 6, a touch control device 7 and a gate driver 8. In FIG. 1, the liquid crystal panel 2 is illustrated in schematic form so as to make the drawing easy to see, and includes a liquid crystal panel portion (display panel portion) 3 and a touch detection panel portion 4. The configuration of the liquid crystal panel 2 will be explained later using FIG. 3, FIG. 4, FIG. 5 and FIG. 6.

As it will be described later, the liquid crystal panel portion 3 and the touch detection panel portion 4 use a part of the configuration such as the driving electrodes in common. The liquid crystal panel portion 3 is supplied with scanning signals Vs0 to Vsp from the gate driver 8, and with image signals SLd(0) to SLd(p) from the display control device 5 via the signal line selector 6 to display images in accordance with the image signals SLd(0) to VLd(p). The touch detection panel portion 4 is supplied with driving signals Tx(0) to Tx(p) from the display control device 5 to output detection signals Rx(0) to Rx(p) to the touch control device 7.

The display control device 5 includes a control unit 9 and a driving circuit 10, and the driving circuit 10 includes a signal line deriver 11 for outputting image signals, a driving electrode driver 12 for outputting driving signals Tx(0) to Tx(p) and a decoder circuit 20. The control unit 9 receives timing signals and control signals to be supplied to a control terminal Tt, and image signals to be supplied to an image terminal Td, and supplies image signals Sn in accordance with the image signals supplied to the image terminal Td to the signal line driver 11. The signal line driver 11 performs, though not particularly limited, temporal multiplexing of the image signals Sn supplied from the control unit 9 to output them to the signal line selector 6. Namely, looking at a single output terminal of the signal line driver 11, two image signals are output from one output terminal in a temporally shifted manner.

Further, the control unit 9 supplies selection signals SEL1, SEL2 to the signal line selector 6 for allotting the temporally multiplexed images signals to mutually different signal lines in the signal line selector 6. The signal line selector 6 allots the images signals supplied upon multiplexing to mutually different signal lines by the selection signals SEL1, SEL2 and supplies them as image signals SLd(0) to SLd(p) to the liquid crystal panel portion 3. The signal line selector 6 is disposed in the vicinity of the liquid crystal panel portion 3. In this manner, by temporally multiplexing image signals, it is possible to reduce the number of wirings for electrically connecting the display control device 5 and the liquid crystal panel portion 3. In other words, it is possible to increase the width of wirings for connecting the display control device 5 and the liquid crystal panel portion 3, and thereby to reduce delays of image signals.

The control unit 9 supplies timing signals to the gate driver 8 based on timing signals and control signals supplied to the control unit Tt. The gate driver 8 generates scanning signals Vs0 to Vsp based on the supplied timing signals to supply them to the liquid crystal panel portion 3. The scanning signals Vs0 to Vsp generated by the gate driver 8 are pulse signals which become sequentially higher in level from, for example, scanning signals Vs0 to Vsp.

The decoder circuit 20 within the driving circuit 10 receives status signals Status1, Status2 supplied from the touch control device 7, decodes the status signals Status1, Status2 and forms driving switch signals TSW1 to TSW4 to supply them to the driving electrode driver 12. The driving electrode driver 12 receives driving signals Tsig1 to Tsig4 and driving switch signals TSW1 to TSW4 supplied from the touch control device 7, and supplies the driving signals Tsig1 to Tsig4 as driving signals Tx(i) from a plurality of driving electrodes TL (i, i=0 to p: see FIG. 3 and others) included in the liquid crystal panel 2 to driving electrodes TL(i) designated by the status signals Status1, Status2.

As it will be explained later, the status signals Status1, Status2 are signals designating statuses in which driving signals Tsig1 to Tsig4 are supplied to the driving electrodes TL (i, i=0 to p) as driving signals Tx(i). Considering the aspect that statuses are designated by the status signals Status1, Status2, the status signals Status1, Status2 may be regarded as selection signals. Since there are two status signals Status1, Status2 in the first embodiment, the decoder circuit 20 can show four statuses depending on combinations of logical values (voltage values) of signals. In other words, it is possible to designate and select one of the four statuses. Though not particularly limited, there are four driving signals Tsig1 to Tsig4 in the first embodiment.

The liquid crystal display 1 with touch detection functions according to the first embodiment is of in-cell type, and the driving electrodes TL(i) are used for driving both touch detection and the liquid crystal. Namely, the driving electrodes TL(i) function to form an electric field for driving the liquid crystal between the same (driving electrodes) and pixel electrodes to be described later at the time of image (video) display, and they function to transmit driving signals for touch detection at the time of touch detection. Accordingly, in the present description, the driving electrodes TL(i) will hereinafter be referred to as common electrodes TL(i). Further, when the common electrodes TL(i) function for touch detection, they might also be referred to as touch detection driving electrodes TL(i) to clarify that they are for touch detection.

In FIG. 1, there are only shown driving signals Tx(i) used for driving for touch detection from among signals supplied to the common electrodes TL(i). The image display of the liquid crystal in the liquid crystal panel portion 3 and the touch detection in the touch detection panel portion 4 are performed in a time-sharing manner such that they do not overlap in terms of time. Here, periods during which images are displayed are referred to as display periods while periods during which touch detection is performed are referred to as touch detection periods.

In the display period for performing image display, the driving electrode driver 12 supplies driving signals for driving the liquid crystal to the common electrodes TL(i) within the liquid crystal panel 2 while supplying driving signals Tx(i) for touch detection to the common electrodes TL(i) within the liquid crystal panel 2 during the touch detection period for performing touch detection. While driving signals for driving the liquid crystal are supplied from the control unit 9 to the driving electrode driver 12 during the display period, illustration thereof is omitted for avoiding complicated illustration in FIG. 1. It is of course possible to provide a driving electrode driver for touch detection and a driving electrode driver for driving the liquid crystal separately, in the driving circuit 10. Further, the control unit 9 outputs touch-display synchronizing signals TSHD for discriminating display periods and touch detection periods.

The touch control device 7 includes a detection signal processing unit TS for processing detection signals Rx(0) to Rx(p) from the touch detection panel portion 4, a driving processing unit DS for controlling the common electrodes TL(i), and a control unit 19 for controlling the detection signal processing unit TS and the driving processing unit DS. Here, the detection signal processing unit TS detects whether the touch detection panel portion 4 has been touched or not, and when it has been touched, it performs processes of obtaining coordinates of touched positions. The driving processing unit DS performs processes of designating regions for detecting touch, and processes of forming the driving signals Tsig1 to Tsig4 in the touch detection panel portion 4.

Explaining an outline of the detection signal processing unit TS first, the detection signal processing unit TS includes a touch detection signal amplifying unit 13 for receiving detection signals Rx(0) to Rx(p) from the touch detection panel portion 4 and for amplifying the received detection signals Rx(0) to Rx(p), and an analog/digital conversion unit (hereinafter referred to as A/D conversion unit) 14 for converting the analog detection signals amplified by the touch detection signal amplifying unit 13 into digital signals. Here, the touch detection signal amplifying unit 13 eliminates components of high frequency (noise components) from the received detection signals Rx(0) to Rx(p) and performs amplifying operations. Further, while it will be described later using FIG. 2, the detection signals Rx(0) to Rx(p) are generated in accordance with driving signals supplied to the common electrodes TL(i). Therefore, the A/D conversion unit 14 samples the amplifying signals from the touch detection signal amplifying unit 13 in synchronization with the driving signals and converts them into digital signals.

In FIG. 1, while driving signals Tx(i) and driving signals Tsig1 to Tsig4 are shown as driving signals, any one of the driving signals Tsig1 to Tsig4 is supplied to the common electrodes TL(i) as the driving signals Tx(i) during the touch detection period. Therefore, in the following explanations, driving signals supplied to the touch detection driving electrodes will be explained as driving signals Tsig1 to Tsig4 unless especially necessary.

The detection signal processing unit TS includes a signal processing unit 15 for receiving digital signals obtained through the conversion operations of the A/D conversion unit 14 and performing signal processes of the digital signals, and a coordinate extraction unit 16 for extracting coordinates of touched positions from signals obtained through processes of the signal processing unit 15. The signal processes performed in the signal processing unit 15 include processes of eliminating noise components having frequencies that are higher than the frequency of the sampling performed in the A/D conversion unit 14 and of detecting presence/absence of touch on the touch detection panel portion 4. Coordinates of touched positions extracted by the coordinate extraction unit 16 are supplied to the control unit 19. In the first embodiment, driving signals are supplied to the common electrodes TL(i) a plurality of times, and coordinates of touched positions are extracted based on detection signals Rx(i) generated each time driving signals are supplied, and output from the output terminal Tout as coordinate information.

The driving processing unit DS includes a driving signal generation unit 17 for generating driving signals Tsig1 to Tsig4 for driving common electrodes TL(i) in response to control signals from the control unit 19, and a driving region designation unit 18 for generating status signals (selection signals) Status1, Status2 in response to the control signals from the control unit 19.

The driving signal generation unit 17 forms (generates) driving signals Tsig1 to Tsig4 during touch detection periods in response to control signals from the control unit 19. Each of the formed driving signals Tsig1 to Tsig4 is a clock signal having a predetermined frequency. Namely, respective voltages of the driving signals Tsig1 to Tsig4 change at predetermined cycles.

The driving region designation unit 18 forms status signals Status1, Status2 during touch detection periods in accordance with control signals supplied from the control unit 19. At this time, respective logical values (voltage values) of the status signals Status1, Status2 formed in the driving region designation unit 18 are defined based on process results supplied from the coordinate extraction unit 16 to the control unit 19. Namely, the control unit 19 designates logical values of the status signals Status1, Status2 formed by the driving region designation unit 18 based on process results supplied from the coordinate extraction unit 16.

The control unit 19 receives the touch-display synchronizing signals TSHD output from the control unit 9 of the display control device 5, and performs control such that the driving processing unit DS performs processes when the touch-display synchronizing signals TSHD indicate touch detection periods. Further, during touch detection periods, the control unit 19 controls the A/D conversion unit 14, the signal processing unit 15 and the coordinate extraction unit 16 to convert the detection signals Rx(0) to Rx(p) received by the touch detection signal amplifying unit 13 and to extract coordinates of touched positions.

Basic Principle of Electrostatic Capacity Type Touch Detection (Mutual Capacity Method)

Figure 2A:
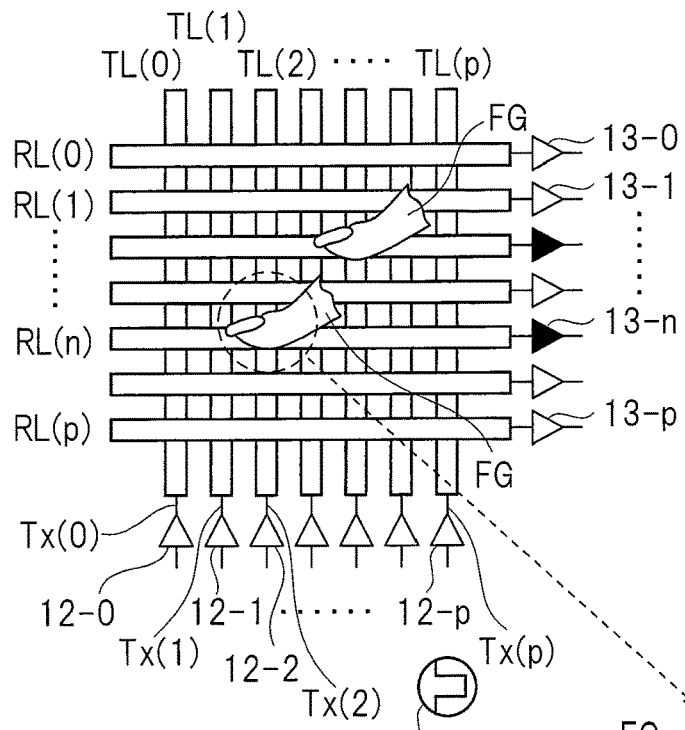
FIG. 2A to FIG. 2C are explanatory views for explaining a basic principle of electrostatic capacity type touch detection (mutual capacity method)
Figure 2B:
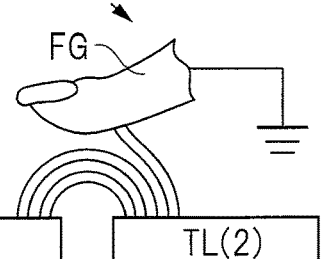
Figure 2C:
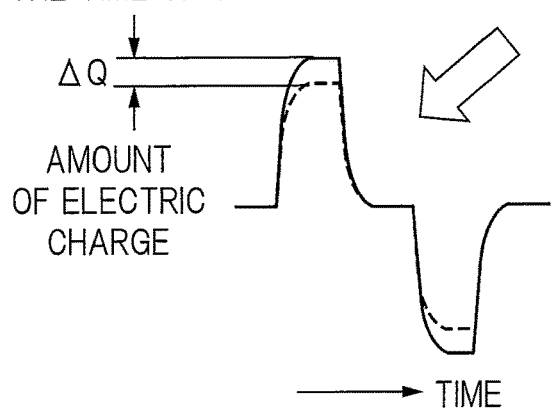

FIG. 2A to FIG. 2C are schematic views showing the basic principle of electrostatic capacity type touch detection used in the first embodiment. In FIG. 2A, each of the TL(0) to TL(p) is common electrodes provided on the liquid crystal panel 2, and each of the RL(0) to RL(p) is detection electrodes provided on the touch detection panel portion 4. In FIG. 2A, each of the common electrodes TL(0) to TL(p) extend in a column direction and are disposed in parallel in a row direction. Further, each of the detection electrodes RL(0) to RL(p) extend in the row direction and are aligned in parallel in the column direction to intersect with the common electrodes TL(0) to TL(p). The detection electrodes RL(0) to RL(p) are formed above the common electrodes TL(0) to TL(p) such that a clearance is formed between the detection electrodes RL(0) to RL(p) and the common electrodes TL(0) to TL(p).

In FIG. 2A, each of 12-0 to 12-p indicates a unit buffer provided within the driving electrode driver 12. Namely, driving signals TX(0) to Tx(p) are output from the unit buffers 12-0 to 12-p. Further, each of the 13-0 to 13-p indicates a unit amplifying unit within the touch detection signal amplifying unit 13. In FIG. 2A, pulse signals surrounded by the solid line circle indicate voltage waveforms of driving signals Tsign1 to Tsig4 which are to be the driving signals Tx(0) to Tx(p). While only a voltage waveform of driving signal Tsig1 is shown in FIG. 2A, driving signals Tsig2 to Tsig4 have similar waveforms. In this drawing, a finger is indicated as FG as an external object.

A common electrode designated by the status signals Status1, Status2, which is the common electrode TL(2) in this example, is supplied with driving signals Tsig1 from the driving electrode driver 12 as driving signals Tx(2). By supplying driving signals Tsig1, which are clock signals, to the common electrode TL(2), an electric field is generated between the common electrode TL(2) and a detection electrode RL(n) intersecting therewith as shown in FIG. 2B. At this time, when the finger FG is in touch with a position in the vicinity of the common electrode TL(2) of the liquid crystal panel 2, an electric field is generated also between the finger FG and the common electrode TL(2), and the electric field generated between the common electrode TL(2) and the detection electrode RL(n) is reduced. Accordingly, the amount of electric charge between the common electrode TL(2) and the detection electrode RL(n) is reduced. Consequently, the amount of electric charge generated in response to supply of the driving signal Tsig1 is reduced by $\Delta Q$ when the finger FG is in touch when compared to cases in which it is not in touch as shown in FIG. 2C. The difference in the amount of electric charge is represented as a difference in voltage in the detection signal Rx(n), and is supplied to and amplified in the unit amplifying unit 13-n within the touch detection signal amplifying unit 13.

In this respect, in FIG. 2C, the transverse axis represents time while the longitudinal axis represents the amount of electric charge. In response to the rise of the driving signal Tsig1, that is, the rise of the voltage of the driving signal Tx(2), the amount of electric charge increases (in the drawing, increases to the upper side) and in response to the fall of the voltage of driving signal Tx(2), the amount of electric charge increases (in the drawing, increases to the lower side). At this time, the increasing amount of electric charge changes depending on the presence/absence of touch of the finger FG. Further, in the drawing, reset is performed prior to increasing to the lower side after the amount of electric charge has increased to the upper side, and similarly, reset of amount of the electric charge is performed prior to increasing to the upper side after amount of the electric charge has increased to the lower side. In this manner, the amount of electric charge changes up and down with respect to the amount of reset electric charge as a reference.

By supplying driving signals Tsig1 to Tsig4 to the common electrodes TL(0) to TL(p) designated by the status signals Status1, Status2, detection signals Rx(0) to Rx(p) having voltage values depending on whether the finger FG is in touch with a position in the vicinity of respective intersection portions or not are output from each of the plurality of detection electrodes RL(0) to RL(p) intersecting with the designated common electrodes. The A/D conversion unit 14 (FIG. 1) samples each of the detection signals Rx(0) to Rx(p) at times differences ΔQ are generated in the amount of electric charge depending on whether the finger FG is in touch or not and converts them into digital signals.

Module

Figure 3A:
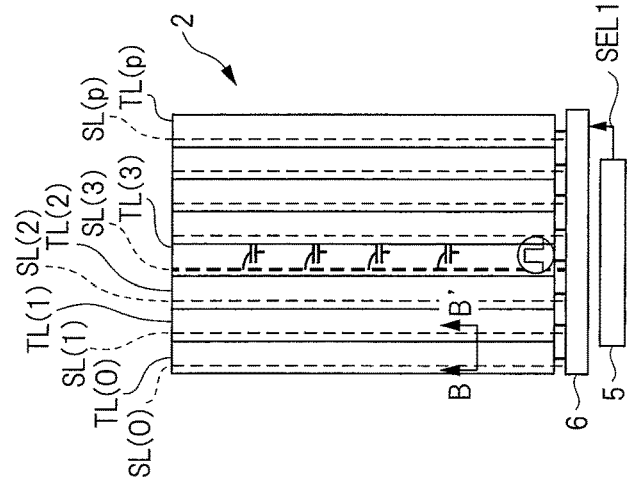
FIG. 3A is a plan view showing an outline of a module mounted with the liquid crystal display with touch detection functions according to the first embodiment.
Figure 3B:
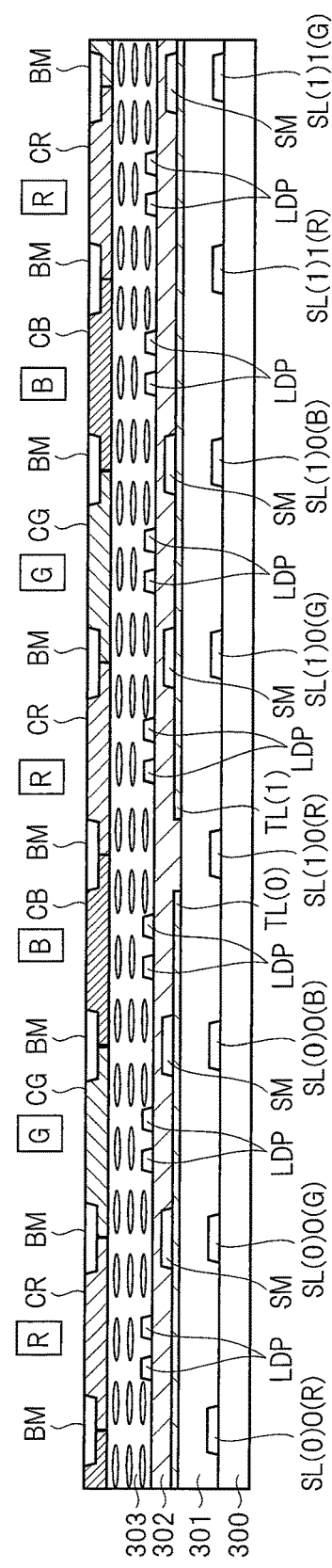
FIG. 3B is a sectional view showing the same.

FIG. 3A is a plan view showing an outline of a module mounted with the liquid crystal display 1 with touch detection functions according to the first embodiment. Further, FIG. 3B is a sectional view along B-B' of FIG. 3A.

The liquid crystal panel 2 includes signal lines SL(0) to SL(p) extending in the longitudinal direction and being disposed in parallel in the horizontal direction in the drawing, and a plurality of common electrodes TL(0) to TL(p) extending in the same direction as the extending direction of these signal lines SL(0) to SL(p). Namely, each of the common electrodes TL(0) to TL(p) also extends in the longitudinal direction and is disposed in parallel in the horizontal direction in the drawing. In this respect, while scanning lines to which selection signals Vs0 to Vsp are supplied and detection electrodes RL(0) to RL(p) transmitting the detection signals Rx(0) to Rx(p) extend in the horizontal direction and are disposed in parallel in the longitudinal direction in the drawing, but illustration thereof is omitted in FIG. 3A.

The display control device 5 and the signal line selector 6 explained in FIG. 1 are disposed on a short side of the liquid crystal panel 2. Namely, the display control device 5 and the signal line selector 6 extend in the direction in which they cross the signal lines SL(0) to SL(p) and the common electrodes TL(0) to TL(p). The signal line selector 6 is formed on the same substrate as the liquid crystal panel 2, and each of the signal lines SL(0) to SL(p) and the common electrodes TL(0) to TL(p) is connected to the signal line selector 6, and image signals and driving signals output from the display control device 5 are supplied to the signal lines SL(0) to SL(p) and the common electrodes TL(0) to TL(p) of the liquid crystal panel 2 by means of the signal line selector 6. Here, signals supplied from the display control device 5 to the signal line selector 6 are image signals, driving signals and selection signals. Since the liquid crystal panel 2 performs color display, image signals supplied from the display control device 5 to the signal line selector 6 are image signals of R(red), G(green) and B(blue) corresponding to the three primary colors, which are indicated as R/G/B in the drawing. Further, in the drawing, the driving signals are indicates as Tx(0) to Tx(p), and selection signals are indicated as SEL1, SEL2.

Each of the signal lines SL(0) to SL(p) is formed on one main surface of a TFT substrate 300 which is a glass substrate. In the module shown in FIG. 3, a plurality of signal lines (for example, signal lines SL(0)0, SL0(1)) correspond to one common electrode (for example, common electrode TL(0)), and the signal lines SL(0)0, SL(0)1 include three signal lines corresponding to the image signals R, G and B. FIG. 3B shows signal lines SL(0)0(R), SL(0)0(G) and SL(0)0(B) corresponding to the image signals R, G and B included in the signal line SL(0)0, and signal lines SL(1)0(R), SL(1)0(G) and SL(1)0(B) corresponding to the image signals R, G and B included in the signal line SL(1)0.

Here, the method of notation of the signal lines used in the present description will be explained. In explaining cases of the signal line SL(0)0(R) and the signal line SL(1)0(R) as examples, the number in the brackets indicates a number of a corresponding common electrode while the next number indicates a number of a pixel in the corresponding common electrode, and the letter in the brackets indicates the three primary colors of the pixels (R, G, B). Namely, the signal line RL(0)0(R) is the signal line corresponding to the common electrode TL(0), and indicates the 0-th pixel and the signal line that transmits image signals corresponding to red from among the three primary colors. Similarly, signal line SL(1)0(R) is the signal line corresponding to the common electrode TL(1) disposed next to the common electrode TL(0), and indicates the 0-th pixel and the signal line that transmits image signals corresponding to red from among the three primary colors. Accordingly, each of SL(1)1(R) and SL(1)1(G) illustrated in FIG. 3(B) is a signal line corresponding to the common electrode TL(1), and indicates the first pixel and the signal line that transmits image signals corresponding to red and green from among the three primary colors.

In FIG. 3B, an insulation layer 301 is further formed on a main surface of signal lines SL(0)0(R), SL(0)0(G) and SL(0)0(B) corresponding to image signals R, G and B and on a main surface of the TFT substrate 300, and the common electrodes TL(0) to TL(p) are formed on the insulation layer 301. Auxiliary electrodes SM are formed at each of the common electrodes TL(0) to TL(p), and the auxiliary electrodes SM are electrically connected with the common electrodes for achieving reductions in electric resistance of the common electrodes. An insulation layer 302 is formed on the upper surface of the common electrodes TL(0) to TL(p) and the auxiliary electrodes SM, and pixel electrodes LDP are formed on the upper surface of the insulation layer 302. In FIG. 3B, each of CR, CB and CG are color filters, and a liquid crystal layer 303 is interposed between the color filters CR(red), CG(green) and CB(blue) and the insulation layer 302. Here, the pixel electrodes LDP are provided at intersections of the scanning lines and signal lines, and a color filter CR, CG or CB corresponding to each of the pixel electrodes LDP is provided above each of the pixel electrodes LDP. A black matrix BM is provided between the color filters CR, CG and CB.

Figure 4A:
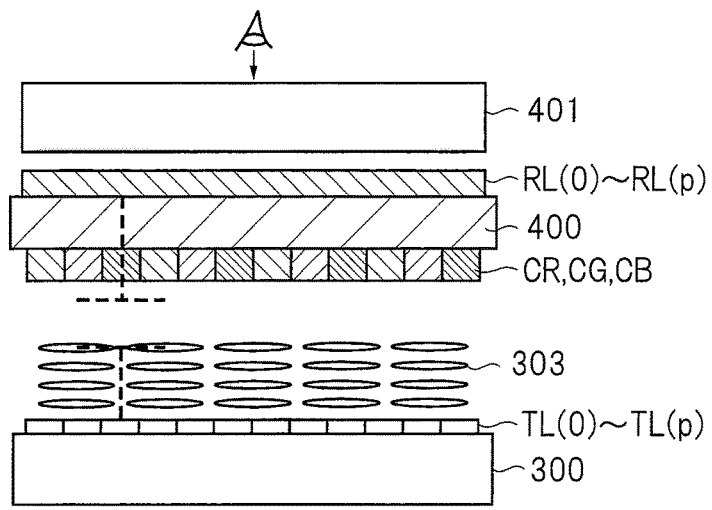
FIG. 4A is a sectional view showing an outline of a module mounted with the liquid crystal display with touch detection functions according to the first embodiment.

FIG. 4 is a schematic view showing a relationship of the detection electrodes RL(0) to RL(p) and the common electrodes TL(0) to TL(p). As shown in FIG. 4A, a CF glass substrate 400 which is a glass substrate is provided on an upper surface of the color filters CR, CG and CB, and detection electrodes RL(0) to RL(p) are formed on an upper surface of the CF glass substrate 400. Further, a polarization plate 401 is formed above the detection electrodes RL(0) to RL(p). In this respect, while such surfaces are denoted as upper surfaces since the example is a case in which the drawing is seen from the upper side as shown in FIG. 4A, it goes without saying that upper surfaces could be lower surfaces or side surfaces when directions of viewing are changed. Further, in FIG. 4A, electrodes of capacity elements formed between the detection electrodes RL(0) to RL(p) and the common electrodes TL(0) to TL(p) are illustrated by broken lines.

Figure 4B:
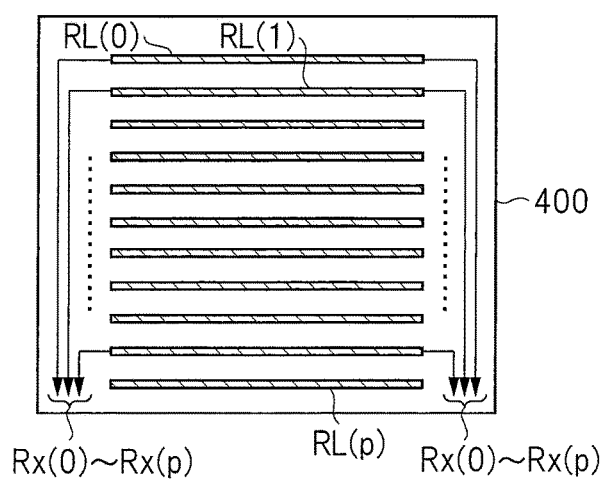
FIG. 4B and FIG. 4C are plan views showing the same.
Figure 4C:
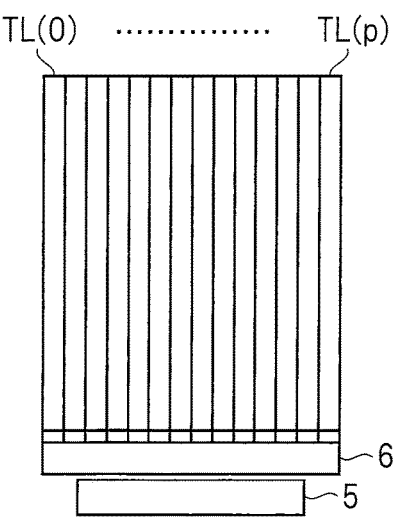

As shown in FIG. 3A and FIG. 4C, each of the signal lines SL(0) to SL(p) and common electrodes TL(0) to TL(p) extends in the longitudinal direction, namely the long side direction, and is aligned in parallel in the horizontal direction, namely the short side direction. In contrast thereto, the detection electrodes RL(0) to RL(p) are provided on the CF glass substrate 400 as shown in FIG. 4B, and are disposed to intersect with the common electrodes TL(0) to TL(p). Namely, they extend in the horizontal direction (short side) and are aligned in parallel in the longitudinal direction (long side) in FIG. 4B. Detection signals Rx(0) to Rx(p) from each of the detection electrodes RL(0) to RL(p) are supplied to the touch control device 7.

When seen in a plan view, the signal lines SL(0) to SL(p) and the common electrodes TL(0) to TL(p) can be regarded to extend in parallel as shown in FIG. 3A. In this respect, "parallel" means here that they extend in parallel without crossing each other from one end to the other, and unless lines do not cross each other from one end to the other, such statuses are referred to as "parallel" even if a part of or an entire line is provided in a state in which it is inclined with respect to another line.

Further, when considering arrangements of the common electrodes TL(0) to TL(p) by taking the signal line selector 6 and the display control device 5 as base points, each of the common electrodes TL(0) to TL(p) can be regarded to extend in directions moving away from the signal line selector 6 and the display control device 5 as base points. In this case, the signal lines SL(0) to SL(p) can also be regarded to extend in directions moving away from the signal line selector 6 and the display control device 5 as base points.

In this respect, in FIG. 4A, illustration of the signal lines and pixel electrodes LDP shown in FIG. 3B is omitted.

(Overall Configuration of Module)

Figure 5:
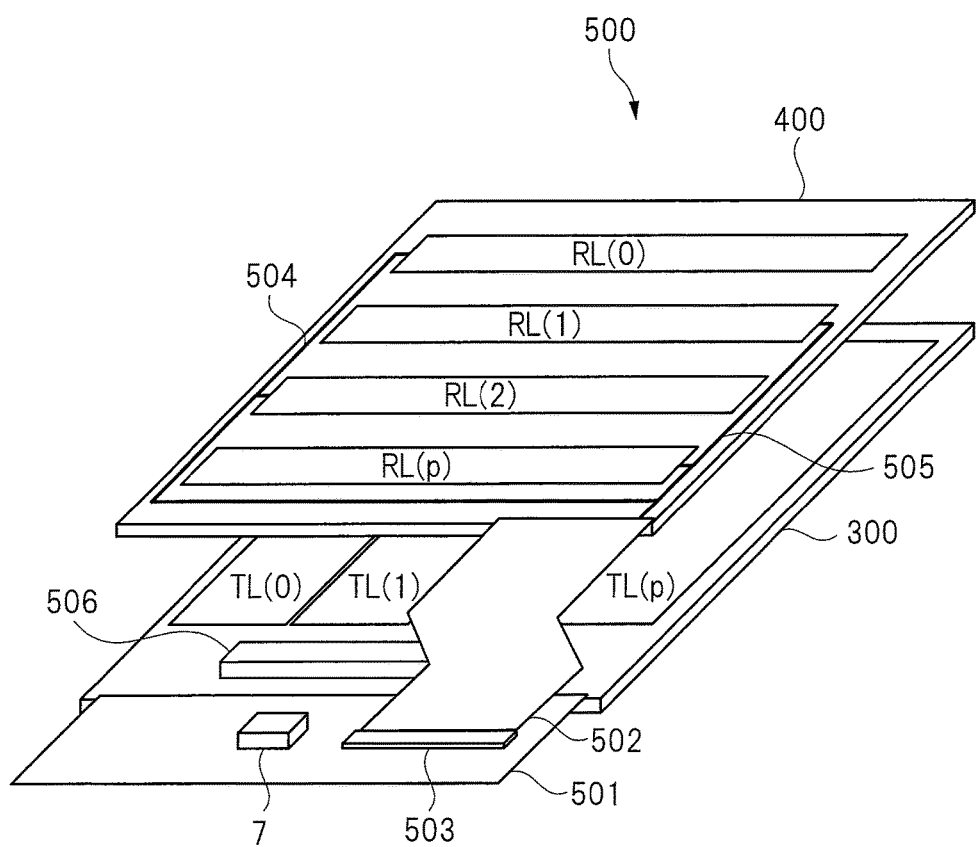
FIG. 5 is a perspective view schematically showing an overall configuration of a module mounted with the liquid crystal display with touch detection functions.

FIG. 5 is a perspective view schematically showing the overall configuration of the module 500 mounted with the liquid crystal display 1 with touch detection functions. In the module 500, the CF glass substrate 400 is stacked on the TFT substrate 300 with the liquid crystal layer 303 and others being interposed between as explained with reference to FIG. 3B. In FIG. 5, illustration of the liquid crystal layer 303 and others is omitted for clearly showing the common electrodes TL(0) to TL(p) formed on the TFT substrate 300 and the detection electrodes RL(0) to RL(p) formed on the CF glass substrate 400.

In the first embodiment, the touch control device 7 explained in FIG. 1 is composed of one semiconductor device. In FIG. 5, 7 denotes a semiconductor device included in the touch control device 7 shown in FIG. 1 (hereinafter also referred to as semiconductor device for touch). Though not particularly limited, the semiconductor device for touch 7 is fixed to a flexible substrate 501 fixed to the TFT substrate 300. A connector 503 is provided on the flexible substrate 501, and one end portion of a flexible substrate for touch 502 is attached to the connector 503. The other end portion of the flexible substrate for touch 502 is disposed on the CF glass substrate 400 and is electrically connected with the detection electrodes RL(0) to RL(p) via signal wirings 504. The connector 503 is connected to a terminal of the semiconductor device for touch 7. With this arrangement, the detection signals Rx(0) to Rx(p) are transmitted from the detection signals RL(0) to RL(p) to the semiconductor device for touch 7 via the flexible substrate for touch 502 and the connector 503 as explained in FIG. 1.

Though not particularly limited, the display control device 5 explained in FIG. 1 is constituted by combining a semiconductor device (hereinafter also referred to as semiconductor device for driver) and a plurality of semiconductor elements. The semiconductor elements mentioned here are field effect type transistors (hereinafter referred to as MOSFET) which include switches as it will be explained later. In FIG. 5, 506 denotes a semiconductor device for driver which includes the display control device 5 explained in FIG. 1 and is provided on the TFT substrate 300. In the first embodiment, the semiconductor device for driver 506 is formed as a Chip On Glass (COG). In order to form the display control device 5, the semiconductor elements (MOSFETs) combined with the semiconductor device for driver 506 are formed to be interposed between the semiconductor device for driver 506 and the TFT substrate 300 for achieving downsizing of the module 500 in the first embodiment. Namely, in FIG. 5, when the module 500 is seen from the upper surface side, the semiconductor elements are disposed such that a plurality of semiconductor elements are covered by the semiconductor device for driver 506.

The semiconductor device for touch 506 and the semiconductor elements included in the display control device 5 are electrically connected to an external terminal of the semiconductor device for touch 7 via the flexible substrate 501. With this arrangement, the driving signals Tsig1 to Tsig4 and status signals Status1, Status2 are supplied from the external terminal of the semiconductor device for touch 7 to the semiconductor device for touch 506 and the semiconductor elements included in the display control device. In this respect, in FIG. 5, illustration of the gate driver 8 and the signal line selector 6 shown in FIG. 1 is omitted.

While FIG. 5 shows an example in which one semiconductor device for driver 506 is provided, it is of course possible to use a plurality of semiconductor devices for driver 506, and it is also possible to incorporate the semiconductor elements which are disposed to be covered by the semiconductor device for driver 506 within the semiconductor device for driver 506.

Liquid Crystal Element (Pixel) Array

Figure 6:
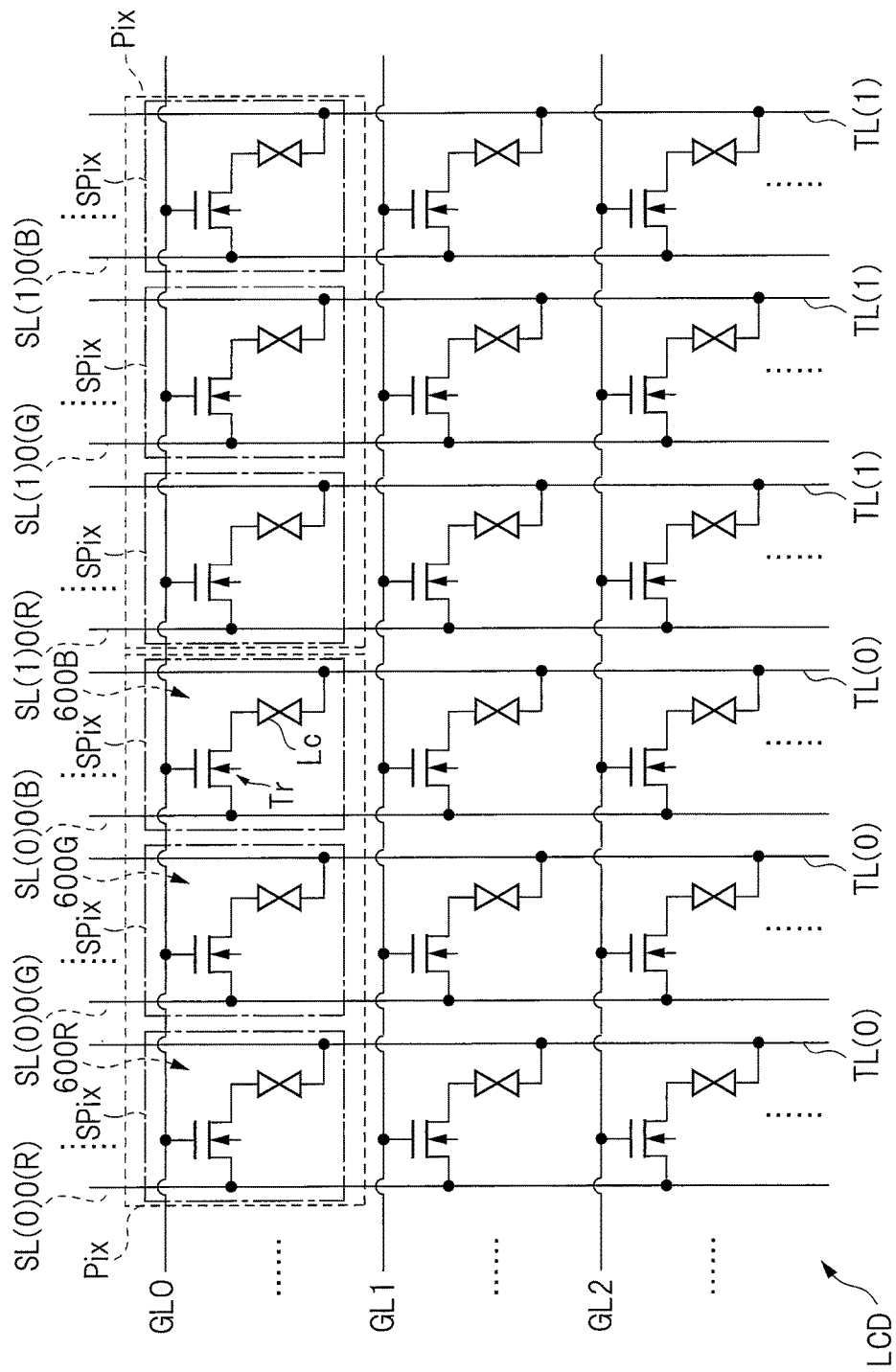
FIG. 6 is a circuit diagram showing a configuration of a liquid crystal element array according to the first embodiment.

FIG. 6 is a circuit diagram showing a circuit configuration of the liquid crystal panel 2. In the drawing, each of the plurality of SPix shown by one dot chain lines indicates a single liquid crystal display element. The liquid crystal display elements SPix are disposed in a matrix form in the liquid crystal panel 2 and form a liquid crystal element array LCD. The liquid crystal element array LCD includes a plurality of scanning lines GL0 to GLp disposed in each row and extending in the row direction, and signal lines SL(0) 0(R), SL(0)0(G), SL(0)0(B) to SL(p)p(R), SL(p)p(G) and SL(p)p(B) disposed in each column and extending in the column direction. The liquid crystal element array LCD further includes common electrodes TL(0) to TL(p) disposed in each column and extending in the column direction. FIG. 6 shows a portion of the liquid crystal element array related to scanning lines GL0 to GL2, signal lines SL(0)0 (R), SL(0)0(G), SL(0)0(B) to SL(1)0(R), SL(1)0(G), SL(1) 0(B) and common electrodes TL(0) and TL(1).

While the common electrodes TL(0) and TL(1) are shown so as to be disposed in each of the columns in FIG. 6 for ease of explanations, it should be understood that one common electrode is disposed for a plurality of signal lines as explained in FIG. 3A and FIG. 3B. It is of course possible to dispose common electrodes in each of the columns of the liquid crystal element array LCD, as shown in FIG. 6. In any case, each of the common electrodes TL(0) to TL(p) is disposed at columns of the liquid crystal element array LCD to be in parallel with the signal lines.

Each of the liquid crystal display elements SPix disposed at intersections of rows and columns of the liquid crystal element array LCD includes a thin film transistor Tr formed on the TFT glass substrate 300 and a liquid crystal element LC of which one terminal is connected to a source of the thin film transistor Tr. In the liquid crystal element array LCD, gates of the thin film transistors Tr of a plurality of liquid crystal display elements SPix disposed in the same row are connected to scanning lines disposed in the same row, and drains of the thin film transistors Tr of a plurality of liquid crystal display elements Spix disposed in the same column are connected to scanning lines disposed in the same column. In other words, a plurality of liquid crystal display elements SPix are disposed in a matrix form, scanning lines are disposed in each row, and a plurality of liquid crystal display elements SPix disposed in corresponding rows are connected to the scanning lines. Further, signal lines are disposed in each column and liquid crystal display elements SPix disposed in corresponding columns are connected to the signal lines. The other ends of the liquid crystal elements LC of the plurality of liquid crystal display elements SPix disposed in the same column are connected to common electrodes disposed in the columns.

Explaining the example shown in FIG. 6, gates of thin film transistors Tr of each of the plurality of liquid crystal display elements SPix disposed in the topmost row are connected to scanning line GL0 disposed in the topmost row in the drawing. Further, in the drawing, drains of the thin film transistors Tr of each of the plurality of liquid crystal display elements SPix disposed in the leftmost column are connected to signal line SL(0)0(R) disposed in the leftmost column. The other ends of the liquid crystal elements of each of the plurality of liquid crystal display elements SPix disposed in the leftmost column are connected to the common electrode TL(0) disposed on the leftmost side in FIG. 6. As already explained, one common electrode corresponds to a plurality of signal lines. Therefore, in the example shown in FIG. 6, the common electrode TL(0) may be regarded to be a common electrode common with respect to three columns.

One liquid crystal display element SPix corresponds to the above-described one sub-pixel. Accordingly, sub-pixels of the three primary colors of R, G and B are composed of three liquid crystal display elements SPix. In FIG. 6, one pixel Pix is formed of three liquid crystal elements SPix disposed successively in the same row and a color is represented by this pixel Pix. Namely, in FIG. 6, the liquid crystal display element SPix indicated as 600R is defined to be a sub-pixel SPix(R) of R(red), the liquid crystal display element SPix indicated as 600G is defined to be a sub-pixel SPix(G) of G(green) and the liquid crystal display element SPix indicated as 600B is defined to be a sub-pixel SPix(B) of B(blue). Therefore, a red color filter CR is provided as a color filter for the sub-pixel SPix(R) indicated as 600R, a green color filter CG is provided as a color filter for the sub-pixel SPix(G) indicated as 600G and a blue color filter CB is provided as a color filter for the sub-pixel SPix(B) indicated as 600B.

Further, from among signals representing one pixel, an image signal corresponding to R is supplied from the signal line selector 6 to the signal line SL(0)0(R), an image signal corresponding to G is supplied from the signal line selector 6 to the signal line SL(0)0(G) and an image signal corresponding to B is supplied from the signal line selector 6 to the signal line SL(0)0(B).

Though not particularly limited, the thin film transistors Tr of the liquid crystal display elements SPix are MOSFETs of n-channel type. The scanning lines GL0 to GLp are supplied, for example, with pulse-like scanning signals Vs0 to Vsp (FIG. 1) of which level becomes sequentially higher in this order from the gate driver 8. Namely, in the liquid crystal display array LCD, voltages of scanning lines become sequentially higher from the scanning line GL0 disposed in the upper-staged row towards the scanning lines GLp disposed in the lower-staged row. With this arrangement, in the liquid crystal display array LCD, the thin film transistors Tr of the liquid crystal display elements SPix sequentially turned to ON states from liquid crystal display elements SPix disposed in the upper-staged row towards liquid crystal display elements SPix disposed in the lower-staged row. When the thin film transistors Tr are turned to ON, pixel signals being supplied to the signal lines at that time are supplied to the liquid crystal elements LC via the thin film transistors in ON states. Electric fields of the liquid crystal elements LC change in accordance with values of pixel signals supplied to the liquid crystal elements LC and modulations of light passing through the liquid crystal elements LC change. With this arrangement, color images corresponding to image signals supplied to signal lines SL(0)0(R), SL(0)0(G), SL(0)0(B) to SL(p)p(R), SL(p)p(G) and SL(p)p(B) are displayed on the liquid crystal panel 2 in synchronization with scanning signals Vs0 to Vsp supplied to the scanning lines GL0 to GLp.

The correspondence of the arrangement of the module shown in FIG. 3 and FIG. 4 and the circuit diagram shown in FIG. 6 will be as follows. The liquid crystal element array LCD includes two sides along the rows and two sides along the columns. The signal line selector 6 (FIG. 3) and the semiconductor device for driver 5 (FIG. 4) shown in FIG. 3 and FIG. 4 are disposed along one side from among the two sides along the rows. Namely, in FIG. 6, the signal line selector 6 (FIG. 3) is disposed to extend in the horizontal direction on the lower side while the semiconductor device for driver 5 (FIG. 4) is disposed on the lower side of the signal line selector 6 (FIG. 3). The gate driver 8 shown in FIG. 1 is respectively disposed at two sides along two columns of the liquid crystal element array LCD.

While an example has been explained in which the number of sub-pixels included in one pixel is three, the present invention is not limited to this, and it also possible to form one pixel by sub-pixels including one or a plurality of colors such as white (W), yellow (Y) or complementary colors of RGB (cyan (C), magenta (M), yellow (Y)) in addition to the above RGB.

One liquid crystal display element corresponds to one sub-pixel. Therefore, by regarding the liquid crystal display element as a sub-pixel, the liquid crystal element array LCD may be regarded as a pixel array. Further, since one pixel is composed of three sub-pixels, the liquid crystal display array LCD may also be regarded as a pixel array composed of a plurality of pixels disposed in a matrix form.

Outline of Configuration of Liquid Crystal Display

Figure 7:
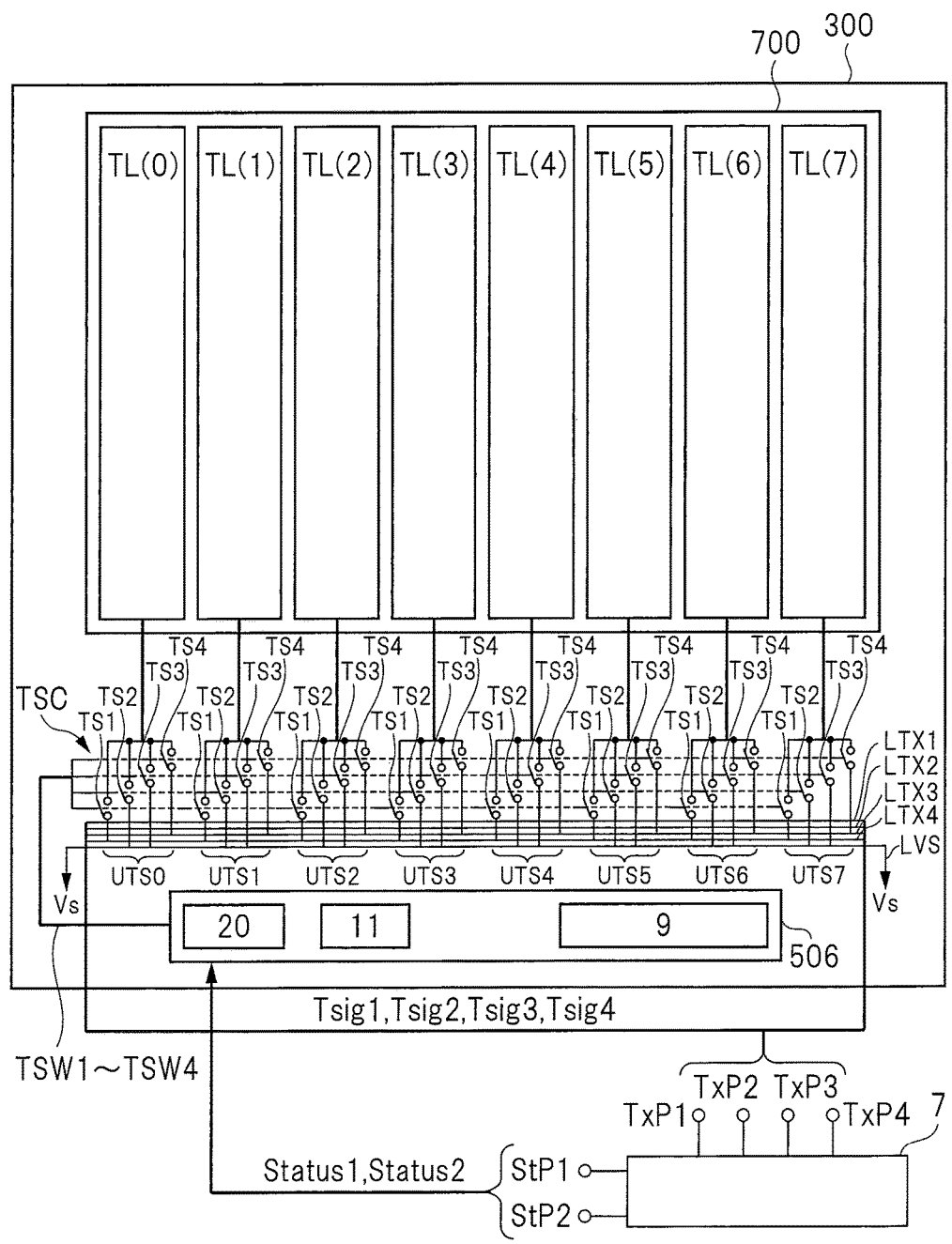
FIG. 7 is a block diagram showing an outline of the liquid crystal display according to the first embodiment.

FIG. 7 is a block diagram showing an outline of the liquid crystal display according to the first embodiment. In the drawing, 700 denotes a region in which the common electrodes TL(0) to TL(p) are formed on the TFT substrate 300. In FIG. 7, there are shown eight common electrodes TL(0) to TL(7) from among common electrodes TL(0) to TL(p). In this respect, in FIG. 7, illustration of scanning lines GL0 to GLp, signal lines SL(0)0(R), SL(0)0(G), SL(0)0(B) to SL(p)p(R), SL(p)p(G), SL(p)p(B) and detection electrodes RL(0) to RL(p) is omitted.

The semiconductor device for touch 7 includes four external terminals (driving terminals) TxP1 to TxP4 as external terminals (driving terminals) for outputting driving signals Tsig1 to Tsig4 during touch detection periods. The semiconductor device for touch 7 further includes two external terminals StP1, StP2 as external terminals for outputting status signals Status1, Status2 during touch detection periods. During touch detection periods, driving signals Tsig1 to Tsig4 are output from each of the four external terminals TxP1 to TxP4 and are supplied to the driving electrode driver 12 (FIG. 1). Further, during touch detection periods, status signals Status1, Status2 are output from each of the two external terminals StP1, StP2 to the decoder circuit 20.

Though not particularly limited, the semiconductor device for driver 506 includes the control unit 9, the signal line driver 11 and the decoder circuit 20 shown in FIG. 1 in the first embodiment. Though not shown in FIG. 7, the driving electrode driver 12 (FIG. 1) is composed of semiconductor elements (MOSFETs) formed between the semiconductor device for driver 506 and the TFT substrate 300. In the first embodiment, the driving electrode driver 12 includes a selection circuit TSC (first selection circuit) to be described later. While the selection circuit TSC is illustrated in FIG. 7 for the sake of explanation, it should be understood that it is composed of semiconductor elements formed between the semiconductor device for driver 506 and the TFT substrate 300. Further, in FIG. 7, the arrangement of the common electrodes TL(0) to TL(7) and the semiconductor device for driver 506 is illustrated to match the actual arrangement. The selection circuit TSC and the semiconductor device for driver 506 provided to cover the same are formed in a region corresponding to the frame extending along a short side of the TFT substrate 300.

During the touch detection periods, status signals Status1, Status2 output from the semiconductor device for touch 7 are decoded by the decoder circuit 20 in the semiconductor device for driver 506 to form driving switch signals TSW1 to TSW4. The formed driving switch signals TSW1 to TSW4 are supplied to the selection circuit TSC and the selection circuit TSC is controlled by the driving switch signals TSW1 to TSW4. Considering the aspect of controlling the selection circuit TSC, the driving switch signals TSW1 to TSW4 can be regarded as selection signals.

The selection circuit TSC includes eight unit selection circuits UTS0 to UTS7 having a mutually similar configuration. Each of the eight unit selection circuits UTS0 to UTS7 is in a one-to-one correspondence with each of the common electrodes TL(0) to TL(7). For example, the unit selection circuit UTS0 corresponds to common electrode TL(0), and the unit selection circuit UTS1 corresponds to common electrode TL(1). Likewise, the unit selection circuits and the common electrodes are in a one-to-one correspondence.

The selection circuit TSC included in the driving electrode driver 12 includes signal wirings LTX1 to LTX4 and a voltage wiring LVS which are respectively connected to the external terminals TxP1 to TxP4 of the semiconductor device for touch 7. Also, the signal wirings LTX1 to LTX4 and the voltage wiring LVS are illustrated to match the actual arrangement. Namely, the signal wirings LTX1 to LTX4 and the voltage wiring LVS are disposed to extend in parallel with the rows of the liquid crystal element array LCD (FIG. 6).

It is preferable that the signal wirings LTX1 to LTX4, the voltage wiring LVS and the switches TS1 to TS4 are also used in a test circuit for display provided on the TFT substrate 300, for example, a test circuit of source signal lines. It is also preferable that a selection circuit TSC including these members is disposed to overlap the semiconductor device for driver when seen in a plan view. This makes it possible to remarkably reduce the layout space of the frame region in that, for example, additional circuits can be reduced.

In the present embodiment, since the common electrodes are pattern-divided to extend in a direction parallel to the source signal lines, it is a design which is capable of performing touch driving of the common electrodes from upper and lower directions of the panel. Therefore, it is a design which is capable of controlling common electrodes from the semiconductor device for touch and which is capable of realizing easy reduction of a frame circuit.

Each of the eight unit selection circuits UTS0 to UTS7 is connected to common electrodes TL(0) to TL(7) corresponding to each of them and to between the signal wirings LTX1 to LTX4 and the voltage wiring LVS, and electrically connect corresponding common electrodes to the signal wirings LTX1 to LTX4 or the voltage wiring LVS in accordance with logical values of the driving switch signals TSW1 to TSW4. The signal wiring LTX1 is connected to an external terminal TxP1 of the semiconductor device for touch 7, and the signal wiring LTX2 is connected to an external terminal TxP2 of the semiconductor device for touch 7. Likewise, the signal wiring LTX3 is connected to an external terminal TxP3 and the signal wiring LTX4 is connected to an external terminal TxP4. Further, a ground voltage Vs is supplied to the voltage wiring LVS. With this arrangement, each of the unit selection circuits UTS0 to UTS7 is supplied with driving signals Tsig1 to Tsig4 via the signal wirings LTX1 to LTX4 and with the ground voltage Vs via the voltage wiring LVS.

In this respect, in the first embodiment, both ends of each of the signal wirings LTX1 to LTX4 extending in the row direction are connected to the external terminals TxP1 to TxP4 of the semiconductor device for touch 7. This makes it possible to suppress propagation delays of driving signals Tsig1 to Tsig4 in the signal wirings LTX1 to LTX4. Both ends of the voltage wiring LVS are also connected to the ground voltage Vs. This makes it possible to suppress fluctuations in the ground voltage Vs of the voltage wiring LVS.

Configuration and Operations of Selection Circuit TSC

FIG. 8 is a diagram for explaining decoding of the decoder circuit 20 (FIG. 1, FIG. 7). In FIG. 8, fields of "Status" indicate combinations of logical values of status signals Status1, Status2. Further, each of the TSW1 to TSW4 indicate voltages (high level=H, low level=L) of driving switch signals TSW1 to TSW4 formed by decoding the status signals Status1, Status2.

In the first embodiment, when the logical values of the status signals Status1, Status2 are "0", "0", the driving switch signal TSW1 becomes a high level H (logical value of "1") and each of the driving switch signals TSW2 to TSW4 becomes a low level L (logical value of "0") through decoding operations of the decoder circuit 20. Similarly, when the logical values of the status signals Status1, Status2 are "0", "1" through decoding operations of the decoder circuit 20, the driving switch signal TSW2 becomes a high level H while the remaining driving switch signals TSW1, TSW3 and TSW4 become a low level L. Further, when the logical values of the status signals Status1, Status2 are "1", "0", the driving switch signal TSW3 becomes a high level H while the remaining driving switch signals TSW1, TSW2 and TSW4 become a low level L. Moreover, when the logical values of the status signals Status1, Status2 are "1", "1", the driving switch signal TWS4 becomes a high level H while the remaining driving switch signals TSW1 to TSW3 become a low level L.

The driving status Driving Status indicates driving statuses of the common electrodes. In the first embodiment, the plurality of common electrodes TL(0) to TL(7) disposed on the TFT substrate 300 are used as an entire region or divided into a plurality of regions, and driving signals are supplied to the entire or divided regions. Statuses of such supply of driving signals are indicated as driving statuses of the common electrodes. In the first embodiment, when taking FIG. 7 as an example, it is divided into a left side portion (region including common electrodes TL(0) to TL(3)), a central portion (region including common electrodes TL(2) to TL(5)) and a right side portion (region including common electrodes TL(4) to TL(7)). Of course, the entire region includes common electrodes TL(0) to TL(7).

Figure 9:
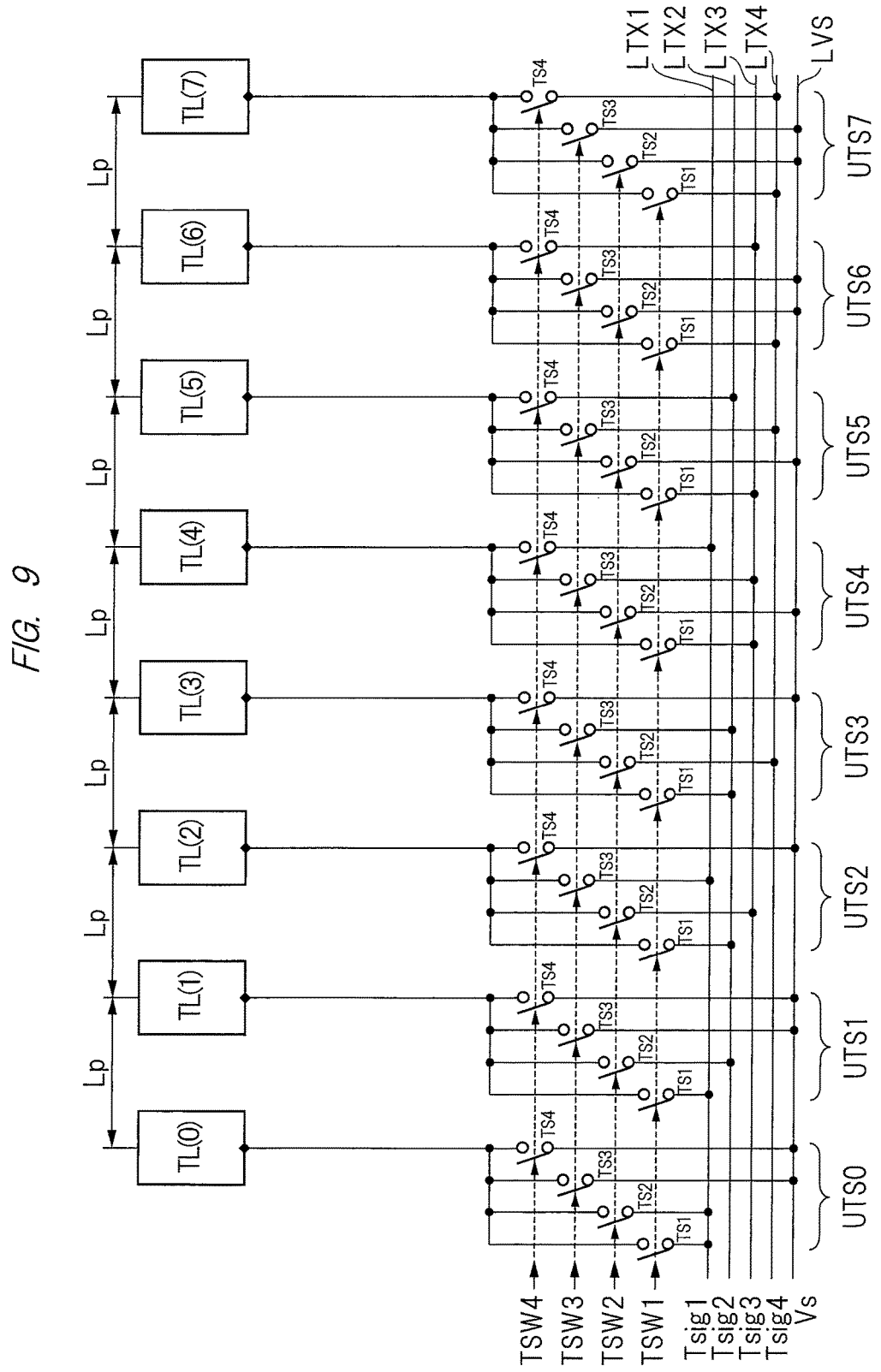
FIG. 9 is a block diagram showing a configuration of a selection circuit according to the first embodiment.

FIG. 9 is a circuit diagram showing the configuration of the selection circuit TSC shown in FIG. 7 in details. In this respect, illustration of the semiconductor device for touch 7 and the semiconductor device for driver 506 is omitted in FIG. 9. Further, while each of FIG. 10 to FIG. 13 shows the same circuit as the selection circuit TSC shown in FIG. 9, statuses of switches corresponding to driving statuses of the driving electrodes are shown. Next, detailed configuration and operations of the selection circuit TSC will be explained using FIG. 9 to FIG. 13.

As described above, the selection circuit TSC includes a plurality of unit selection circuits UTS0 to UTS7. Since each of the unit selection circuits UTS0 to UTS7 is similar to each other as described above, the configuration will first be explained using unit selection circuit UTS0 as an example and differences among the unit selection circuits UTS0 to UTS7 will be explained thereafter.

As shown in FIG. 9, the unit selection circuit UTS0 includes a pair of terminals and includes switches TS1 to TS4 which electrically connect or disconnect each of the pair of terminals in accordance with logical values of the selection signals. Though not particularly limited, when the selection signal has a logical value of, for example, "1" (high level), the switch electrically connects (makes conductive, turns ON) each of the pair of terminals, and when it has a logical value of "0" (low level), the switch disconnects (makes non-conductive, turns OFF) each of the pair of terminals. Though not particularly limited, the switches TS1 to TS4 are composed of MOSFETs.

One of the terminals of each of the switches TS1 to TS4 is connectable to the corresponding common electrode TL(0). A driving switch signal TSW1 is supplied to the switch TS1 as the selection signal while a driving switch signal TSW2 is supplied to the switch TS2 as the selection signal. Further, a driving switch signal TSW3 is supplied to the switch TS3 as the selection signal while driving switch signal TSW4 is supplied to the switch TS4 as the selection signal. With this arrangement, the switches TS1 to TS4 are made conductive or non-conductive in accordance with logical values of the driving switch signals SW1 to SW4 supplied as control signals to each of them.

In the unit selection circuit UTS0, the other terminals of each of the switches TS1 and TS2 are connected to the signal wiring LTX1 and the other terminals of each of the switches TS3 and TS4 are connected to the voltage wiring LVS. With this arrangement, the unit selection circuit UTS0 supplies a driving signal Tsig1 to the corresponding driving electrode TL(0) when the logical value of the driving switch signal TSW1 or TSW2 is "1". On the other hand, when the logical value of the driving switch signal TSW3 or TSW4 is "1", the unit selection circuit UTS1 supplies the ground voltage Vs to the corresponding driving electrode TL(0).

One of the terminals of each of the unit selection circuit UTS1 to UTS7 also includes switches TS1 to TS4 coupled to corresponding driving electrodes TL(1) to TL(7) similarly to the unit selection circuit UTS0. Further, similarly to the unit selection circuit UTS0, a driving switch signal TSW1 is supplied to the switch TS1 as the selection signal, a driving switch signal TSW2 is supplied to the switch TS2 as the selection signal, a driving switch signal TSW3 is supplied to the switch TS3 as the selection signal and a driving switch signal TSW4 is supplied to the switch TS4 as the selection signal.

The differences among the unit switches UTS0 to UTS7 are that the other terminals of each of the switches TS1 to TS4 are connected to different signal wirings and the voltage wiring. Namely, the other terminal of the switch TS1 of the unit selection circuit UTS1 is connected to the signal wiring LTX1, the other terminal of the switch TS2 is connected to the signal wiring LTX2, and the other terminals of the switches TS3 and TS4 are connected to the voltage wiring LVS.

The other terminal of the switch TS1 of the unit selection circuit UT S2 is connected to the signal wiring LTX2, the other terminal of the switch TS2 is connected to the signal wiring LTX3, the other terminal of the switch TS3 is connected to the signal wiring LTX1, and the other terminal of the switch TS4 is connected to the voltage wiring LVS. The other terminal of the switch TS1 of the unit selection circuit UTS3 is connected to the signal wiring LTX2, the other terminal of the switch TS2 is connected to the signal wiring LTX4, the other terminal of the switch TS3 is connected to the signal wiring LTX2 and the other terminal of the switch TS4 is connected to the voltage wiring LVS.

The other terminals of the switches TS1 and TS3 of the unit selection circuit UTS4 are connected to the signal wiring LTX3, the other terminal of the switch TS2 is connected to the voltage wiring LVS and the other terminal of the switch TS4 is connected to the signal wiring LTX1. The other terminal of the switch TS1 of the unit selection circuit UTS5 is connected to the signal wiring LTX3, the other terminal of the switch TS2 is connected to the voltage wiring LVS, the other terminal of the switch TS3 is connected to the signal wiring LTX4 and the other terminal of the switch TS4 is connected to the signal wiring LTX2.

Further, the other terminal of the switch TS1 of the unit selection circuit UTS6 is connected to the signal wiring LTX4, the other terminals of the switches TS2 and TS3 are connected to the voltage wiring LVS and the other terminal of the switch TS4 is connected to the signal wiring LTX3. The other terminals of the switches TS1 and TS4 of the unit selection circuit UTS7 are connected to the signal wiring LTX4 and the other terminals of the switches TS2 and TS3 are connected to the voltage wiring LVS.

Though not particularly limited, in the first embodiment, pitches Lp between the respective common electrodes TL(0) to TL(7) are equal. Namely, distances between common electrodes disposed to adjoin each other are made to be the same. Though not particularly limited, the distance between central lines of common electrodes is indicated as the pitch Lp which is defined to be 2 mm in the first embodiment.

Figure 10:
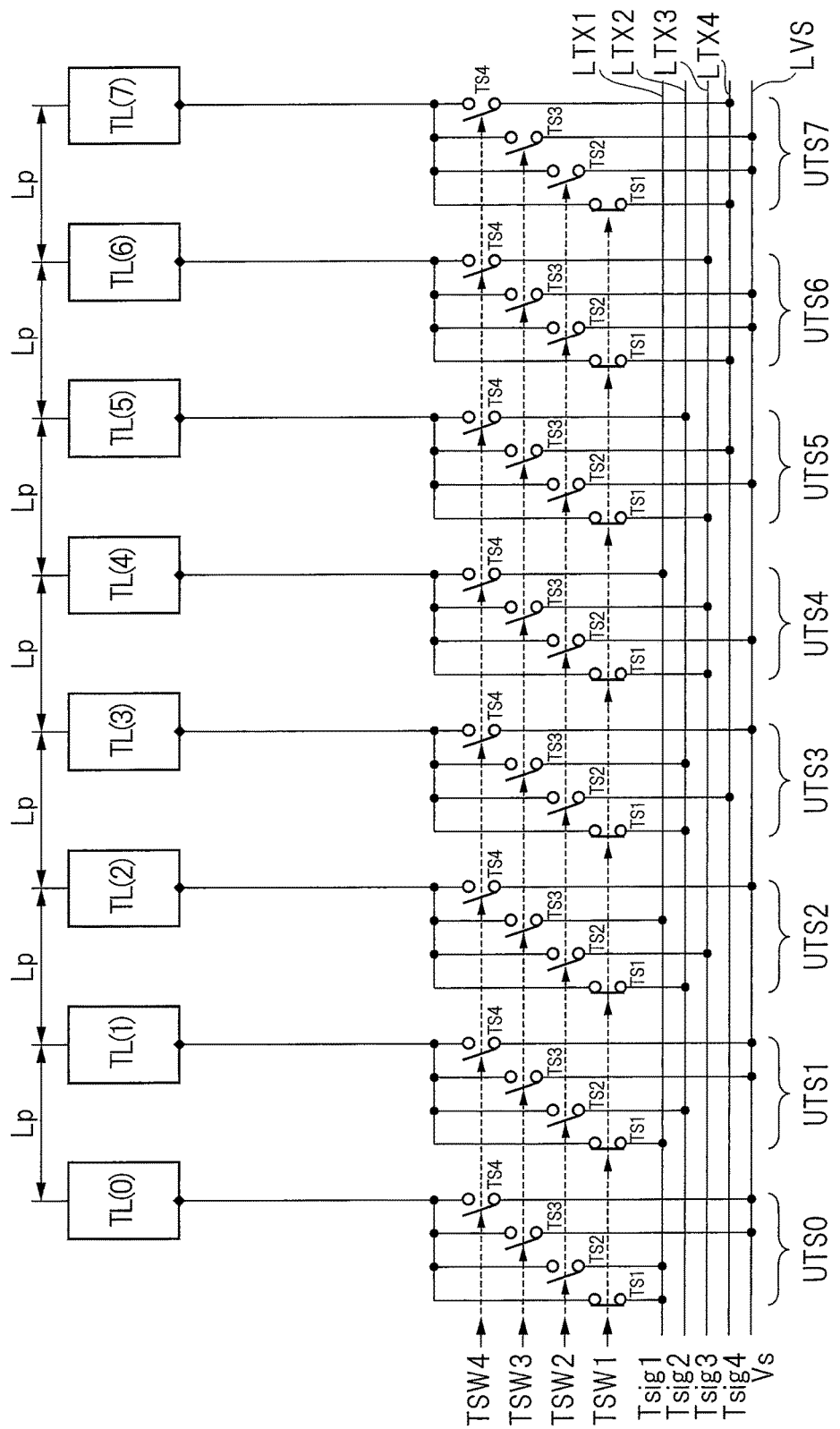
FIG. 10 is a diagram for explaining operations of the selection circuit according to the first embodiment.

When status signals Status1, Status2 having logical values of "0", "0" are output from the semiconductor device for touch 7, the driving switch signal TSW1 becomes high level (logical value of "1") and the remaining driving switch signals TSW2 to TSW4 become low level (logical value of "0") as shown in FIG. 8. With this arrangement, the switch TS1 of the unit selection circuits UTS0 to UTS7 is in a conductive state while the remaining switches TS2 to TS are in a non-conductive state as shown in FIG. 10. Therefore, the unit selection circuits UTS0 and the UTS1 transmit the driving signal Tsig1 supplied to the signal wiring LTX1 to the common electrodes TL(0), TL(1) corresponding to each of them. Similarly, the unit selection circuits UTS2 and the UTS3 transmit the driving signal Tsig2 supplied to the signal wiring LTX2 to the common electrodes TL(2), TL(3) corresponding to each of them, and the unit selection circuits UTS4 and the UTS5 transmit the driving signal Tsig3 supplied to the signal wiring LTX3 to the common electrodes TL(4), TL(5) corresponding to each of them. Further, the unit selection circuits UTS6 and the UTS7 transmit the driving signal Tsig4 supplied to the signal wiring LTX4 to the common electrodes TL(6), TL(7) corresponding to each of them.

Namely, when the driving switch signal TSW1 has a logical value of "1", one driving signal (for example, driving signal Tsig1) is transmitted to two common electrodes disposed to adjoin each other (for example, common electrodes TL(0), TL(1)) in common.

Also in the case of the driving signal Tsig2, when the driving switch signal TSW1 has a logical value of "1", it is transmitted to common electrodes TL(2) and TL(3) disposed to adjoin each other via the unit selection circuits UTS2 to UTS3. Similarly, also in cases of the driving signals Tsig3 and Tsig4, when the driving switch signal TSW1 has a logical value of "1", they are transmitted to common electrodes TL(4), TL(5) and common electrodes TL(6), TL(7) each of which is disposed to adjoin each other, via the unit selection circuits UTS4, UTS5 and UTS6, UTS7.

In other words, in the first embodiment, different driving signals Tsig1 to Tsig4 are supplied every twice of the pitch Lp. Namely, in FIG. 8, the driving signals are in a state in which they are supplied at intervals of 4 mm pitches as described in the field of "Driving Status". When the semiconductor device for touch 7 outputs the driving signals Tsig1 to Tsig4 from the four external terminals TxP1 to TxP4 in this state, it is possible to supply driving signals to all of the eight driving electrodes TL(0) to TL(7). Namely, it is possible to perform overall touch detection with external terminals (driving terminals) which are smaller in number than driving electrodes.

Figure 11:
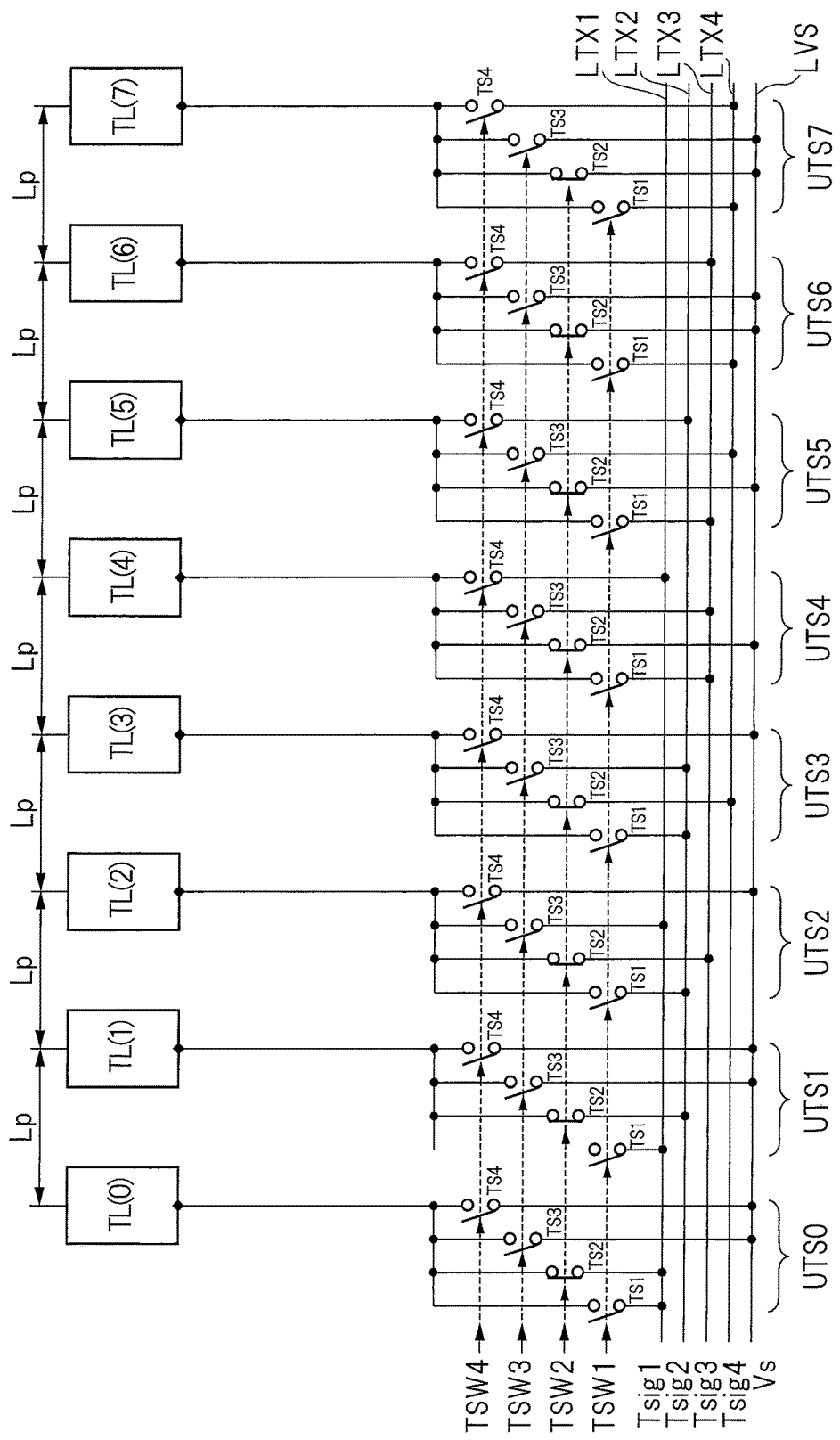
FIG. 11 is a diagram for explaining operations of the selection circuit according to the first embodiment.

When the status signals Status1, Status2 are "0" and "1", the driving switch TSW2 becomes a high level and the remaining driving switch signals TSW1, TSW3 and TSW4 become a low level. When the driving switch TSW2 is at a high level, the switch TS2 in the respective unit selection circuits is in a conductive state as shown in FIG. 11, so that the unit selection circuit UTS0 transmits a driving signal Tsig1 to the corresponding common electrode TL(0), the unit selection circuit UTS1 transmits a driving signal Tsig2 to the corresponding common electrode TL(1), the unit selection circuit UTS2 transmits a driving signal Tsig3 to the corresponding common electrode TL(2) and the unit selection circuit UTS3 transmits a driving signal Tsig4 to the corresponding common electrode TL(3). At this time, each of the unit selection circuits UTS4 to UTS7 transmits a ground voltage Vs to the corresponding common electrodes TL(4) to TL(7).

Namely, when the driving switch signal TSW2 has a logical value of "1", driving signals Tsig1 to Tsig4 are supplied to each of the four common electrodes TL(0) to TL(3) disposed on the left side to adjoin each other in FIG. 11. At this time, the ground voltage Vs is supplied to each of the four common electrodes TL(4) to TL(7) disposed on the right side to adjoin each other in FIG. 11. In other words, different driving signals Tsig1 to Tsig4 are supplied to the common electrodes at every pitch Lp (2 mm pitch) on the left side in FIG. 11. Namely, as described in the field of "Driving Status" in FIG. 8, the driving signals are in a state in which they are supplied to the left side portion (Partial L) at 2 mm pitch.

At this time, it is possible to set the common electrodes TL(4) to TL(7) on the right side portion supplied with the ground voltage Vs, as objects of which touch detection driving is not performed.

Figure 12:
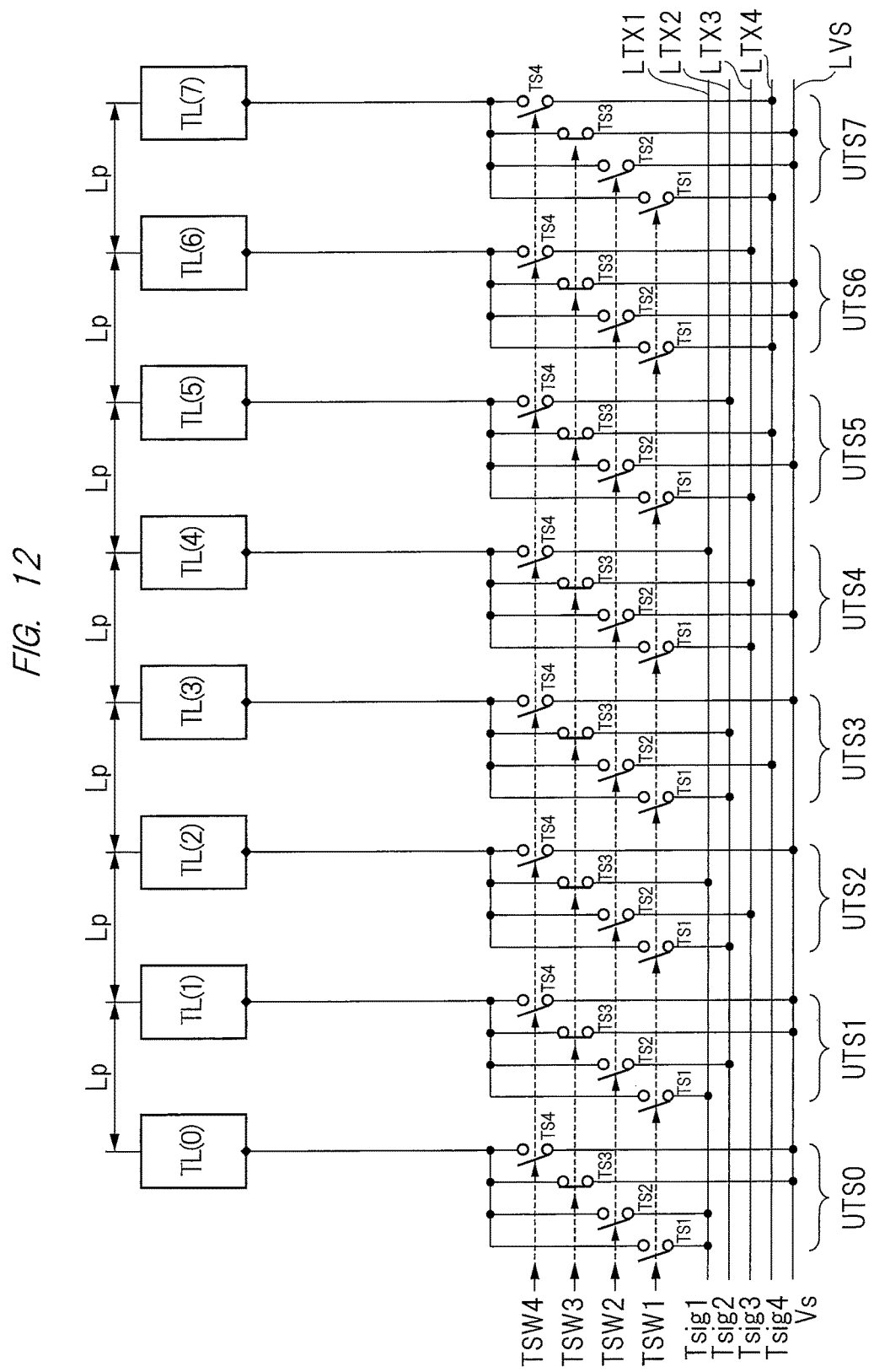
FIG. 12 is a diagram for explaining operations of the selection circuit according to the first embodiment.

When the status signals Status1, Status 2 are "1" and "0", the driving switch signal TSW3 has a logical value of "1" and the remaining driving switch signals TSW1, TSW2 and TSW4 have a logical value of "0". When the driving switch signal TSW3 has a logical value of "1", the switch TS3 in each of the unit selection circuits is in a conductive state as shown in FIG. 12, so that the unit selection circuit UTS2 transmits a driving signal Tsig1 to the corresponding common electrode TL(2), the unit selection circuit UTS3 transmits a driving signal Tsig2 to the corresponding common electrode TL(3), the unit selection circuit UTS4 transmits a driving signal Tsig3 to the corresponding common electrode TL(4) and the unit selection circuit UTS5 transmits a driving signal Tsig4 to the corresponding common electrode TL(5). At this time, each of the unit selection circuits UTS0, UTS1, UTS6 and UTS7 transmits a ground voltage Vs to the corresponding common electrodes TL(0), TL(1), TL(6) and TL(7).

Namely, when the driving switch signal TSW3 has a logical value of "1", driving signals Tsig1 to Tsig4 are supplied to each of the four common electrodes TL(2) to TL(5) disposed in the center to adjoin each other in FIG. 12. At this time, the ground voltage Vs is supplied to each of the four common electrodes TL(0), TL(1) and TL(6), TL(7) disposed on the left side and the right side to adjoin each other in FIG. 12. In other words, different driving signals Tsig1 to Tsig4 are supplied to the common electrodes at every pitch Lp (2 mm pitch) in the center of FIG. 12. Namely, as described in the field of "Driving Status" in FIG. 8, the driving signals are in a state in which they are supplied to the central portion (Partial C) at 2 mm pitch.

At this time, it is possible to set the common electrodes TL(0), TL(1), TL(6) and TL(7) supplied with the ground voltage Vs, as objects of which touch detection driving is not performed.

Figure 13:
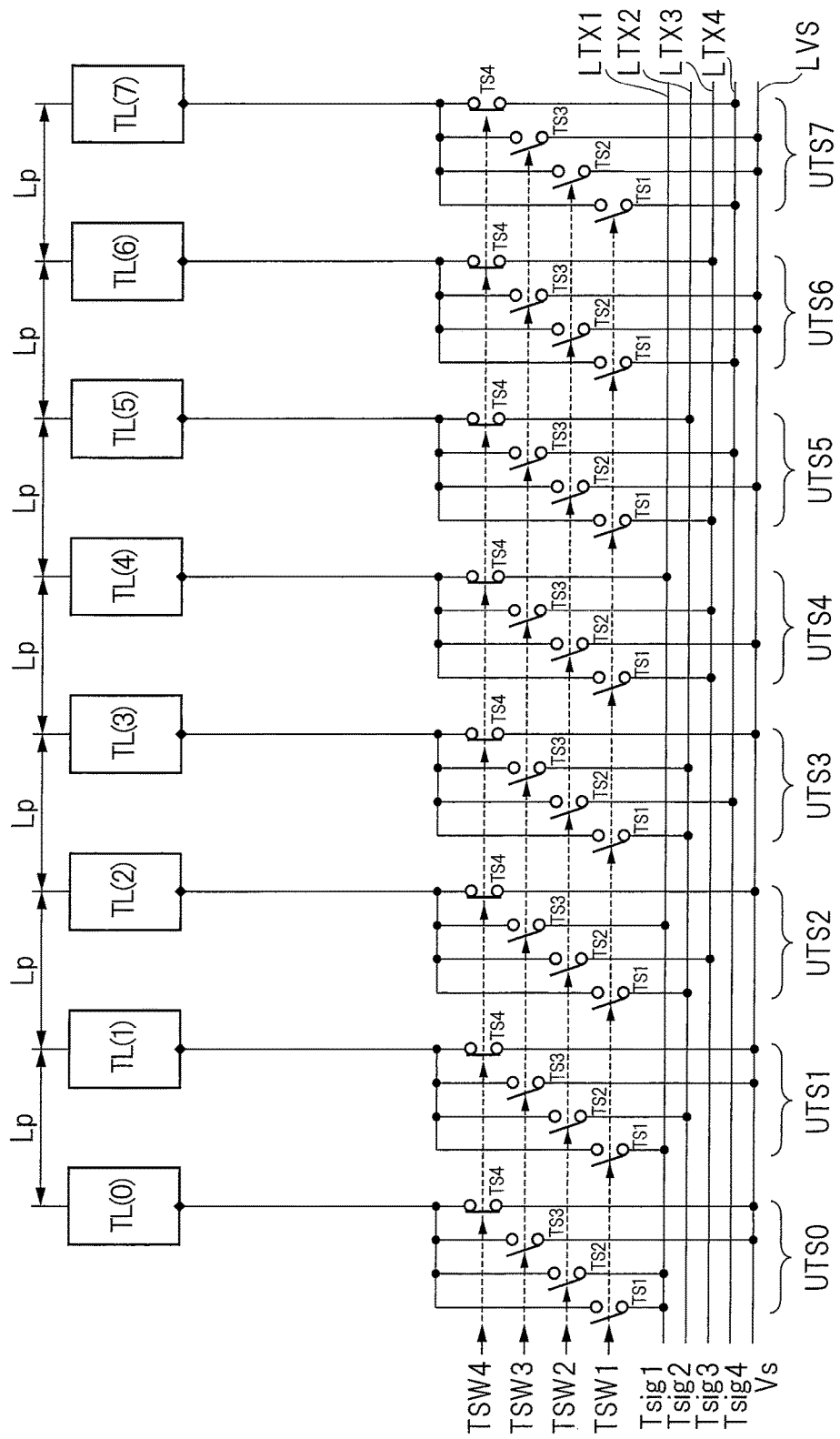
FIG. 13 is a diagram for explaining operations of the selection circuit according to the first embodiment.

Next, when the status signals Status1, Status 2 are "1" and "1", the driving switch signal TSW4 has a logical value of "1" and the remaining driving switch signals TSW1 to TSW3 have a logical value of "0". When the driving switch signal TW4 has a logical value of "1", the switch TS4 in each of the unit selection circuits is in a conductive state as shown in FIG. 13, so that the unit selection circuit UTS4 transmits a driving signal Tsig1 to the corresponding common electrode TL(4), the unit selection circuit UTS5 transmits a driving signal Tsig2 to the corresponding common electrode TL(5), the unit selection circuit UTS6 transmits a driving signal Tsig3 to the corresponding common electrode TL(6) and the unit selection circuit UTS7 transmits a driving signal Tsig4 to the corresponding common electrode TL(7). At this time, each of the unit selection circuits UTS0 to UTS3 disposed on the left side in FIG. 13 transmits a ground voltage Vs to the corresponding common electrodes TL(0) to TL(3).

Namely, when the driving switch signal TSW4 has a logical value of "1", driving signals Tsig1 to Tsig4 are supplied to each of the four common electrodes TL(4) to TL(7) disposed on the right side to adjoin each other in FIG. 13. At this time, the ground voltage Vs is supplied to each of the four common electrodes TL(0) to TL(3) disposed on the left side to adjoin each other in FIG. 13. In other words, different driving signals Tsig1 to Tsig4 are supplied to the common electrodes at every pitch Lp (2 mm pitch) on the right side of FIG. 13. Namely, as described in the field of "Driving Status" in FIG. 8, the driving signals are in a state in which they are supplied to the right side portion (Partial R) at 2 mm pitch.

At this time, it is possible to set the common electrodes TL(0) to TL(3) on the left side portion supplied with the ground voltage Vs, as objects of which touch detection driving is not performed. Namely, in the present invention, it is possible to realize an entire surface detection mode in which the entire surface is roughly detected at a pitch corresponding to two common electrodes (Driving Status of 4 mm pitch), and a partial detection mode in which parts of the panel are detected in details at a pitch corresponding to one common electrode (Driving Status of Partial R, C and L of 2 mm pitch), and the touch detection modes can be switched in accordance with detection results.

Consequently, it is possible to realize both of improving the touch detection speed and maintaining the touch detection accuracy.

During touch detection periods, the semiconductor device for touch 7 first outputs status signals Status1, Status2 having logical values of "0", "0" from the external terminals StP1, StP2. With this arrangement, the driving signals Tsig1 to Tsig4 are in a state in which they can be supplied to the common electrodes TL(0) to TL(7) via the selection circuit TSC including the unit selection circuits UTS0 to UTS7. In this case, in the first embodiment, one driving signal (for example, Tsig1) is supplied to two common electrodes disposed to adjoin each other. Therefore, it is possible to detect whether a vicinity of the common electrode TL(0) and TL(1) is touched by detecting voltage changes in the detection signals Rx(0) to Rx(p) of the detection electrodes RL(0) to RL(p) in response to changes in voltage of the driving signal Tsig1 as it has been explained in FIG. 2.

Similarly, by detecting changes in the detection signals Rx(0) to Rx(p) in response to changes in the voltage of the driving signal Tsig2, it is possible to detect whether a vicinity of the common electrode TL(2) and TL(3) is touched. Further, by detecting changes in the detection signals Rx(0) to Rx(p) in response to changes in the voltage of the driving signal Tsig3, it is possible to detect whether a vicinity of the common electrode TL(4) and TL(5) is touched, and by detecting changes in the detection signals Rx(0) to Rx(p) in response to changes in the voltage of the driving signal Tsig4, it is possible to detect whether a vicinity of the common electrode TL(6) and TL(7) is touched.

This makes it possible to perform detection whether vicinities of common electrodes are touched with respect to common electrodes TL(0) to TL(7) of which the number is larger than that of the external terminals TxP1 to TxP4 of the semiconductor device for touch 7.

In the first embodiment, when it is detected that a position in the vicinity of any of the common electrodes TL(0) to TL(7) has been touched, the following processes are performed depending on detected positions. Namely, from among common electrodes TL(0) to TL(7), it is determined whether the vicinities of common electrodes TL(0) to TL(3) disposed on the left side in FIG. 7 and FIG. 9 are touched, whether the vicinities of common electrodes TL(4) to TL(7) disposed on the right side are touched, or whether the vicinities of common electrodes TL(2) to TL(5) disposed in the center are touched. Such determination can be made based on changes in detection signals Rx(0) to Rx(p) when the driving signals Tsig1 to Tsig4 are supplied to the driving electrodes TL(0) to TL(7) upon setting the switch TS1 in each of the unit selection circuits UTS0 to UTS7 to the conductive state by means of the driving switch signal TSW1.

Namely, when the driving signal Tsig1 or Tsig2 which is a clock signal is supplied via the selection circuit TSC and a voltage change has occurred in the detection signals Rx(0) to Rx(p) which are generated in response thereto, it can be determined that vicinities of the common electrodes TL(0) to TL(3) disposed on the left side in FIG. 7 and FIG. 9 are touched. Further, when the driving signal Tsig3 or Tsig4 which is a clock signal is supplied via the selection circuit TSC and a voltage change has occurred in the detection signals Rx(0) to Rx(p) which are generated in response thereto, it can be determined that vicinities of the common electrodes TL(4) to TL(7) disposed on the right side in FIG. 7 and FIG. 9 are touched. Similarly, when the driving signal Tsig2 or Tsig3 is supplied via the selection circuit TSC and a voltage change has occurred in the detection signals Rx(0) to Rx(p) which are generated in response thereto, it can be determined that vicinities of the common electrodes TL(2) to TL(5) disposed in the center in FIG. 7 and FIG. 9 are touched. Such determination is performed in the semiconductor device for touch 7 supplied with the detection signals Rx(0) to Rx(p).

In this manner, after roughly determining the common electrodes disposed in the vicinity of a touched position, from among the common electrodes TL(0) to TL(7), the semiconductor device for touch 7 defines logical values of the status signals Status1, Status2 in accordance with the determination results.

In the first embodiment, when it is determined that the common electrodes TL(0) to TL(3) disposed on the left side include the common electrodes disposed in the vicinity of a touched position, the semiconductor device for touch 7 sets the logical values of the status signals Status1, Status2 to "1" and "0". With this arrangement, a driving switch signal TSW2 having a logical value of "1" is output from the decoder circuit 20. When the logical value of the driving switch signal TSW2 becomes "1", the unit selection units UTS0 to UTS3 electrically connect the signal wirings LTX1 to LTX4 to the corresponding common electrodes TL(0) to TL(3), and the unit selection units UTS4 to UTS7 electrically connect the corresponding common electrodes TL(4) to TL(7) to the voltage wiring LVS as explained in FIG. 11.

In a state in which the unit selection circuits UTS0 to UTS3 electrically connect the corresponding common electrodes TL(0) to TL(3) to the signal wirings LTX1 to LTX4, the semiconductor device for touch 7 supplies the driving signals Tsig1 to Tsig4 which are clock signals to the signal wirings LTX1 to LTX4, for example, in a sequential manner. The driving signals Tsig1 to Tsig4 are sequentially supplied to the common electrodes TL(0) to TL(3). With this arrangement, by supplying the driving signals Tsig1 to Tsig4 to the detection electrodes RL(0) to RL(p), changes in signals are generated and it is possible to extract the touched position. Namely, by specifying a driving signal, which has caused the changes in signals of the detection signals Rx(0) to Rx(p), from among the four driving signals Tsig1 to Tsig4, it is possible to specify common electrodes disposed in the vicinity of the touched position, and by specifying a detection signal in which the change is generated from among the detection signals Rx(0) to Rx(p), it is possible to specify detection electrodes disposed in the vicinity of the touched position.

Further, when it is determined that the common electrodes TL(2) to TL(5) disposed in the center in FIG. 7 and FIG. 9 include common electrodes disposed in the vicinity of a touched position, the semiconductor device 7 sets the logical values of the status signals Status1, Status2 to "0" and "1". With this arrangement, a driving switch signal TSW3 having a logical value of "1" is output from the decoder circuit 20. When the logical value of the driving switch signal TSW3 becomes "1", the unit selection units UTS2 to UTS5 electrically connect the signal wirings LTX1 to LTX4 to the corresponding common electrodes TL(2) to TL(5), and the unit selection units UTS0, UTS1, UTS6 and UTS7 electrically connect the corresponding common electrodes TL(0), TL(1), TL(6) and TL(7) to the voltage wiring LVS as explained in FIG. 12.

In a state in which the unit selection circuits UTS2 to UTS5 electrically connect the corresponding common electrodes TL(2) to TL(5) to the signal wirings LTX1 to LTX4, the semiconductor device for touch 7 supplies the driving signals Tsig1 to Tsig4 which are clock signals to the signal wirings LTX1 to LTX4, for example, in a sequential manner. The driving signals Tsig1 to Tsig4 are sequentially supplied to the common electrodes TL(2) to TL(5). With this arrangement, by supplying the driving signals Tsig1 to Tsig4 to the detection electrodes RL(0) to RL(p), changes in signals are generated and it is possible to extract the touched position. Namely, by specifying a driving signal, which has caused the changes in signals of the detection signals Rx(0) to Rx(p), from among the four driving signals Tsig1 to Tsig4, it is possible to specify common electrodes disposed in the vicinity of the touched position, and by specifying a detection signal in which the change is generated from among the detection signals Rx(0) to Rx(p), it is possible to specify detection electrodes disposed in the vicinity of the touched position.

Similarly, when it is determined that the common electrodes TL(4) to TL(7) disposed on the right side include common electrodes disposed in the vicinity of a touched position, the semiconductor device 7 sets the logical values of the status signals Status1, Status2 to "1" and "1". With this arrangement, a driving switch signal TSW4 having a logical value of "1" is output from the decoder circuit 20. When the logical value of the driving switch signal TSW4 becomes "1", the unit selection units UTS4 to UTS7 electrically connect the signal wirings LTX1 to LTX4 to the corresponding common electrodes TL(4) to TL(7), and the unit selection units UTS0 to UTS3 electrically connect the corresponding common electrodes TL(0) to TL(3) to the voltage wiring LVS as explained in FIG. 13.

In a state in which the unit selection circuits UTS4 to UTS7 electrically connect the corresponding common electrodes TL(4) to TL(7) to the signal wirings LTX1 to LTX4, the semiconductor device for touch 7 supplies the driving signals Tsig1 to Tsig4 which are clock signals to the signal wirings LTX1 to LTX4, for example, in a sequential manner. The driving signals Tsig1 to Tsig4 are sequentially supplied to the common electrodes TL(4) to TL(7). With this arrangement, by supplying driving signals Tsig1 to Tsig4 to the detection electrodes RL(0) to R1(p), changes in signals are generated and it is possible to extract the touched position. Namely, by specifying a driving signal, which has caused the changes in signals of the detection signals Rx(0) to Rx(p), from among the four driving signals Tsig1 to Tsig4, it is possible to specify common electrodes disposed in the vicinity of the touched position, and by specifying a detection signal in which the change is generated from among the detection signals Rx(0) to Rx(p), it is possible to specify detection electrodes disposed in the vicinity of the touched position.

In this manner, after roughly determining common electrodes disposed in the vicinity of a touched position, detailed determination is performed to specify common electrodes in the first embodiment. In performing detailed determinations, determination is performed such that two common electrodes overlap in the first embodiment. Namely, the common electrodes TL(2) and TL(3) are included in both, when performing detailed determination starting from the common electrodes TL(0) to TL(3) disposed on the left side and when performing detailed determination starting from the common electrodes TL(2) to TL(5) disposed in the center. Similarly, the common electrodes TL(4) and TL(5) are included in both, when performing detailed determination starting from the common electrodes TL(2) to TL(3) disposed in the center and when performing detailed determination starting from the common electrodes TL(4) to TL(7) disposed on the right side. In this manner, by providing overlapping common electrodes when performing detailed determination, it is possible to prevent cases in which no detection is made depending on touched places. Of course, the number of overlapping common electrodes is not limited to two but at least one will do. Further, it is also possible to provide no overlapping electrodes. When no overlapping electrodes are provided, it is possible to further increase the number of common electrodes when the number of driving signals Tsig1 to Tsig4 is the same (four).

Configuration of Main Portions of Liquid Crystal Display

Figure 14:
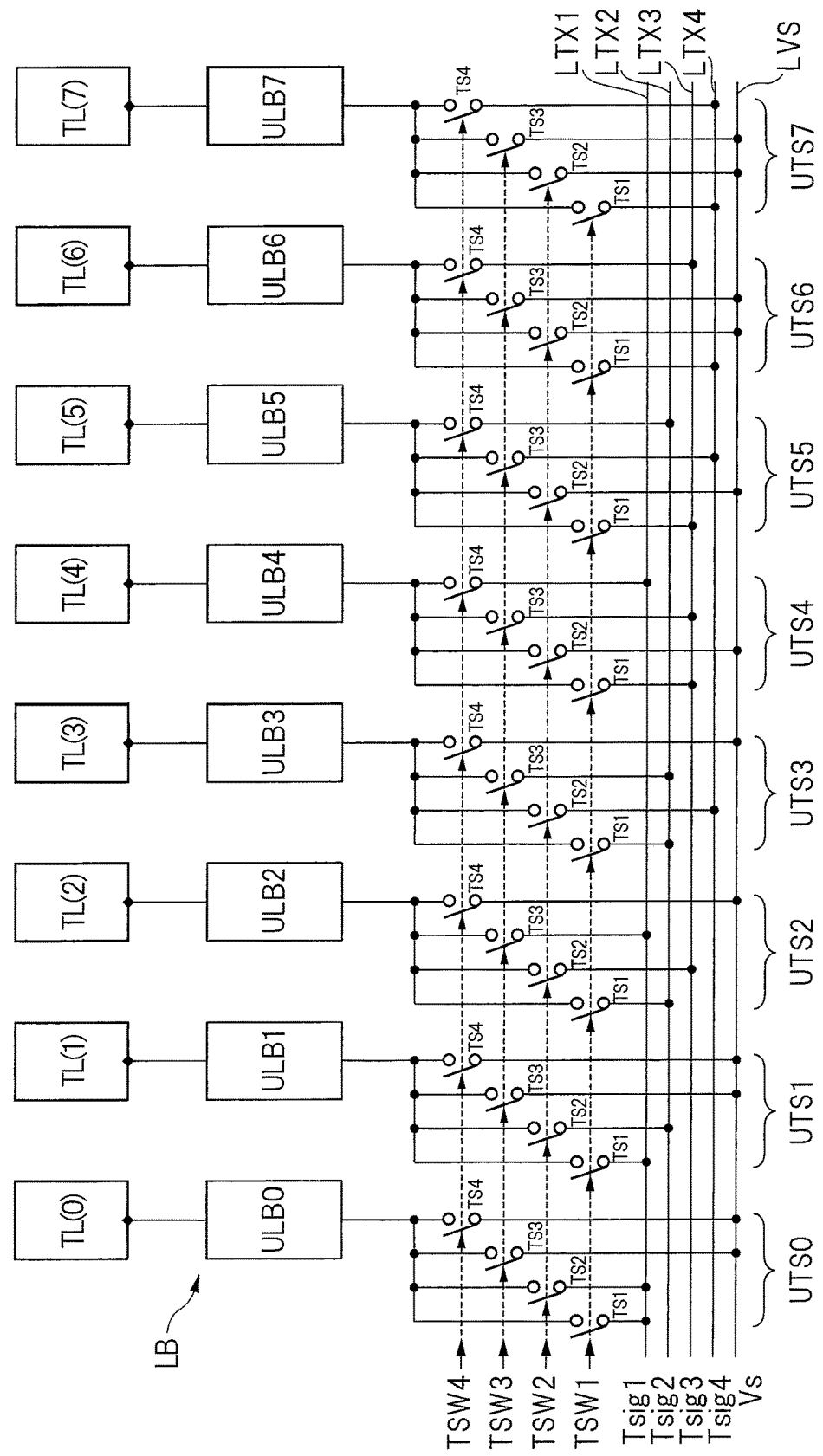
FIG. 14 is a block diagram showing a configuration of the selection circuit, and a level shift and buffer according to the first embodiment.

FIG. 14 is a block diagram showing a configuration of the liquid crystal display 1 according to the first embodiment. FIG. 14 shows, in addition to the selection circuit TSC shown in FIG. 9, a level shift and buffer LB connected between the common electrodes TL(0) to TL(7) and the selection circuit TSC. The level shift and buffer LB drives the common electrodes TL(0) to TL(7) through either alternating current or direct current in accordance with driving signals supplied from the selection circuit TSC. In performing driving, the voltage of the supplied driving signals is converted before supply. Further, a buffer is included to improve the drive capability such that the common electrodes TL(0) to TL(7) disposed to extend in the longitudinal direction in the drawing can be driven.

Though not particularly limited, the selection circuit TSC and the level shift and buffer LB are included in the driving electrode driver 12 shown in FIG. 1 and are formed on the TFT substrate 300 such that they are covered by the semiconductor device for driver 506 shown in FIG. 7. Also the level shift and buffer LB is composed of a plurality of unit level shift and buffers (hereinafter referred to as "unit buffers") ULB0 to ULBp, and each of the unit buffers ULB0 to ULBp is in a one-to-one correspondence with the unit selection circuits UTS0 to UTSp and the common electrodes TL(0) to TL(p). For example, the unit buffer TLB0 corresponds to the unit selection circuit UTS0 and the common electrode TL(0), and the unit buffer TLB7 corresponds to the unit selection circuit UTS7 and the common electrode TL(7). In FIG. 14, from among the unit buffers ULB0 to ULBp, only the unit buffers ULB0 to ULB7 corresponding to the unit selection circuits UTS0 to UTS7 and the common electrodes TL(0) to TL(7) are shown.

Each of the unit buffers ULB0 to ULBp has a mutually similar configuration. While the configuration of the unit buffer will be explained later using FIG. 15, each of the unit buffers ULB0 to ULBp receives driving signals from the corresponding unit selection circuits UTS0 to UTSp and drives the corresponding common electrodes TL(0) to TL(p) in accordance with the driving signals. With respect to common electrodes for which touch is to be detected, driving signals which are clock signals are supplied to unit buffers from the corresponding unit selection circuits, so that the unit buffers will drive the common electrodes through alternating current. On the other hand, with respect to common electrodes for which touch is not to be detected, a ground voltage Vs, for example, is supplied from the corresponding unit selection circuits to the unit buffers, so that the unit buffers will supply direct current voltage (ground voltage Vs) to the corresponding common electrodes.

Since the unit selection circuits UTS0 to UTS7 shown in FIG. 14 are identical to the unit selection circuits shown in FIG. 9, explanation thereof will be omitted.

Though not particularly limited, in the first embodiment, the signal wirings LTX1 to LTX4 transmitting the driving signals Tsig1 to Tsig4 (FIG. 7) and the signal wirings transmitting the driving switch signals TSW1 to TSW4 are used also for examining the liquid crystal display 1. Namely, the signal wirings are used for both examination and touch detection. This makes it possible to control increases in areas due to increases in the number of signal wirings.

Though not particularly limited, when examining the liquid crystal display 1, the control unit 9 (FIG. 1) supplies switch signals for examination TTW1 to TTW4 (not shown), instead of the driving switch signals TSW1 to TSW4, to the switches TS1 to TS4 within the unit selection circuits UTS0 to UTSp. Further, when performing examination, the control unit 9 supplies examining signals for examination, instead of the driving signals Tsig1 to Tsig4, to the signal wirings LTX1 to LTX4. When performing examination, a logical value of any one of the switch signals for examination TTW1 to TTW4 is set to be, for example, "1" to set any one of the switches TS1 to TS4 in a conductive state. This makes it possible to supply examining signals to the common electrodes via the switch in the conductive state. Further, the examining signals can also be supplied to the signal lines SL(0) to SL(p) instead of the common electrodes. When the examining signals are supplied to the signal lines SL(0) to SL(p), it will be possible to perform examinations whether displays in accordance with the examining signals are displayed on the liquid crystal display 1 or not at the time of examination.

Configuration of Liquid Crystal Display

Figure 15:
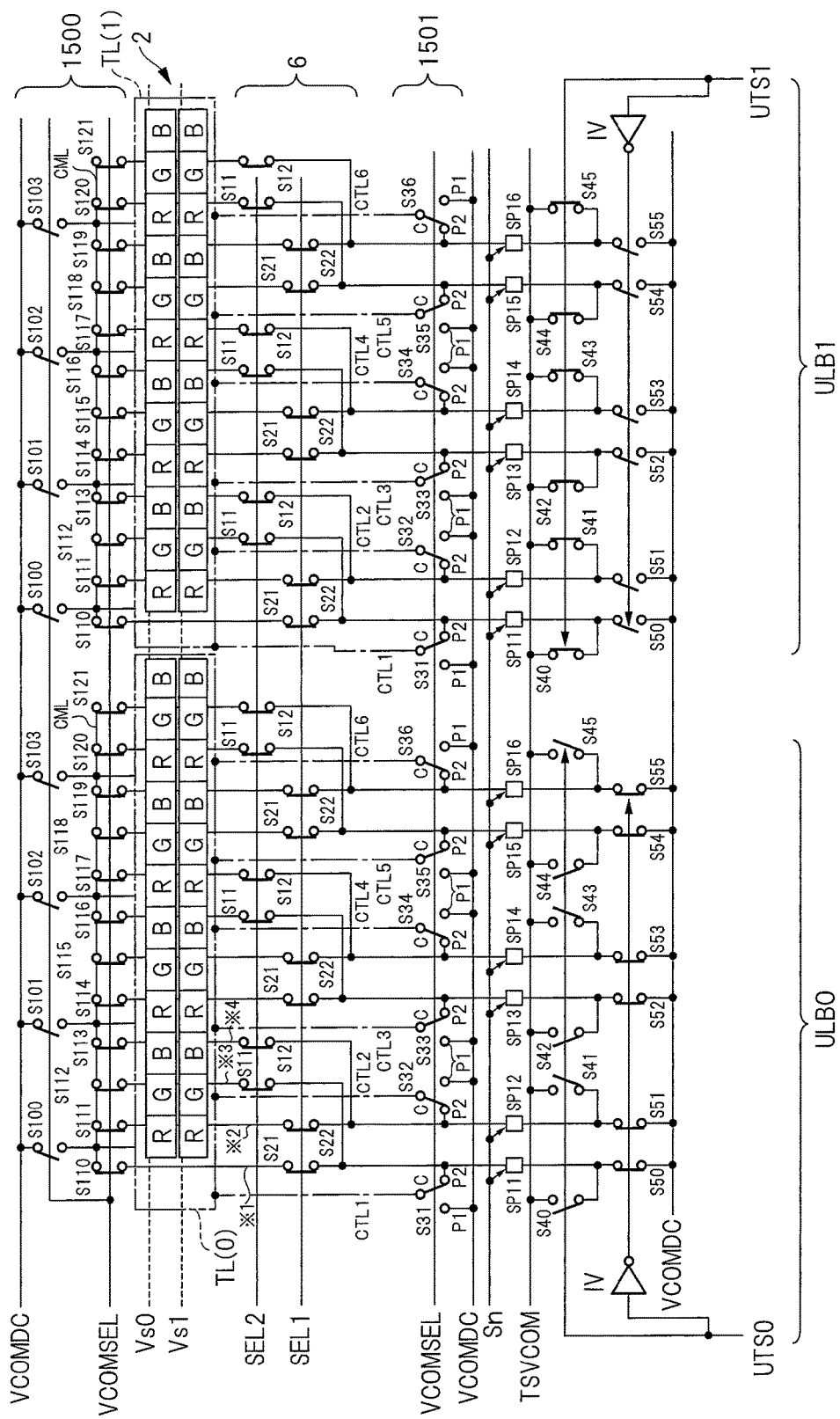
FIG. 15 is a block diagram showing a configuration of main portions of the liquid crystal display according to the first embodiment.

FIG. 15 is a block diagram showing main portions of the liquid crystal display 1. In the drawing, details of the unit buffers ULB0, ULB1 explained in FIG. 14 are shown. Further, FIG. 15 schematically shows a portion of the liquid crystal panel 2 related to the unit buffers ULB0, ULB1 and a portion of the signal line selector 6. Though in a schematic form, the arrangements of the liquid crystal panel 2, the signal line selector 6 and the unit buffers ULB0, ULB1 are illustrated to match the actual arrangements in FIG. 15. Further, though the illustration has been omitted in FIG. 1, a first display/touch detection switch circuit 1500 and a second display/touch detection switch circuit 1501 are shown in FIG. 15.

The first display/touch detection switch circuit 1500 is disposed on one end side of each of the common electrodes TL(0) to TL(p) extending along the column, and the second display/touch detection switch circuit 1501 is disposed on the other end side of each of the extending common electrodes TL(0) to TL(p). Namely, the first display/touch detection switch circuit 1500 and the second display/touch detection switch circuit 1501 are disposed such that the common electrodes TL(0) to TL(p) are interposed between. The first display/touch detection switch circuit 1500 and the second display/touch detection switch circuit 1501 include a plurality of switches which are controlled by control signals VCOMSEL, and a predetermined voltage VCOMDC is supplied to each of the common electrodes TL(0) to TL(p) during display periods, while the common electrodes and signal lines SL(i) are electrically connected during touch detection periods. With this arrangement, during the display periods, a predetermined voltage VCOMDC is supplied to the common electrodes extending in the column direction from both ends thereof, so that it is possible to suppress fluctuations in voltages of the common electrodes during the display periods. Further, during the touch detection periods, signal lines and common electrodes are electrically connected in parallel, so that it is possible to reduce propagation delays of driving signals at the common electrodes.

Here, though not particularly limited, the control signals VCOMSEL are formed by the control unit 9 (FIG. 1). For example, the control unit 9 sets a logical value of the control signals VCOMSEL to "1" (high level) during the touch detection periods, while setting a logical value of the control signals VCOMSEL to "0" (low level) during the display periods. In this manner, since the control signals VCOMSEL are also control signals for discriminating the display periods and the touch detection periods, they can also be regarded as touch-display synchronizing signals similarly to the touch-display synchronizing signals TSHD.

The first display/touch detection switch circuit 1500 includes a plurality of first switch circuits (not shown), and the second display/touch detection switch circuit 1501 also includes a plurality of second switch circuits (not shown). While one example of a configuration of each of the first switch circuits and second switch circuits will be explained later, they are in one-to-one correspondence with each of the common electrodes TL(0) to TL(p).

In order to make the drawing easy to see, liquid crystal elements of two rows disposed in columns corresponding to unit buffers ULB0, ULB1 from among the plurality of liquid crystal elements disposed in the liquid crystal element array LCD (FIG. 6) are shown in FIG. 15. Namely, the liquid crystal elements of two rows supplied with scanning signals Vs0, Vs1 are shown.

In the first embodiment, one common electrode is disposed for four pixels disposed in the horizontal direction (row direction in the liquid crystal element array LCD) in FIG. 15. Each of "R", "G" and "B" described in FIG. 15 denotes sub-pixels. Accordingly, the common electrode TL(0) corresponds to four groups of "R", "G" and "B" on the left side in FIG. 15 and extends in the longitudinal direction (column direction in the liquid crystal element array LCD) in the drawing. Similarly, the common electrode TL(1) corresponds to the four groups of "R", "G" and "B" on the right side in FIG. 15 and extends in the longitudinal direction (column direction).

In FIG. 15, SP11 to SP16 denote terminals of the signal line driver 11 within the driving circuit 10 shown in FIG. 1. As shown in FIG. 15, there are a plurality of sets of terminal groups SP11 to SP16 of the signal line driver 11, and each of the sets of terminal groups SP11 to SP16 corresponds to a plurality of pixel columns corresponding to one common electrode, namely, four disposed in the row direction correspond to a plurality of pixels extending in the column direction. For example, in FIG. 15, the set of the terminal groups SP11 to SP16 shown on the left side corresponds to the plurality of pixels corresponding to the common electrode TL(0). Image signals Sn are supplied from the control unit 9 to the plurality of sets of the terminal groups SP11 to SP16 in a time-sharing manner. In this respect, while the image signals Sn are shown as one signal in FIG. 15 for avoiding complicated illustration, it should be understood that there are a plurality of signal lines so as to substantially enable simultaneous supply of a plurality of image signals.

Each of the common electrodes TL(0) to TL(p) is connected to the plurality of sets of terminals groups SP11 to SP16 or to the predetermined voltage VCOMDC via the second display/touch detection switch circuit 1501. The second unit switch circuits included in the second display/touch detection switch circuit 1501 are in one-to-one correspondence with the common electrodes TL(0) to TL(p) and have mutually similar configurations. FIG. 15 shows two second unit switch circuits each corresponding to the common electrode TL(0) and common electrode TL(1). Each of the second unit switch circuits includes switches S31 to S36 having a common node C, a first input/output node P1 and a second input/output node P2.

Control signals VCOMSEL are supplied to each of the switches S31 to S36, and when the control signals VCOMSEL have a logical value of "1", the common nodes C are connected to the input/output nodes P2 and when the control signals VCOMSEL have a logical value of "0", the common nodes C are connected to the input/output nodes P1. The input/output nodes P1 of the switches S31 to S36 are connected to voltage wirings supplied with the predetermined voltage VCOMDC, and the input/output nodes P2 are connected to terminals within corresponding terminal groups SP11 to SP16. The common nodes C of the switches S31 to S36 are connected to corresponding common electrodes TL(0) to TL(p) via signal wirings CLT1 to CTL6. Explaining the case of the common electrode TL(0) shown in FIG. 15 as an example, there are shown two second unit switch circuits in FIG. 15, and the common nodes C of each of the switches S31 to S36 included in the second unit switch circuit shown on the left side are connected to the common electrode TL(0) via the signal wirings CTL1 to CTL6.

Further, the first input/output nodes P1 of each of the switches S31 to S36 included in the second unit switch circuit shown on the left side are connected to voltage wirings supplied with the predetermined voltage VCOMDC. On the other hand, the second input/output nodes P2 of each of the switches S31 to S36 are connected to the terminal groups SP11 to SP16 shown on the left side in FIG. 15. Similarly, also for the remaining second unit switch circuits, corresponding common electrodes are connected to the voltage wirings supplied with the predetermined voltage VCOMDC or to the corresponding terminal groups SP11 to SP16 in accordance with the logical value of the control signals VCOMSEL.

FIG. 15 shows the configuration of unit buffers ULB0, ULB1 as leading examples from among the unit buffers ULB0 to ULB7 shown in FIG. 14. Since each of the unit buffers ULB0 to ULB7 has the same configuration, the configuration will be explained taking the unit buffer ULB0 as an example. The unit buffer ULB0 includes an inverter circuit IV, switches S40 to S45 and switches S50 to S55. The inverter circuit IV and the switches S40 to S45 are supplied with outputs from the unit selection circuit UTS0 which is in one-to-one correspondence with the unit buffer ULB0, and the switches S50 to S55 are supplied with outputs from the inverter circuit IV are supplied.

Each of the switches S40 to S45 includes a pair of nodes, and the pair of the nodes is made conductive or non-conductive in accordance with logical values from the corresponding unit selection circuit UTS0. Each of the switches S50 to S55 also includes a pair of nodes, and the pair of the nodes is made conductive or non-conductive in accordance with logical values from the inverter circuit IV. Namely, the switches S40 to S45 and switches S50 to S55 are complementarily made to be in conductive states or non-conductive states in accordance with outputs from the corresponding unit selection circuit UTS0.

Here, one node of each of the switches S40 to S45 is connected to the voltage wiring supplied with the predetermined voltage TSVCOM while the other node is connected to the terminal within the corresponding terminal groups SP11 to SP16. Further, one node of each of the switches S50 to S55 is connected to the voltage wiring supplied with the predetermined voltage VCOMDC while the other node is connected to the terminal within the corresponding terminal groups SP11 to SP16. For example, taking the unit buffer ULB0 as an example, the other nodes of each of the switches S40 to S45 and S50 to S55 are connected to the terminals within the terminal groups SP11 to SP16 to which the common electrode TL(0) corresponding to the unit buffer ULB0 is connected via the second display/touch detection switch circuit 1501 during touch detection periods. In this respect, during display periods, image signals are supplied to the terminal groups SP11 to SP16 from the semiconductor device for driver 506, and the predetermined voltage VCOMDC is supplied to the common electrode TL(0) via the second display/touch detection switch circuit 1501. Namely, the signal lines and the terminal groups SP11 to SP16 are used for both touch detection and display.

During touch detection periods, driving signals which are clock signals are supplied from the corresponding unit selection circuit UTS0 to the unit buffer ULB0 as outputs of the unit selection circuit UTS0. With this arrangement, the switches S40 to S45 and switches S50 to S55 will complementarily become conductive/non-conductive in accordance with the driving signals during the touch detection periods. Consequently, the predetermined voltage TSVCOM and the predetermined voltage VCOMDC will be alternately supplied to the common electrode TL(0) during the touch detection periods. On the other hand, during the touch detection periods, when no touch is detected in the vicinity of the common electrode TL(0), the ground voltage Vs is supplied from the corresponding unit selection circuit UTS0 to the unit buffer ULB0. Therefore, outputs from the unit selection circuit UTS0 are phase inverted by the inverter circuit IV and supplied to the switches S50 to S55. With this arrangement, the switches S50 to S55 is in a conductive state and the predetermined voltage VCOMDC is supplied to the corresponding common electrode TL(0).

Also for the remaining unit buffers ULB1 to ULBp, driving signals which are clock signals are similarly supplied from corresponding unit selection circuits when detecting touch in vicinities of common electrodes during touch detection periods, signals are supplied to corresponding common electrodes with voltage amplitudes changing between the predetermined voltages TSVCOM and TCOMCD. When no touch is detected in vicinities of common electrodes, outputs of the ground voltage Vs are supplied from corresponding unit selection circuits, so that the predetermined voltage VCOMDC is supplied to corresponding common electrodes.

In the first embodiment, it is possible to supply driving signals which are clock signals upon selecting common electrodes instead of sequentially supplying driving signals which are clock signals to common electrodes which are successively disposed as explained in FIG. 9 to FIG. 13.

Further, though not particularly limited, the predetermined voltage VCOMDC is, for example, the ground voltage Vs, and the predetermined voltage TSVCOM is defined to be a voltage exceeding 0V and not more than, for example, 6V. Therefore, during touch detection periods, the driving signals which voltage changes between the ground voltage Vs and a voltage of, for example, 6V are supplied to the common electrodes used for detecting whether the vicinities are touched or not.

The signal line selector 6 includes a plurality of sets of switches S11, S12 and switches S21, S22 which are ON/OFF controlled through selection signals SEL1, SEL2 from the control unit 9. The switches S11, S12 and switches S21, S22 are controlled to become complementarily ON and OFF when displaying images on the display panel 2. Namely, when the switches S11, S12 are made to be in ON states by the selection signals SEL1, the switches S21, S22 are made to be in OFF states by the selection signals SEL2. On the contrary, when the switches S21, S22 are made to be in ON states, the switches S11, S12 are made to be in OFF states.

Image signals supplied to the terminals SP11 to SP16 in a time-sharing manner are supplied to suitable signal lines by the switches S11, S12 and switches S21, S22. For example, the terminal SP11 shown on the leftmost side in the drawing is supplied with image signals which are to be supplied to the sub-pixel SPix (R) of one specified pixel and image signals which are to be supplied to the sub-pixel SPix (B) of the one pixel in a time-sharing manner. Further, the terminal SP12 next to the terminal SP11 is supplied with image signals which are to be supplied to the sub-pixel SPix (G) of the one pixel and image signals which are to be supplied to the sub-pixel SPix (R) of a pixel adjoining the one pixel on the right in a time-sharing manner. When the switches S21 and S22 are made to be in ON states by the selection signals SEL2 while the switches S11 and S12 are made to be in OFF states by the selection signals SEL1, image signals supplied to the terminal SP11 are supplied to the signal line SL(0)0(R) while the image signals supplied to the terminal SP12 are supplied to the signal line SL(0)0(G) via the switch S22.

Next, when the switches S11 and S12 are made to be in ON states by the selection signals SEL1 while the switches S21 and S22 are made to be in OFF states by the selection signals SEL2, image signals supplied to the terminal SP11 are supplied to the signal line SL(0)0(B) and while the image signals supplied to the terminal SP12 are supplied to the signal line SL(0)1(R).

With this arrangement, the image signals of three sub-pixels corresponding to one pixel are supplied to the signal lines SL(0)0(R), SL(0)0(G) and SL(0)0(B). Further, the image signals are supplied also to the signal line SL(0)1(R) adjoining on the right. As shown in FIG. 6, the signal line selector 6 is disposed in the vicinity of the liquid crystal panel 2. Since the image signals are supplied from the driving circuit 10 to the signal line selector 6 in a time-sharing manner, it is possible to reduce the number of signal wirings. In other words, it is possible to increase the width of the signal wirings, and thereby to reduce delays of the image signals in the signal wirings. In this respect, for avoiding complicated illustration, the signal line SL(0)0(R) is denoted as □1, the signal line SL(0)0(G) is denoted as □2, the signal line SL(0)0(B) is denoted as □3 and the signal line SL(0)1(R) is denoted as □4 in FIG. 15.

Each of the plurality of first switch circuits included in the first display/touch detection switch circuit 1500 is in one-to-one correspondence with each of the common electrodes TL(0) to TL(p). From among the plurality of first switch circuits, only the first switch circuits corresponding to the common electrodes TL(0), TL(1) are shown in FIG. 15. Since the plurality of first switch circuits have mutually identical configuration, the configuration and operations will be explained using the first switch circuit corresponding to the common electrode TL(0) as a leading example. The first switch circuit corresponding to the common electrode TL(0) includes switches S100 to S103 and switches S110 to S121 which are switch controlled through control signals VCOMSEL, and a common wiring CML.

The common wiring CML is connected to the corresponding common electrode TL(0). Each of the switches S100 to S103 is connected in parallel between the voltage wirings supplied with the predetermined voltage VCOMDC and the common wirings. Further, each of the switches S110 to S121 is connected between the common wiring CML and the corresponding signal wirings. For example, the switch 110 is connected between the common wiring CML and the signal line SL(0)0(R), the switch 111 is connected between the common wiring CML and the signal line SL(0)0(G), the switch 112 is connected between the common wiring CML and the signal line SL(0)0(B), and switch 113 is connected between the common wiring CML and the signal line SL(0)1(R).

The switches S100 to S103 and switches S110 to S121 are controlled such that they are complementarily made conductive/non-conductive through control signals VCOMSEL. In this case, during touch detection periods, control is performed such that each of the switches S110 to S121 is in a conductive state while each of the switches S100 to S103 are in a non-conductive state. On the other hand, during display periods, control is performed such that each of the switches S110 to S121 is in a non-conductive state while each of the switches S100 to S103 are in a conductive state. With this arrangement, during the touch detection periods, the signal lines are connected to the common wiring CML via each of the switches S110 to S121, and a plurality of signal lines and the common electrode TL(0) are electrically connected at one end portion of the common electrode TL(0), so that it is possible to suppress propagation delays of driving signals at the common electrode TL(0). Further, during the display periods, the predetermined voltage VCOMDC is supplied to the common electrode TL(0) via each of the switches S100 to S103, so that it is possible to suppress voltage fluctuations of the common electrode TL(0).

According to the first embodiment, it is possible to reduce the number of external terminals TxP1 to TxP4 for outputting driving signals provided at the semiconductor device for touch 7, as compared to the number of common electrodes TL(0) to TL(p) disposed on the display panel 2. This makes it possible to achieve downsizing of the liquid crystal display. Further, since it is possible to supply driving signals to any common electrodes through the status signals Status1, Status2 and driving signals Tsig1 to Tsig4, it is possible to perform detailed detection in accordance with detection results after rough detection.

Second Embodiment

A touch detection method different from that of the first embodiment is employed in the liquid crystal display 1 with touch detection functions according to the second embodiment. A principle of the touch detection method employed in the second embodiment will first be explained.

Basic Principle of Electrostatic Capacity Type Touch Detection (Self-Capacity Method)

Figure 16A:
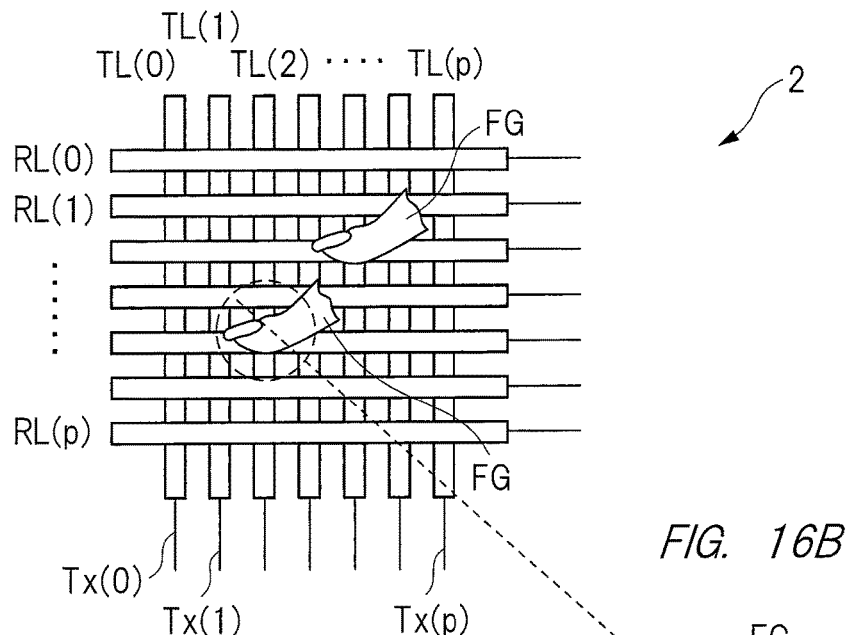
FIG. 16A to FIG. 16C are explanatory views for explaining a basic principle of electrostatic capacity type touch detection (self-capacity method)
Figure 16B:
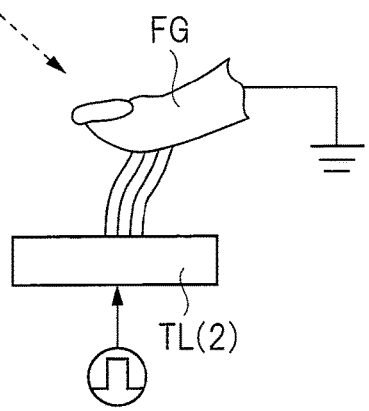
Figure 16C:
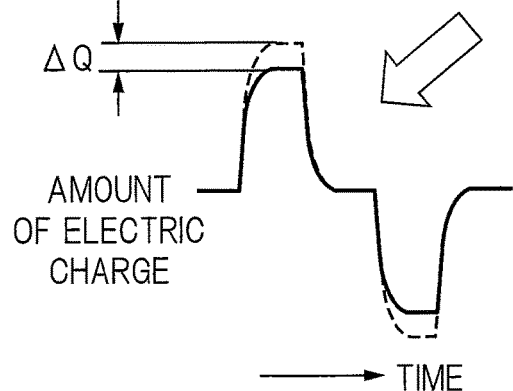

FIG. 16A to FIG. 16C are explanatory views for explaining the basic principle of touch detection of self-capacity method. In FIG. 16A, TL(0) to TL(p) are the common electrodes respectively extending in the column direction and disposed in parallel in the row direction, and RL(0) to RL(p) are the detection electrodes respectively disposed to intersect with the common electrodes TL(0) to TL(p). The detection electrodes RL(0) to RL(p) respectively extend in the row direction and are disposed in parallel in the column direction to intersect with the common electrodes TL(0) to TL(p). Further, while the common electrodes TL(0) to TL(p) and the detection electrodes RL(0) to RL(p) appear to be intersected with each other when seen in a plan view, an insulating layer is interposed between the common electrodes TL(0) to TL(p) and the detection electrodes RL(0) to RL(p) such that they do not electrically contact each other.

Here, while TL(0) to TL(p) are defined to be common electrodes and RL(0) to RL(p) are defined to be detection electrodes for the sake of explanation, driving signals are supplied to each of the common electrodes TL(0) to TL(p) and the detection electrodes RL(0) to RL(p), and detection signals are output from the common electrodes TL(0) to TL(p) and the detection electrodes RL(0) to RL(p). Therefore, in view of the aspect of detecting touch of external objects, both of the common electrodes TL(0) to TL(p) and the detection electrodes RL(0) to RL(p) can be regarded as detection electrodes.

In touch detection of self-capacity type, the detection principle using the common electrodes TL(0) to TL(p) and the detection principle using the detection electrodes RL(0) to RL(p) are the same. Hereinafter, in the explanations of FIGS. 16B and 16C, both of the common electrodes TL(0) to TL(p) and the detection electrodes RL(0) to RL(p) are altogether referred to as detection electrodes.

In each of the detection electrodes (common electrodes TL(0) to TL(p) and detection electrodes RL(0) to RL(p)), parasitic capacity exists between the detection electrodes and the ground voltage. When, for example, a finger FG as an external object touches vicinities of the detection electrodes, an electric field is generated between the detection electrodes and the finger FG as shown in FIG. 16B. In other words, with the finger FG approaching, the capacity connected between the detection electrodes and the ground voltage increases. Therefore, when driving signals of which voltage changes in a pulse-like manner are supplied to the detection electrodes, the amount of electric charge accumulated between the detection electrodes and the grounding voltage changes depending on whether the finger FG is touching vicinities of detection electrodes or not as indicated by the circle in FIG. 16B.

FIG. 16C shows changes in the amount of electric charge accumulated in the detection electrodes depending on whether the finger FG is touching the vicinities of detection electrodes or not. Since the capacity connected to the detection electrodes increases when the finger FG has touched vicinities of detection electrodes, when pulse-like driving signals are supplied to the detection electrodes, the amount of electric charge accumulated in the detection electrodes increases by ΔQ when compared to a case of no touch. In FIG. 16C, the horizontal axis indicates time while the longitudinal axis indicates the amount of electric charge. Further, the broken line in FIG. 16C indicates changes in the amount of electric charge in a case of touch. When the driving signals are supplied to the detection electrodes, it is possible to detect whether the finger FG is touching the vicinities of detection electrodes or not by detecting the difference ΔQ in the amount of electric charge accumulated in the detection electrodes.

Configuration of Touch Control Device

Figure 17:
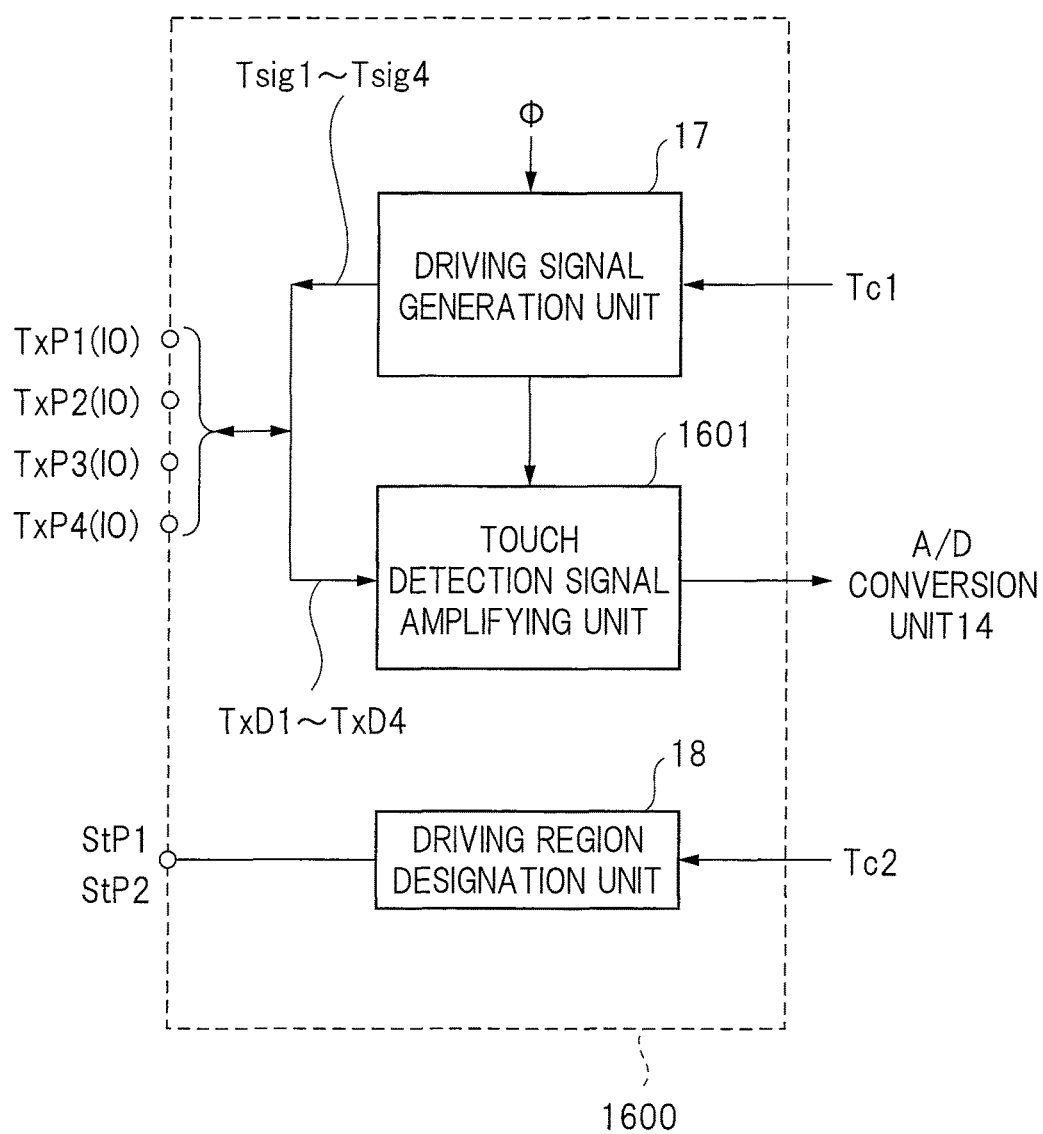
FIG. 17 is a block diagram showing a configuration of a touch control device according to a second embodiment.

FIG. 17 is a block diagram showing the configuration of the touch control device (semiconductor device for touch). FIG. 17 shows only portions different from those of the touch control device (semiconductor device for touch) 7 shown in FIG. 1. In the semiconductor device for touch 1600 according to the second embodiment, a touch detection signal amplifying unit 1601 is provided instead of the touch detection amplifying unit 13 shown in FIG. 1. The A/D conversion unit 14, the signal processing unit 15, the coordinate extraction unit 16, the driving signal generation unit 17, the driving region designation unit 18 and the control unit 19 as shown in FIG. 1 are identical to those of the first embodiment. Therefore, illustration of the A/D conversion unit 14, the signal processing unit 15, the coordinate extraction unit 16 and the control unit 19 is omitted in FIG. 16. Further, in FIG. 17, each of TxP1(IO) to TxP4(IO) denotes an external terminal. While four external terminals TxP1 to TxP4 as shown in FIG. 7 are provided also in the first embodiment, in the second embodiment, the four external terminals TxP1(IO) to TxP4(IO) are external terminals (common terminals) common to input and output. Namely, the external terminals TxP1(IO) to TxP4(IO) function as external terminals for input and also function as external terminals for output.

Though illustration thereof is omitted in FIG. 1, control signals Tc1, Tc2 which are supplied from the control unit 19 to the driving signal generation unit 17 and the driving region designation unit 18 are shown in FIG. 17. Further, it is also shown that clock signals ☐ are supplied to the driving signal generation unit 17. The driving signal generation unit 17 forms driving signals Tsig1 to Tsig4 in accordance with the control signals Tc1 from the control unit 19. Namely, the clock signals ☐☐ are formed as the driving signals Tsig1 to Tsig4 designated by the control signals Tc1. More particularly, when the driving signals Tsig1 are designated by the control signals Tc1, the clock signals ☐ are formed as the driving signals Tsig1, and when the driving signals Tsig2 are designated by the control signals Tc1, the clock signals ☐ are formed as the driving signals Tsig2. Similarly, when the driving signals Tsig3 are designated by the control signals Tc1, the clock signals ☐ are formed as the driving signals Tsig3, and when the driving signals Tsig4 are designated by the control signals Tc1, the clock signals ☐ are formed as the driving signals Tsig4. In this case, as for the driving signals which have not been designated, the driving signals are made to be, for example, the ground voltage Vs. Further, when each of the driving signals Tsig1 to Tsig4 has been designated by the control signals Tc1, the driving signal generation unit 17 forms the clock signals ☐ as the driving signals Tsig1 to Tsig4.

The driving signals Tsig1 to Tsig4 formed by the driving signal generation unit 17 are supplied to the external terminals TxP1(IO) to TxP4(IO), and are output from the external terminals TxP1(IO) to TxP4(IO). Namely, during this period, the external terminals TxP1(IO) to TxP4(IO) function as output terminals.

The touch detection signal amplifying unit 1601 receives the detection signals TxD1 to TxD4 from the signal wirings LTX1 to LTX4 via the external terminals TxP1(IO) to TxP4(IO), amplifies changes in electric charge generated depending on whether vicinities of the common electrodes are touched or not as changes in voltage and outputs the signals to the A/D conversion unit 14 shown in FIG. 1.

Namely, during this period, the external terminals TxP1(IO) to TxP4(IO) function as input terminals.

The external terminal TxP1(IO) functions as an output terminal for outputting driving signals Tsig1 and as an input terminal for receiving detection signals TxD1, and the external terminal TxP2(IO) functions as an output terminal for outputting driving signals Tsig2 and as an input terminal for receiving detection signals TxD2. Similarly, the external terminal TxP3(IO) functions as an output terminal for outputting driving signals Tsig3 and as an input terminal for receiving detection signals TxD3, and the external terminal TxP4(IO) functions as an output terminal for outputting driving signals Tsig4 and as an input terminal for receiving detection signals TxD4. Namely, in the second embodiment, the number of external terminals TxP1(IO) to TxP4(IO) for outputting driving signals is four, and the number of external terminals TxP1(IO) to TxP4(IO) receiving detection signals is also four. While the external terminals TxP1(IO) to TxP4(IO) are defined to be input/output terminals in FIG. 17, it is also possible to provide each four of external terminals for output and external terminals for input.

The driving region designation unit 18 forms the status signals Status1, Status2 as explained in FIG. 8 in accordance with control signals Tc2 supplied from the control unit 19 and outputs them from the external terminals StP1, StP2.

The external terminal TxP1(IO) is connected to the signal wiring LTX1 shown in FIG. 14, the external terminal TxP2(IO) is connected to the signal wiring LTX2, the external terminal TxP3(IO) is connected to the signal wiring LTX3 and the external terminal TxP4(IO) is connected to the signal wiring LTX4. Further, the external terminals StP1 and StP2 are connected to the decoder circuit 20 (FIG. 7) similarly to the first embodiment, and the status signals Status1, Status2 formed by the driving region designation unit 18 are decoded by the decoder circuit 20. Through this decoding, driving switch signals TSW1 to TSW4 are formed similarly to the first embodiment, and as shown in FIG. 7, the driving switch signals TSW1 to TSW4 are supplied to the switches TS1 to TS4 of each of the unit selection circuits UTS0 to UTS7 as switch control signals.

Configuration of Liquid Crystal Device

In the second embodiment, the configuration of the level shift and buffer LB (FIG. 14) is different from that of the first embodiment. Namely, the configuration of the plurality of unit buffers included in the level shift and buffer LB is different from that of the first embodiment.

Figure 18:
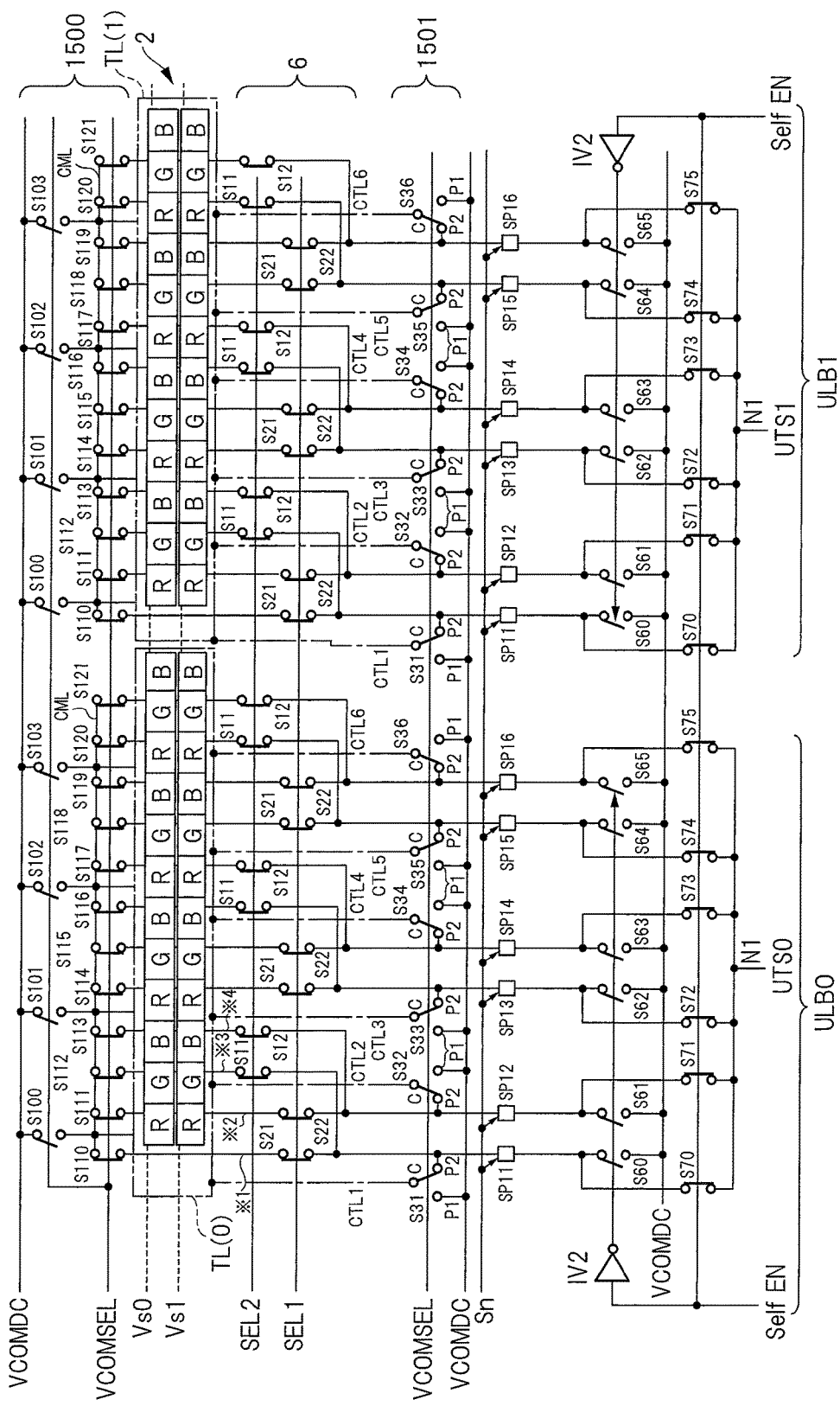
FIG. 18 is a block diagram showing a configuration of main portions of a liquid crystal display according to the second embodiment.

FIG. 18 is a block diagram showing main portions of the liquid crystal display 1 according to the second embodiment. Similarly to FIG. 15, FIG. 18 shows the configuration of the unit buffer shown in FIG. 14 in more details. The main portions of the liquid crystal display shown in FIG. 18 are similar to the main portions of the liquid crystal display shown in FIG. 15. Therefore, portions different from those of FIG. 15 will be mainly explained here and explanations of the same portions will be generally omitted.

The difference between FIG. 15 and FIG. 18 is the configuration of the plurality of unit buffers included in the level shift and buffer LB. Further, in the second embodiment, touch detection of self-capacity method is employed, the external terminals TxP1(IO) to TxP4 (IO) of the semiconductor device for touch 7 are input/output terminals, and driving signals Tsig1 to Tsig4 are supplied to the signal wirings LTX1 to LTX4 from the external terminals TxP1 (IO) to TxP4 (IO) during touch detection periods. Changes in voltage of the common electrodes of which the vicinities are touched in response to the supply of driving signals are transmitted to the external terminals TxP1(IO) to TxP4 (IO) via the signal wirings LTX1 to LTX4, and are amplified by the touch detection signal amplifying unit 1601 (FIG. 17) within the semiconductor device for touch 7.

Returning to explanations of FIG. 18, the configuration of the liquid crystal display 1 will be explained. Only unit buffers ULB0, ULB1 corresponding to the common electrodes TL(0), TL(1) from among the plurality of unit buffers are shown in FIG. 18 similarly to FIG. 15. Since the configuration of the plurality of unit buffers included in the level shift and buffer LB is mutually identical, explanations will be made using the unit buffer ULB0 shown in FIG. 18 as a leading example.

The unit buffer ULB0 corresponding to the common electrode TL(0) includes an inverter circuit IV2 for outputting phase inverted control signals upon receiving control signals SelfEN indicating self-capacity method, switches S60 to S65 which are switch controlled through outputs of the inverter circuit IV2 and switches S70 to S75 which are switch controlled through the control signals SelfEN. Though not particularly limited, the control signals SelfEN are formed by the control unit 9 (FIG. 1). The control unit 9 sets a logical value of the control signals SelfEN to "1" (high level) during touch detection periods of self-capacity method, while setting a logical value of the control signals SelfEN to "0" (low level) during display periods.

Each of the switches S60 to S65 and S70 to S75 included in the unit buffer ULB0 includes a pair of nodes and a control node, and when control signals having a logical value of "1" are supplied to the control node, the pair of the nodes is made conductive while when control signals having a logical value of "0" are supplied, the pair of the nodes is made non-conductive. One node of the pair of nodes of each of the switches S70 to S75 is connected to the node N1 while the other node is connected to the terminal within corresponding terminal groups SP11 to SP16. Further, one node of the pair of nodes of each of the switches S60 to S65 is connected to a voltage wiring supplied with the predetermined voltage VCOMDC while the other node is connected to the terminal within corresponding terminal groups SP11 to SP16. Further, the node N1 is connected to an output of the corresponding unit selection circuit UTS0. Since the node N1 functions as an input node for inputting driving signals and as an output node for outputting detection signals, it can be regarded as an input/output node.

Upon setting the logical value of the control signals SelfEN to "1" and designating a touch detection period of self-capacity method, since the control signals SelfEN of which the phase has been inverted by the inverter circuit IV2 are supplied to each of the control nodes of the switches S60 to S65 within the unit buffer ULB0, each of the switches S60 to S65 is in a non-conductive state. In contrast thereto, since control signals having a logical value of "1" are supplied to each of the control nodes of the switches S70 to S75, each of the switches S70 to S75 is in a conductive state. With this arrangement, the input/output node N1 is electrically connected to the terminal groups SP11 to SP16 via each of the switches S70 to S75.

During touch detection periods, either one of the switches TS1 to TS4 within the unit selection circuit UTS0 is set to be in a conductive state in accordance with the status signals Status1, Status2. With this arrangement, the signal wiring LTX1 or the voltage wiring LVS (FIG. 14) is electrically connected to the input/output node N1 of the unit buffer ULB0 via the unit selection circuit UTS0, and is further electrically connected to the corresponding terminal groups SP11 to SP16.

During touch detection periods, for example, the switch TS1 or TS2 within the unit selection circuit UT0 is made to be in a conductive state by the status signals Status1, Status2 for using the common electrode TL(0) for touch detection, and the driving signal generation unit 17 (FIG. 17) forms the clock signals □ as the driving signals Tsig1 and supplies them to the input/output terminal TxP1 (IO). With this arrangement, the driving signals Tsig1 (clock signals □) are supplied to the signal wiring LTX1, and the driving signals Tsig1 of the signal wiring LTX1 are supplied, via the unit selection circuit UTS0 and the unit buffer ULB0, to the terminal groups SP11 to SP16 corresponding to the common electrode TL(0) and are further transmitted to the common electrode TL(0).

When the driving signals Tsig1 which are clock signals □ are transmitted to the common electrode TL(0), the voltage of the common electrode TL(0) changes in response to voltage changes of the driving signals Tsig1. As already explained in FIG. 16, the amount of change differs depending on whether the vicinity of the common electrode TL(0) is touched or not.

Voltage changes of the common electrode TL(0) generated depending on whether the vicinities are touched or not are transmitted to the terminal groups SP11 to SP16 corresponding to the common electrode TL(0). The voltage changes transmitted to the terminal groups SP11 to SP16 are transmitted to the node N1 via each of the switches S70 to S15 within the unit buffer UTL0. Further, the voltage changes transmitted to the node N1 are transmitted to the signal wiring LTX1 via the switch TS1 or TS2 within the unit selection circuit UTS0 and are further transmitted to the external terminal TxP1(IO) of the control device for touch 7.

The voltage changes transmitted to the external terminal TxP1(IO) are input to the touch detection signal amplifying unit 1601 (FIG. 17), and amplified and supplied to the A/D conversion unit 4. This makes it possible to perform detection whether the vicinity of the common electrode TL(0) is touched or not.

Though not particularly limited, control signals are supplied from the driving signal generation unit 17 to the touch detection signal amplifying unit 1601 as shown in FIG. 17. The timing at which the driving signal generation unit 17 has formed clock signals □□ as driving signals Tsig1 is notified to the touch detection signal amplifying unit 1601 through control signals. Though not particularly limited, the touch detection signal amplifying unit 1601 detects voltage changes of the external terminal TxP1(IO) at the timing at which a predetermined time has elapsed from the notified timing. With this arrangement, the touch detection signal amplifying unit 1601 can amplify detection signals (voltage changes) generated in response to the driving signals Tsig1.

When the common electrode TL(0) is not used for touch detection, switch TS3 or TS4 within the unit selection circuit UTS0 is made to be in a conductive state by status signals Status1, Status2. With this arrangement, the voltage wiring LVS is electrically connected to the common electrode TL(0) via the unit selection circuit UTS0 and the unit buffer ULB0 during touch detection periods, and the ground voltage Vs is supplied to the common electrode TL(0).

Each of the unit buffer UTS1 shown in FIG. 18 and the unit buffers UTS2 to UTSp (not shown) also performs the above-described operations. With this arrangement, rough detection is performed and detailed detection is performed thereafter similarly to the first embodiment.

During touch detection periods, when performing rough detection, for example, the common electrode TL(0) is connected to the signal wiring LTX1 via the unit selection circuit UTS0 and the unit buffer ULB0 while the common electrode TL(1) is connected to the signal wiring LTX1 via the unit selection circuit UTS1 and the unit buffer ULB1 as shown in FIG. 10 and FIG. 18. Namely, the common electrodes TL(0) and TL(1) disposed to be close to each other are connected to the same signal wiring LTX1 and further to the same external terminal TxP1(IO). The driving signals Tsig1 (clock signals □) formed by the driving signal generation unit 17 (FIG. 17) are transmitted to the common electrodes TL(0) and TL(1) disposed to be close to each other.

When a vicinity of the common electrode TL(0) or TL(1) is touched, the amount of voltage change of the common electrode TL(0) or TL(1) changes in accordance with the presence/absence of touch upon supply of driving signals Tsig1. The changes in the amount of voltage change of the common electrode TL(0) or TL(1) appear as the changes in the amount of voltage change of the signal wiring LTX1. Namely, the amount of voltage change of the signal wiring LTX1 appears as a composition of the amount of voltage change of the common electrode TL(0) and the amount of voltage change of the common electrode TL(1). The changes in the amount of voltage change of the signal wiring LTX1 are transmitted to the external terminal TxP1(IO) and amplified in the touch detection signal amplifying unit 1601 (FIG. 17).

In performing rough detection, the remaining common electrodes, for example, the common electrodes TL(2) and TL(3), TL(4) and TL(5), and TL(6) and TL(7) in FIG. 10, are connected to the same signal wirings LTX2, LTX3 and LTX4, and the driving signals Tsig2, Tsig3 and Tsig4 as well as the amount of voltage change are transmitted using the signal wirings LTX2 to LTX4 as in the above-described signal wiring LTX1. In this case, since it is the self-capacity method, it is possible to supply the driving signal Tsig1 to Tsig4 to the signal wirings LTX1 to LTX4 substantially and simultaneously, and thereby to detect voltage changes substantially and simultaneously.

On the other hand, in performing detailed detection during touch detection periods, FIG. 11 in which detection of the left side region is performed is used an example for the following explanations. Namely, the signal wiring LTX1 is connected to the common electrode TL(0) via the unit selection circuit UTS0 and the unit buffer ULB0, and the signal wiring LTX2 is connected to the common electrode TL(1) via the unit selection circuit UTS1 and the unit buffer ULB1. Similarly, the signal wiring LTX3 is connected to the common electrode TL(2) via the unit selection circuit UTS2 and the unit buffer ULB2, and the signal wiring LTX4 is connected to the common electrode TL(3) via the unit selection circuit UTS3 and the unit buffer ULB3.

In this case, the clock signals □ are formed as the driving signals Tsig1 to Tsig4 by the driving signal generation unit 17 and are supplied to the external terminals TxP1(IO) to TxP4(IO). With this arrangement, the driving signals Tsig1 to Tsig4 which are clock signals □ are transmitted to the corresponding signal wirings LTX1 to LTX4 to be supplied to the corresponding common electrodes TL(0) to TL(3). When the driving signals Tsig1 to Tsig4 are supplied to the common electrodes TL(0) to TL(3), changes in the amount of voltage change caused in accordance with whether vicinities thereof are touched or not are generated at the common electrodes TL(0) to TL(3), are transmitted to the external terminals TxP1(IO) to TxP4(IO) via the signal wirings LTX1 to LTX4 and are amplified by the touch detection signal amplifying unit 1601. This makes it possible to detect whether any of the vicinities of the common electrodes TL(0) to TL(3) is touched or not. Also in the case of FIG. 12 in which the central region is detected and in the case of FIG. 13 in which the right side region is to be detected, detection can be similarly performed.

In this respect, common nodes C of each of the switches S31 to S36 shown in FIG. 18 are connected to the second nodes P2 during touch detection periods. The switches S100 to S103 shown in FIG. 18 are in non-conductive states during touch detection periods while the switches S110 to S121 are in conductive states. Further, during the touch detection periods, the control unit 9 sets the logical value of the selection signals SEL1, SEL2 to "1", and all of the switches S11, S12, S21 and S22 are set to be in conductive states. FIG. 18 shows states during the touch detection periods.

While an example has been explained in which the common electrodes TL(0) to TL(p) are used as detection electrodes, a selection circuit similar to the selection circuit TSC, a level shift and buffer similar to the level shift and buffer LB, a driving signal generation unit similar to the driving signal generation unit 17, a touch detection signal amplifying unit similar to the touch detection signal amplifying unit 1601, a driving region designation unit similar to the driving region designation unit 18 and a decoder circuit similar to the decoder circuit 20 are provided also for the detection electrodes RL(0) to RL(p) explained in FIG. 16. With this arrangement, rough detection and detailed detection is performed thereafter also for the detection electrodes RL(0) to RL(p) using the self-capacity detection method.

By performing rough detection and detailed detection for both of the common electrodes TL(0) to TL(p) and the detection electrodes RL(0) to RL(p), it is possible to extract coordinates of touched positions. In this case, a circuit block for detecting touch from the common electrodes TL(0) to TL(p) is also used for a circuit block for detecting touch from the detection electrodes RL(0) to RL(p). For example, when touch detection from the common electrodes TL(0) to TL(p) and touch detection from the detection electrodes RL(0) to RL(p) are performed in a time-sharing manner, it is possible to achieve the use of the circuit block in both detections.

Also in the second embodiment, external terminals to which driving signals are output can be made smaller in number than common electrodes, and as a result the semiconductor device for touch 1600 can be downsized similarly to the first embodiment. Further, in the second embodiment, since external terminals for inputting detection signals generated in response to the driving signals during touch detection periods of the driving signals can be smaller in number than common electrodes, the semiconductor device for touch 1600 can be further downsized. This makes it possible to achieve downsizing of the liquid crystal display.

While an example has been explained in which the selection circuit STC composed of unit selection circuits UTS0 to UTSp is used for both cases, that is, when supplying the driving signals Tsig1 to Tsig4 to the common electrodes and when supplying detection signals generated in response to the supply of the driving signals Tsig1 to Tsig4 to the external terminals TxP1(IO) to TxP4(IO), the present invention is not limited to this. Namely, it is possible to separately provide a selection circuit used for supplying the driving signals Tsig1 to Tsig4 to the common electrodes and a selection circuit used for supplying the detection signals generated in response to the supply of the driving signals Tsig1 to Tsig4 to the external terminals TxP1(IO) to TxP4(IO). In this case, the former selection circuit is defined to be a first selection circuit and the latter is defined to be a second selection circuit, and the first selection circuit operates at a timing of supplying the driving signals while the second selection circuit operates at the timing of detecting the amount of voltage change of the common electrodes. In this manner, when considering the first selection circuit and the second selection circuit separately, the selection circuit STC explained as the second embodiment can be regarded to include both functions of the first selection circuit and the second selection circuit.

Third Embodiment

Figure 19:
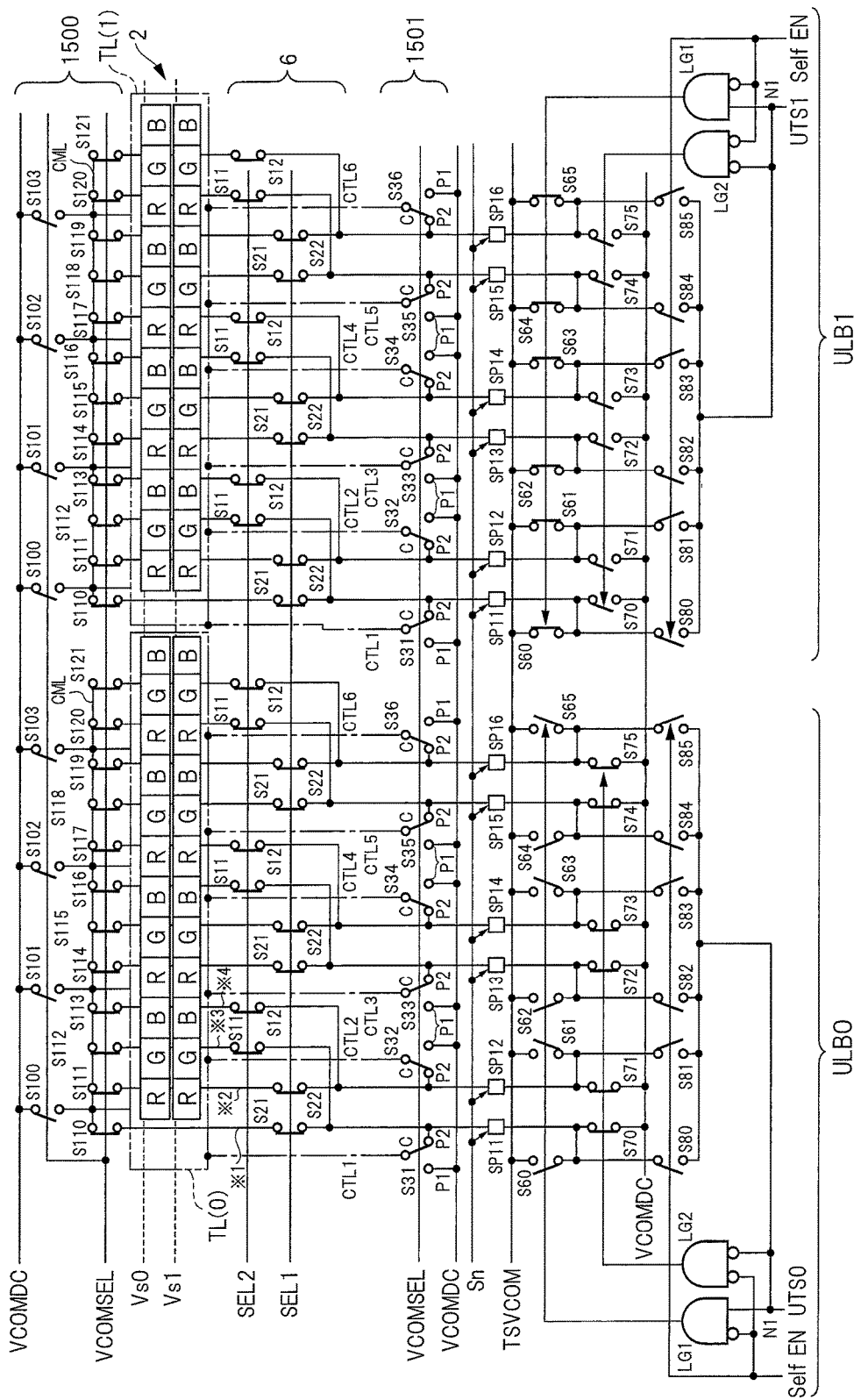
FIG. 19 is a block diagram showing a configuration of main portions of a liquid crystal display according to a third embodiment.

FIG. 19 is a block diagram showing main portions of the liquid crystal display 1 according to the third embodiment. In the third embodiment, it is possible to switch and apply the mutual capacity method explained using FIG. 2 and the self-capacity method explained using FIG. 16 as a method for touch detection. The configuration of the liquid crystal display 1 shown in FIG. 19 is similar to the configuration of the liquid crystal display of FIG. 18 explained in the second embodiment. Therefore, points different from FIG. 18 will be mainly explained here.

The difference between the liquid crystal display according to the third embodiment and the liquid crystal display shown in FIG. 18 is the configuration of the level shift and buffer LB. Namely, the configuration of the plurality of unit buffers included in the level shift and buffer LB is different. The level shift and buffer LB of the liquid crystal display 1 according to the third embodiment is composed of a plurality of unit buffers ULB0 to ULBp similarly to the second embodiment, and each of the unit buffers has a mutually identical configuration. FIG. 19 shows only unit buffers ULB0 to ULB1 corresponding to the common electrodes TL(0) to TL(1) from among the plurality of unit buffers ULB0 to ULBp. Here, explanations of the configuration and operations will be made using the unit buffer ULB0 as a leading example.

The unit buffer ULB0 includes two logic circuits LG1, LG2, switches S60 to S65 each including a pair of nodes and control nodes, switches S70 to S75 each including a pair of nodes and control nodes, and switches S80 to S85 each including a pair of nodes and control nodes.

The logic circuit LG1 includes a two-input AND circuit and an inverter circuit for inverting phases of control signals SelfEN designating the self-capacity method and supplying the same to one input of the two-input AND circuit (circle marked at an input of the two-input AND circuit). Outputs of the logic circuit LG1 are supplied to each of the control nodes of the switches S60 to S65. Further, one node of each of the switches S60 to S65 is connected to a voltage wiring supplied with the predetermined voltage TSVCOM while the other node of each of the switches S60 to S65 is connected to the terminal within corresponding terminal groups SP11 to SP16. Each of the switches S60 to S65 makes the pairs of the nodes either conductive or non-conductive in accordance with outputs of the logic circuit LG1. Namely, when the logical value of the outputs of the logic circuit LG1 is "1", each of the switches S60 to S65 makes the pairs of the nodes conductive, and when the logical value of the outputs of the logic circuit LG1 is "0", each of the switches S60 to S65 makes the pairs of the nodes non-conductive.

The logic circuit LG2 includes a two-input AND circuit and an inverter circuit for inverting phases of control signals SelfEN and supplying the same to one input of the two-input AND circuit (circle marked at an input of the two-input AND circuit). Outputs of the logic circuit LG2 are supplied to each of the control nodes of the switches S70 to S75. Further, one node of each of the switches S70 to S75 is connected to a voltage wiring supplied with the predetermined voltage VCOMDC while the other node of each of the switches S70 to S75 is connected to the terminal within the corresponding terminal groups SP11 to SP16. Each of the switches S70 to S75 makes the pairs of the nodes either conductive or non-conductive in accordance with outputs of the logic circuit LG2. Namely, when the logical value of the outputs of the logic circuit LG2 is "1", each of the switches S70 to S75 makes the pairs of the nodes conductive, and when the logical value of the outputs of the logic circuit LG2 is "0", each of the switches S70 to S75 makes the pairs of the nodes non-conductive.

The control signals SelfEN are supplied to each of the control nodes of the switches S80 to S85, one node of each of the switches S80 to S85 is connected to the node N1 in common while the other node of each of the switches S80 to S85 is connected to the terminal within the corresponding terminal groups SP11 to SP16. With this arrangement, each of the switches S80 to S85 is in a conductive state when the logical value of the control signals SelfEN is "1" and in a non-conductive state when the logical value of the control signals SelfEN is "0".

The other input of the two-input AND circuit of the logic circuit LG1 is connected to the node N1 and the other input of the two-input AND circuit of the logic circuit LG2 is connected to the node N1 via the inverter circuit (circle marked at an input of the two-input AND circuit). Similarly to the second embodiment, an output of the corresponding unit selection unit UTS0 is connected to the node N1. With this arrangement, outputs of the corresponding unit selection unit UTS0 are supplied to the other input node of the two-input AND circuit within the logic circuit LG1, and to the one node of each of the switches S80 to S85. Further, outputs of the unit selection circuit UTS0 of which the phase has been inverted are supplied to the other input node of the two-input AND circuit within the logic circuit LG2.

While it is possible to form the control signals SelfEN by the control unit 9 similarly to the second embodiment, they are formed by the touch control device 1 in the third embodiment. Further, in the third embodiment, a logical value of "0" of the control signals SelfEN designates as the touch detection method that the mutual capacity method explained in FIG. 2 is to be employed as the touch detection method, while a logical value of "1" of the control signals SelfEN designates that the self-capacity method explained in FIG. 16 is to be employed as the touch detection method.

During touch detection periods, when the logical value of the control signals SelfEN is "1", the control signals SelfEN of which the phase has been inverted by the inverter circuit indicated by a circle are supplied to the one input of the two-input AND circuit of the logic circuit LG1, and to the one input of the two-input AND circuit of the logic circuit LG2. Therefore, the outputs of each of the logic circuit LG1 and the logic circuit LG2 will have a logical value of "0". With this arrangement, the switches S60 to S65 and the switches S70 to S75 are in non-conductive states. On the other hand, since the control signals SelfEN having a logical value of "1" are supplied to the control nodes of the switches S80 to S85, each of the switches S80 to S85 is in a conductive state. With this arrangement, the common electrode TL(0) is electrically connected to the node N1 of the unit buffer ULB0. When the logical value of the control signals SelfEN is set to "1", the remaining unit buffers ULB1 to ULBp also electrically connect the corresponding common electrodes TL(1) to TL(p) to the node N1.

In this manner, by setting the logical value of the control signals SelfEN to "1", each of the common electrodes TL(0) to TL(p) is electrically connected to the node N1 of the corresponding unit buffers ULB0 to ULBp during touch detection periods. As already described in the second embodiment, by providing the driving signal generation unit 17, the touch detection signal amplifying unit 1601 and the external terminals TxP1(IO) to TxP4(IO) shown in FIG. 17, it is possible to detect presence/absence of touch through the self-capacity method. In this case, it is possible to extract coordinates of touched positions by providing a circuit block and others similarly to the level shift and buffer LB explained in FIG. 19 also for the detection electrodes RL(0) to RL(p).

On the other hand, during touch detection periods, when the logical value of the control signals SelfEN is set to be "0", a logical value of "0" is supplied to one input of the two-input AND circuit of the logic circuit LG1 and to one input of the two-input AND circuit of the logic circuit LG2. Therefore, outputs of each of the logic circuit LG1 and the logic circuit LG2 change in accordance with the logical value of the node N1. Namely, when the logical value of the node N1 is "1", outputs of the logic circuit LG1 will have a logical value of "1", and outputs of the logic circuit LG2 will have a logical value of "0". On the other hand, when the logical value of the node N1 is "0", outputs of the logic circuit LG1 will have a logical value of "0", and outputs of the logic circuit LG2 will have a logical value of "1". With this arrangement, the switches S60 to S65 and the switches S70 to S75 will complementarily be in conductive/non-conductive states in accordance with logical values of the node N1. On the other hand, since the control signals SelfEN having a logical value of "0" are supplied to the control nodes of the switches S80 to S85, each of the switches S80 to S85 is in non-conductive states.

With this arrangement, the predetermined voltage TSVCOM or VCOMDC is supplied to the common electrode TL(0) via the switches S60 to S65 or switches S70 to S75 in accordance with logical values (voltage values) of the node N1. When the control signals SelfEN have a logical value of "0", the remaining unit buffers ULB1 to ULBp similarly supply the predetermined voltage TSVCOM or VCOMDC to the corresponding common electrodes TL(1) to TL(p) in accordance with logical values, namely voltages of the node N1.

Outputs of the corresponding unit selection circuits UTS0 to UTSp are supplied to the node N1 of each of the unit buffers ULB0 to ULBp. Therefore, by providing the touch detection signal amplifying unit 13 shown in FIG. 1, outputting the driving signals Tsig1 to Tsig4 from the external terminals TxP1(IO) to TxP4(IO) to and the signal wirings LTX1 to LTX4 and controlling the selection circuit TSC by the status signals Status1, Status2, it is possible to detect presence/absence of touch and extract coordinates of touched positions through the mutual capacity method described in the first embodiment.

According to the third embodiment, it is possible to switch between the self-capacity method and the mutual capacity method as the touch detection method.

Touch Detection Method

Figure 20:
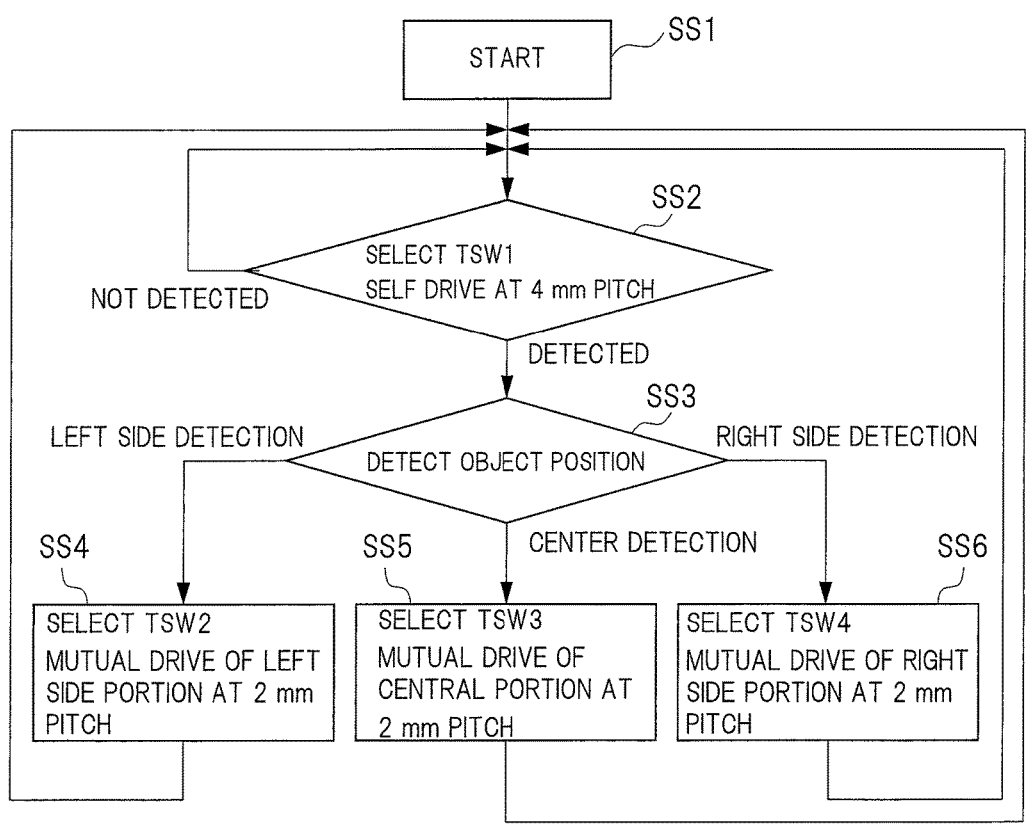
FIG. 20 is a flowchart showing a touch detection method according to the third embodiment.

FIG. 20 is a flowchart showing a touch detection method. Though not particularly limited, the processes shown in FIG. 20 are executed in the semiconductor device for touch. Here, a touch detection method using the liquid crystal display 1 explained in the third embodiment will be explained.

First, when touch detection processes are started in step SS1, the control unit 19 (FIG. 1) executes processes of step SS2 (select TSW1, Self Drive at 4 mm pitch). The processes performed in step SS2 are as follows.

First, the processing unit 19 outputs status signals Status1, Status2 to the driving region designation unit 18 to set the driving switch signals TSW1 to have a logical value of "1". Namely, the driving region designation unit 18 is instructed to output the status signals Status1, Status2 having logical values of "1", "1". Further, the control unit 19 outputs the control signals SelfEN designating the detection method as a logical value of "1". Further, the control unit 19 instructs the driving signal generation unit 17 to form clock signals □ as driving signals Tsig1 to Tsig4 and to output them to the external terminals TxP1(IO) to TxP4(IO).

With this arrangement, the switch TS1 is in a conductive state as shown in FIG. 10 in each of the unit selection circuits UTS0 to UTS7 included in the selection circuit TSC. Further, by setting the logical value of the control signals SelfEN to "1", the switches S80 to S85 of the plurality of unit buffers ULB0 to ULB7 included in the level shift and buffer LB are in conductive states. With this arrangement, the driving signals Tsig1 are supplied to the common electrodes TL(0), TL(1), the driving signals Tsig2 are supplied to the common electrodes TL(2), TL(3), the driving signals Tsig3 are supplied to the common electrodes TL(4), TL(5) and the driving signals Tsig4 are supplied to the common electrodes TL(6), TL(7).

In each of the common electrodes TL(0) to TL(7), the amount of voltage change is generated in accordance with whether vicinities thereof are touched or not upon supply of the driving signals Tsig1 to Tsig4. The generated amount of voltage change is synthesized in the signal wirings LTX1 to LTX4, and the synthesized amount of voltage change is transmitted to the external terminals TxP1(IO) to TxP4(IO) of the semiconductor device for touch. The transmitted amount of voltage change is amplified in the touch detection signal amplifying unit 1601 (FIG. 17). The amplified amount of voltage change is processed in the A/D conversion unit 14 (FIG. 1), the signal processing unit 15 (FIG. 1) and the coordinate extraction unit 16, and the process result is supplied to the control unit 19.

Though not particularly limited, the process result supplied to the control unit 19 includes, in this case, a touch detection result indicating whether the amount of voltage change transmitted to any one of the external terminals TxP1(IO) to TxP4(IO) has reached a value indicating that touch has been made or not, and a rough detected position result indicating whether the amount of voltage change transmitted to any one of the external terminals TxP1(IO) to TxP4(IO) has reached a value indicating that touch has been made or not. The control unit 19 determines detection or no detection based on the touch detection result included in the process result. Namely, when the touch detection result indicates that neither of the amounts of voltage change transmitted to the external terminals TxP1(IO) to TxP4(IO) has reached a value indicating that touch has been made, it is determined as no detection. On the other hand, when the amount of voltage change transmitted to the external terminals TxP1(IO) to TxP4(IO) has reached a value indicating that touch has been made, it is determined as detection. In the case of determining no detection, step SS2 is repeatedly executed and when the detection is determined, step SS3 is executed. Namely, step SS2 is repeated until detection is determined.

In step SS3, the control unit 19 performs a process of object position detection based on the rough detected position result included in the process result. In the process, the control unit 19 specifies regions to be detected in details.

Namely, when the rough detected position result indicates that the amount of voltage change transmitted to the external terminals TxP1(IO) and/or TxP2(IO) has reached a value indicating that touch has been made, the control unit 19 determines to define the left side region as an object for performing detailed detection to be performed next time (left side detection). When the rough detected position result indicates that the amount of voltage change transmitted to the external terminals TxP2(IO) and/or TxP3(IO) has reached a value indicating that touch has been made, the control unit 19 determines to define the central region as an object for performing detailed detection to be performed next time (center detection). When the rough detected position result indicates that the amount of voltage change transmitted to the external terminals TxP3(IO) and/or TxP4 (IO) has reached a value indicating that touch has been made, the control unit 19 determines to define the right side region as an object for performing detailed detection to be performed next time (right side detection).

In the case of left side detection, step SS4 (select TWS2, Mutual Drive of Left Side Portion at 2 mm pitch) is executed next. In step SS4, the control unit 19 sets the logical value of the control signals SelfEN to "0". Further, the control unit 19 instructs the driving region designation unit 18 to output status signals Status1, Status2 having logical values of "1", "0". Moreover, the control unit 19 instructs the driving signal generation unit 17 to form clock signals □□□ as driving signals, for example, in the order of the driving signals Tsig1 to Tsig4. With this arrangement, the driving signals Tsig1 to Tsig4 which are clock signals □□□ are output from the external terminals TxP1(IO) to TxP4(IO) in the order of the driving signals Tsig1 to Tsig4, and are transmitted in the order of the signal wirings LTX1 to LTX4.

Since the status signals Status1, Status2 have logical values of "1", "0", the switch TS2 of each of the unit selection circuit UTS0 to UTS7 is in a conductive state as shown in FIG. 11. With this arrangement, the driving signals Tsig1 to Tsig4 are supplied to the unit buffers ULB0 to ULB3 via the unit selection circuits UTS0 to UTS3. In each of the unit buffers ULB0 to ULB3, the switches S60 to S65 and the switches S70 to S75 will complementarily be in conductive/non-conductive states in accordance with voltage changes of the supplied driving signals Tsig1 to Tsig4 (clock signals □). With this arrangement, the predetermined voltage TSVCOM or the predetermined voltage VCOMDC will be alternately supplied in synchronization with the voltage changes of the driving signals Tsig1 to Tsig4. Further, since the driving signal generation unit 17 forms the driving signals Tsig1 to Tsig4, in this order, to be clock signals □, the voltage of driving electrodes start alternating changes in the order of the common electrodes TL(0) to TL(3).

At the timing that voltages of the driving electrode TL(0) start changing, the amount of voltage change generated at the detection electrodes RL(0) to RL(p) (detection signals Rx(0) to Rx(p): FIG. 1) is amplified at the touch detection signal amplifying unit 13. Further, the touch detection signal amplifying unit 13 amplifies the detection signals Rx(0) to Rx(o) at the detection electrodes RL(0) to RL(p) at the timing that the voltages of the driving electrode TL(1) start changing, and amplifies the detection signals Rx(0) to Rx(o) at the detection electrodes RL(0) to RL(p) at the timing the voltages of the driving electrode TL(2) start changing. Similarly, the touch detection signal amplifying unit 13 amplifies the detection signals Rx(0) to Rx(o) at the detection electrodes RL(0) to RL(p) at the timing that the voltages of the driving electrode TL(3) start changing.

Each of the amplified detection signals Rx(0) to Rx(p) is processed in the A/D conversion unit 14 and the signal processing unit 15, and supplied to the coordinate extraction unit 16. In the coordinate extraction unit 16, coordinates of touched positions (object positions) are extracted, for example, based on the timing of forming the driving signals Tsig1 to Tsig4 in the driving signal generation unit 17 and detection signals processed in the A/D conversion unit 14 and the signal processing unit 15, and are output as coordinate information from the external terminal Tout. With this arrangement, detailed detection is performed when it has been roughly detected that the touched region is on the left side in step SS3 to extract coordinates of the touched position. Upon completion of extraction of coordinates, step SS2 is repeatedly executed.

In step SS4, each of the unit selection circuits UTS4 to UTS7 except for the unit selection circuits UTS0 to UTS3 supplies the ground voltage Vs to the corresponding unit buffers ULB4 to ULB7. In each of the unit buffers ULB4 to ULB7 supplied with the ground voltage Vs, the switches S70 to S75 are in conductive states, so that the common electrodes connected to these unit buffers are supplied with the predetermined voltage VCOMDC during periods that the processes are performed in step SS4.

Though not particularly limited, when the driving signal generation unit 17 sequentially forms the driving signals Tsig1 to Tsig4 in step SS4, it forms clock signals □□ as the driving signals Tsig1 for a predetermined period, it then forms clock signals □ as the driving signals Tsig2 for a predetermined period, it then forms clock signals □ as the driving signals Tsig3 for a predetermined period thereafter and finally forms clock signals □ as the driving signals Tsig4 for a predetermined period. Namely, the driving signals are formed such that periods during which they are clock signals do not overlap each other among the driving signals.

Next, when central detection is determined in step SS3, step SS5 (select TSW3, Mutual Drive of Central Portion at 2 mm pitch) is executed thereafter. In step SS5, the control unit 19 sets the logical value of the control signals SelfEN to "0". Further, the control unit 19 instructs the driving region designation unit 18 to output status signals Status1, Status2 having logical values of "0", "1". Moreover, the control unit 19 instructs the driving signal generation unit 17 to form clock signals □ as driving signals, for example, in the order of the driving signals Tsig1 to Tsig4 similarly to step SS4. With this arrangement, the driving signals Tsig1 to Tsig4 which are clock signals □ are output from the external terminals TxP1(IO) to TxP4(IO) in the order of the driving signals Tsig1 to Tsig4, and are transmitted in the order of the signal wirings LTX1 to LTX4.

When the status signals Status1, Status2 have logical values of "0", "1", the driving switch signal TWS3 will have a logical value of "1" as shown in FIG. 8. With this arrangement, the switch TS3 of each of the unit selection circuits UTS0 to UTS7 is in a conductive state as shown in FIG. 12. As a result, unlike the left side detection, each of the driving signals Tsig1 to Tsig4 is supplied to each of the unit buffers ULB2 to ULB5 corresponding to each of the unit selection circuits via each of the unit selection circuits UTS2 to UTS5. Similarly to the left side detection, in each of the unit buffers ULB2 to ULB5 supplied with the driving signals Tsig1 to Tsig4, the switches S60 to S65 and switches S70 to S75 will complementarily operate in synchronization with voltage changes in the supplied driving signals. With this arrangement, the predetermined voltage TSVCOM and the predetermined voltage VCOMDC are alternately supplied to the common electrodes TL(2) to TL(5) corresponding to the unit buffers ULB2 to ULB5.

Similarly to the case of left side detection, since the driving signals Tsig1 to Tsig4 become clock signals □□ in this order, the voltage changes in the order of the common electrodes TL(2) to TL(5). With this arrangement, the amount of voltage changes in accordance with whether vicinities of intersection portions of the common electrode TL(2) and the detection electrodes RL(0) to RL(p) are touched or not is generated at the detection electrodes RL(0) to RL(p), and supplied to the touch detection signal amplifying unit 13 as detection signals Rx(0) to Rx(p). Thereafter, the detection signals Rx(0) to Rx(p) related to intersection portions with the common electrode TL(3), the detection signals Rx(0) to Rx(p) related to intersection portions with the common electrode TL(4) and detection signals Rx(0) to Rx(p) related to intersection portions with the common electrode TL(5) are sequentially supplied to the touch detection signal amplifying unit 13. With this arrangement, detailed detection is performed similarly to the case of left side detection, and coordinates of the touched position are extracted and output. Upon output of coordinates of the touched position, step SS2 is repeatedly executed.

Further, when right side detection is determined in step SS3, step SS6 (select TSW4, Mutual Drive of Right Side Portion at 2 mm pitch) is executed next. Also in step SS6, the control unit 19 sets the logical value of the control signals SelfEN to "0". Further, the control unit 19 instructs the driving region designation unit 18 to output status signals Status1, Status2 having logical values of "1", "1". Moreover, the control unit 19 instructs the driving signal generation unit 17 to form clock signals □□ as driving signals in the order of driving signals Tsig1 to Tsig4 similarly to step SS4. With this arrangement, the driving signals Tsig1 to Tsig4 which are clock signals □□□ are output from the external terminals TxP1(IO) to TxP4(IO) in the order of driving signals Tsig1 to Tsig4, and are transmitted in the order of the signal wirings LTX1 to LTX4.

When the status signals Status1, Status2 have logical values of "1", "1", the driving switch signal TWS4 will have a logical value of "1" as shown in FIG. 8. With this arrangement, the switch TS4 of each of the unit selection circuits UTS0 to UTS7 is in a conductive state as shown in FIG. 13. As a result, unlike the left side detection or central detection, each of the driving signals Tsig1 to Tsig4 is supplied to each of the unit buffers ULB4 to ULB7 corresponding to each of the unit selection circuits via each of the unit selection circuits UTS4 to UTS7. Similarly to the left side detection and central detection, in each of the unit buffers ULB4 to ULB7 supplied with the driving signals Tsig1 to Tsig4, the switches S60 to S65 and switches S70 to S75 will complementarily operate in synchronization with voltage changes in the supplied driving signals. With this arrangement, the predetermined voltage TSVCOM and the predetermined voltage VCOMDC are alternately supplied to the common electrodes TL(4) to TL(7) corresponding to the unit buffers ULB4 to ULB7.

Similarly to the case of left side detection and central detection, since the driving signals Tsig1 to Tsig4 become clock signals □ in this order, the voltage changes in the order of the common electrodes TL(4) to TL(7). With this arrangement, the amount of voltage changes in accordance with whether vicinities of intersection portions of the common electrode TL(5) and the detection electrodes RL(0) to RL(p) are touched or not is generated at the detection electrodes RL(0) to RL(p), and supplied to the touch detection signal amplifying unit 13 as detection signals Rx(0) to Rx(p). Thereafter, the detection signals Rx(0) to Rx(p) related to intersection portions with the common electrode TL(5), the detection signals Rx(0) to Rx(p) related to intersection portions with the common electrode TL(6) and the detection signals Rx(0) to Rx(p) related to intersection portions with the common electrode TL(7) are sequentially supplied to the touch detection signal amplifying unit 13. With this arrangement, detailed detection is performed similarly to the case of left side detection and central detection, and coordinates of the touched position are extracted and output. Upon output of coordinates of the touched position, step SS2 is repeatedly executed.

In this manner, step SS2 and step SS3 can be regarded as a first detection step in which a first region including touched regions and being larger than the touched regions is roughly detected. Further, steps SS4 to SS6 can be regarded as a second detection step in which driving signals are supplied to common electrodes disposed in the first region detected by the first detection step of performing rough detection to perform detailed detection of the common electrodes disposed in the vicinities of the touched regions.

Here, rough detection is performed using the self-capacity method while detailed detection is performed using the mutual capacity method. However, it is possible to perform both of the rough detection and the detailed detection using the self-capacity method or the mutual capacity method. When performing both of the rough detection and the detailed detection using the self-capacity method, it is not necessary to provide the touch detection signal amplifying unit 13 shown in FIG. 1. When performing both of the rough detection and the detailed detection using the mutual capacity method, it is not necessary to provide the touch detection signal amplifying unit 1601 shown in FIG. 17. Therefore, it is possible to achieve downsizing of the semiconductor device for touch.

On the other hand, when rough detection is performed using the self-capacity method while detailed detection is performed using the mutual capacity method as shown in FIG. 20, it is not necessary to detect the amount of voltage changes of the detection electrodes RL(0) to RL(p) when performing rough detection, so that simplification of control related to detection can be achieved. Further, when rough detection is performed using the self-capacity method, it is possible to supply driving signals to the driving electrodes on the entire surface in a substantially simultaneous manner, so that it is possible to perform detection of the entire surface in a substantially simultaneous manner. This makes it possible to achieve acceleration of rough detection.

Fourth Embodiment

FIG. 21A to FIG. 21D are schematic views showing a configuration of the liquid crystal display according to the fourth embodiment. In the fourth embodiment, there are eight driving signals Tsig1 to Tsig8 (not shown) instead of the four driving signals Tsig1 to Tsig4 explained in the first to third embodiments. Further, there are sixteen common electrodes TL(0) to TL(15). The number of driving switches is four, that is, TSW1 to TSW4 similarly to the first to third embodiments.

In FIG. 21A to FIG. 21D, 7 denotes the semiconductor device for touch explained in the first to third embodiments and is a single semiconductor device also in the fourth embodiment. Each of P1 to P8 indicated in the blocks of the semiconductor device for touch 7 denote external terminals, which output the driving signals Tsig1 to Tsig8 during touch detection periods. In this respect, in the semiconductor device for touch 7 shown in FIG. 21, illustration of external terminals for outputting status signals Status1, Status2 is omitted. In order to make the drawing easy to see, illustration of the selection circuit TSC and the level shift and buffer LB is also omitted.

The driving switch signals TSW1 to TSW4 are formed in accordance with combinations of logical values of the status signals Status1, Status2 similarly to the first to third embodiments. Similarly to the touch detection method shown in FIG. 20, when performing rough detection, the driving switch signal TSW1 becomes a logical value of "1", and when performing detailed left side detection, the driving switch signal TSW2 becomes a logical value of "1". Further, when performing detailed central detection, the driving switch signal TSW3 becomes a logical value of "1", and when performing detailed right side detection, the driving switch signal TSW4 becomes a logical value of "1".

FIG. 21A shows a relationship between the driving signals Tsig1 to Tsig8 and the common electrodes TL(0) to TL(15) when the driving switch signal TSW1 has become a logical value of "1" through the status signals Status1, Status2, that is, when performing rough detection. For example, when the number of common electrodes formed on the display panel 2 is sixteen as shown in FIG. 21, this corresponds to roughly detecting the entire surface of the liquid crystal panel 2.

When the entire surface is roughly detected, each of the external terminals P1 to P8 is electrically connected to two common electrodes disposed to adjoin each other by the selection circuit TSC. Taking FIG. 21A as an example, the external terminal P1 is connected to the common electrode TL(0) and the common electrode TL(1) disposed to adjoin the common electrode TL(0). Similarly, the external terminal P2 is connected to the common electrodes TL(2) and TL(3), the external terminal P3 is connected to the common electrodes TL(4) and TL(5), the external terminal P4 is connected to the common electrodes TL(6) and TL(7) and the external terminal P5 is connected to the common electrodes TL(8) and TL(9). Further, the external terminal P6 is connected to the common electrodes TL(IO) and TL(11), the external terminal P7 is connected to the common electrodes TL(12) and TL(13) and the external terminal P8 is connected to the common electrodes TL(14) and TL(15).

The driving signals Tsig1 to Tsig8 which are clock signals are output from respective external terminals P1 to P8 in states that the external terminals P1 to P8 are connected to two mutually adjoining common electrodes. With this arrangement, voltages of the common electrodes TL(0) to TL(15) change in accordance with voltage changes of the driving signals Tsig1 to Tsig8. At this time, the amount of voltage change generated in response to touch is detected using the mutual capacity (Mutual) method explained in the first embodiment or the self-capacity (Self) method explained in the second embodiment.

As a result of rough detection, when it is determined that vicinities of the common electrodes disposed in the left side region are touched, the state shown in FIG. 21B is set. Namely, the status signals Status1, Status2 are made to have logical values of "1", "0". With this arrangement, the selection circuit TSC connects each of the external terminals P1 to P8 of the semiconductor device for touch 7 to the common electrodes TL(0) to TL(7). In this connected state, the driving signals Tsig1 to Tsig8 are supplied from the external terminals P1 to P8 to the common electrodes TL(0) to TL(7). In this case, the clock signals are made to sequentially become the driving signals Tsig1 to Tsig8 as explained in FIG. 20. Voltages of the common electrodes TL(0) to TL(7) change due to changes in voltages of the driving signals Tsig1 to Tsig8, and the amount of voltage changes generated in accordance with presence/absence of touch is detected using, for example, the mutual capacity method explained in the first embodiment. This makes it possible to detect whether any of the vicinities of the common electrodes TL(0) to TL(7) has been touched. Upon completion of detection of the touched positions, it is set back to the state shown in FIG. 21A. In FIG. 21, a transition of these two states is indicated by arrow A1.

As a result of rough detection, when it is determined that vicinities of the common electrodes disposed in the central region are touched, the state shown in FIG. 21C is set. Namely, the status signals Status1, Status2 are made to have logical values of "0", "1". With this arrangement, the selection circuit TSC connects each of the external terminals P1 to P8 of the semiconductor device for touch 7 to the common electrodes TL(4) to TL(11). In this connected state, the driving signals Tsig1 to Tsig8 are supplied from the external terminals P1 to P8 to the common electrodes TL(4) to TL(11). Also in this case, the driving signals become the clock signals in the order of the driving signals Tsig1 to Tsig8. Voltages of the common electrodes TL(4) to TL(11) change due to changes in voltages of the driving signals Tsig1 to Tsig8, and the amount of voltage changes generated in accordance with presence/absence of touch is detected using, for example, the mutual capacity method explained in the first embodiment. This makes it possible to detect whether any of the vicinities of the common electrodes TL(4) to TL(11) has been touched. Upon completion of detection of the touched positions, it is set back to the state shown in FIG. 21A. In FIG. 21, a transition of these two states is indicated by arrow A2.

Further, as a result of rough detection, when it is determined that vicinities of the common electrodes disposed in the right side region are touched, the state shown in FIG. 21C is set. Namely, the status signals Status1, Status2 are made to have logical values of "1", "1". With this arrangement, the selection circuit TSC connects each of the external terminals P1 to P8 of the semiconductor device for touch 7 to the common electrodes TL(8) to TL(15). In this connected state, the driving signals Tsig1 to Tsig8 are supplied from the external terminals P1 to P8 to the common electrodes TL(8) to TL(15). Also in this case, the driving signals become the clock signals in the order of the driving signals Tsig1 to Tsig8. Voltages of the common electrodes TL(8) to TL(15) change due to changes in voltages of the driving signals Tsig1 to Tsig8, and the amount of voltage changes generated in accordance with presence/absence of touch is detected using, for example, the mutual capacity method explained in the first embodiment. This makes it possible to detect whether any of the vicinities of the common electrodes TL(8) to TL(15) has been touched. Upon completion of detection of the touched positions, it is set back to the state shown in FIG. 21A. In FIG. 21, a transition of these two states is indicated by arrow A3.

Further, it is also possible to perform detection of the central region as described in FIG. 21C after detection of the left side region as described in FIG. 21B. Vice versa, it is also possible to perform detection of the left side region as described in FIG. 21B after detection of the central region as described in FIG. 21C. The transition of these states is indicated by arrow B1 in FIG. 21.

Similarly, it is also possible to perform detection of the central region as described in FIG. 21C after detection of the right side region as described in FIG. 21D. Vice versa, it is also possible to perform detection of the right side region as described in FIG. 21D after detection of the central region as described in FIG. 21C. The transition of these states is indicated by arrow B2 in FIG. 21.

This makes it possible to continuously perform detailed detection without returning to states of performing rough detection, and to thereby achieve acceleration of detection. This is effective when, for example, it can be estimated that touch operations move from the left side region to the central region. Further, after transition among detailed detections in this way, the transition to the states of rough detection shown in FIG. 21A may be made as indicated by arrows A1, A2 or A3.

As explained so far, rough detection is performed by supplying a single driving signal to a plurality of (two) common electrodes disposed to adjoin each other. Therefore, it is possible to assume that rough detection is performed by regarding the plurality of common electrodes disposed to adjoin each other as one common electrode which is supplied with a single driving signal. In other words, when performing rough detection, it is possible to regard the external terminals to be common terminals with respect to the mutually adjoining plurality of common electrodes. In this case, since the mutually adjoining common electrodes are regarded as a single common electrode, it is possible to perform rough detection. Further, since they are common terminals, it is possible to reduce the number of external terminals of the semiconductor device for touch, as compared to the number of common electrodes, and thereby to achieve downsizing thereof.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

For example, while explanations have been made in which the common electrodes TL(0) to TL(p) and the signal lines SL(0) to SL(p) extend in the column direction and are disposed in the row direction in the embodiments, the row direction and the column direction change depending on points of view. Cases in which points of view are changed and the common electrodes TL(0) to TL(p) and the signal lines SL(0) to SL(p) extend in the row direction and are disposed in the column direction are also included in the scope of the invention.

In the present invention, explanations have been made in which the driving signals Tsig1 to Tsig4 formed by the driving signal generation unit 17 are output from external terminals of the semiconductor device for touch 7 or 1600 and supplied to the common electrodes via the selection circuit TSC and the level shift and buffer LB as represented by embodiments of the self-capacity method. It is also possible to supply the driving signals Tsig1 to Tsig4 formed by the driving signal generation unit 17 to the level shift and buffer LB via the selection circuit TSC, and to form driving voltages supplied to selected common electrodes by the level shift and buffer LB as represented by embodiments of the mutual capacity method. Namely, the touch control device of the present invention can supply driving voltages either directly or indirectly to the touch detection driving electrodes via the selection circuit TSC selecting common electrodes which are to be objects of touch detection driving.

Namely, in the present invention, the driving signals are directly or indirectly output from the touch control device to the touch detection driving electrodes selected by the selection circuit TSC during a touch detection mode via the selection circuit TSC controlled by the touch control device.

By linking these with touch detection results obtained from the touch control device, it is possible to realize improvements in touch detection speed, maintenance of touch detection accuracy, reductions in drive power and reductions in layout spaces of frame regions.

Further, while explanations of the embodiments have been made while taking a liquid crystal display with touch detection functions as an example, the present invention is not limited thereto, and it is also applicable to OLED displays with touch detection functions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A display comprising:
    a pixel array including a plurality of pixels disposed in a matrix form;
    a plurality of scanning lines disposed in each row of the pixel array, and supplying scanning signals to the plurality of pixels disposed in corresponding rows;
    a plurality of signal lines disposed in each column of the pixel array, and supplying image signals to the plurality of pixels disposed in corresponding columns;
    a plurality of touch detection driving electrodes each of which is disposed in each column of the pixel array, is formed so as to cover a plurality of pixels disposed in corresponding columns of the pixel array, and which is supplied with driving signals for detecting touch; and
    a semiconductor device including a plurality of driving terminals for supplying the driving signals to the touch detection driving electrodes,
    wherein the plurality of driving terminals of the semiconductor device are smaller in number than the plurality of touch detection driving electrodes disposed in the pixel array,
    wherein the plurality of touch detection driving electrodes extend along the plurality of signal lines to an outside of the pixel array,
    wherein the display includes a first selection circuit coupled to the plurality of driving terminals and the plurality of touch detection driving electrodes disposed in the pixel array, and the semiconductor device supplies driving signals to the first selection circuit, and
    wherein the first selection circuit includes a switch circuit selecting mutually adjoining touch detection driving electrodes as a bundle of touch detection driving electrodes or individually selecting touch detection driving electrodes from the mutually adjoining touch detection driving electrodes, and the first selection circuit supplies the driving signals to the selected bundle of the touch detection driving electrodes or the touch detection driving electrodes selected from the mutually adjoining touch detection driving electrodes.

2. The display according to claim 1,
    wherein the first selection circuit supplies the driving signals to the touch detection driving electrodes larger in number than the plurality of driving terminals, and supplies the driving signals to the number of the touch detection driving electrodes corresponding to the number of the driving terminals in accordance with detection of touch based on a supply of the driving signals.

3. The display according to claim 2,
    wherein the semiconductor device controls the first selection circuit such that the driving signals are supplied to the number of the touch detection driving electrodes which correspond to the number of the driving terminals and which are disposed in a region including a touched position by detection of touch based on a supply of the driving signals.

4. The display according to claim 3,
    wherein the display includes a plurality of signal wirings connected to the plurality of driving terminals, and
    the first selection circuit includes a plurality of unit selection circuits connected between each of the plurality of signal wirings and one touch detection driving electrode, and controlled by the semiconductor device.

5. The display according to claim 1,
    wherein detection signals in accordance with presence/absence of touch are generated by supplying the driving signals to each of the plurality of touch detection driving electrodes,
    the semiconductor device includes a plurality of detection terminals receiving the detection signals, and
    the plurality of detection terminals are smaller in number than the plurality of touch detection driving electrodes disposed in the pixel array.

6. The display according to claim 5,
    wherein the display includes a second selection circuit coupled to the plurality of detection terminals and the plurality of touch detection driving electrodes disposed in the pixel array, and
    the second selection circuit supplies the detection signals generated at the plurality of touch detection driving electrodes to one of the plurality of detection terminals.

7. The display according to claim 5,
    wherein each of the plurality of driving terminals has the same common terminals as those of each of the plurality of detection terminals, and
    the common terminals function as the driving terminals and the detection terminals in a time-sharing manner.

* * * * *